US011420732B2

(12) United States Patent
Atsumi

(10) Patent No.: US 11,420,732 B2
(45) Date of Patent: Aug. 23, 2022

(54) AIRCRAFT AND AIRCRAFT CONTROL SYSTEM

(71) Applicant: ATSUMI REAL ESTATE & CORPORATION, INC., Mitaka (JP)

(72) Inventor: Kazuya Atsumi, Tokyo (JP)

(73) Assignee: ATSUMI REAL ESTATE & CORPORATION, INC., Tokyo (JP)

(*) Notice: Subject to any disclaimer, the term of this patent is extended or adjusted under 35 U.S.C. 154(b) by 0 days.

(21) Appl. No.: 17/317,168

(22) Filed: May 11, 2021

(65) Prior Publication Data
US 2021/0403146 A1 Dec. 30, 2021

Related U.S. Application Data

(63) Continuation of application No. PCT/JP2019/044157, filed on Nov. 11, 2019.

(30) Foreign Application Priority Data

Nov. 16, 2018 (JP) .............................. JP2018-215948
Apr. 26, 2019 (JP) .............................. JP2019-085317
Jun. 7, 2019 (JP) .............................. JP2019-106717

(51) Int. Cl.
B64C 25/28 (2006.01)
B64C 39/02 (2006.01)
B64C 25/00 (2006.01)

(52) U.S. Cl.
CPC ............ B64C 25/28 (2013.01); B64C 39/024 (2013.01); *B64C 2025/008* (2013.01); *B64C 2201/027* (2013.01); *B64C 2201/088* (2013.01)

(58) Field of Classification Search
CPC . B64C 25/28; B64C 39/024; B64C 2025/008; B64C 2201/027;
(Continued)

(56) References Cited

U.S. PATENT DOCUMENTS 2,908,472 A * 10/1959 McDonald .............. F15B 11/16
180/9.5
2,933,271 A * 4/1960 Maltby ................. B64C 25/001
244/17.17
(Continued)

FOREIGN PATENT DOCUMENTS

JP 6084675 B1 2/2017
JP 2017-171014 A 9/2017
(Continued)

OTHER PUBLICATIONS

International Search Report and Written Opinion of the International Searching Authority issued by the Japan Patent Office for corresponding International Patent Application No. PCT/JP2019/044157, dated Jan. 28, 2020, with an English translation.
(Continued)

Primary Examiner — Medhat Badawi
(74) Attorney, Agent, or Firm — Myers Wolin, LLC.

(57) ABSTRACT

An aircraft includes a frame body that includes an attaching unit on an upper portion thereof, that is formed into a frame-shape structure, and that couples an object to a lower portion thereof, the attaching unit being configured to be capable of adjusting a position in an up-down direction of the attaching unit. A main body including a flying mechanism is positioned on an upper portion of the frame body. A control unit controls a position in the up-down direction of the attaching unit such that a flying posture of the object is controlled in accordance with a posture of the flying mechanism.

23 Claims, 28 Drawing Sheets

(58) Field of Classification Search
CPC ............ B64C 2201/088; B64C 25/001; B64C 2201/104; B64C 2201/128; B64C 2201/18; B64C 1/22; B64C 17/02; B64D 1/22; F16M 11/28
See application file for complete search history.

(56) References Cited

U.S. PATENT DOCUMENTS

| | | | | |
|---|---|---|---|---|
| 3,191,316 | A * | 6/1965 | Dryden | B64G 1/62 434/34 |
| 10,117,794 | B2 * | 11/2018 | Bourgraf | A61G 1/02 |
| 2002/0060267 | A1 * | 5/2002 | Yavnai | B64C 27/20 180/7.4 |
| 2014/0249702 | A1 * | 9/2014 | Pflug | B64C 25/32 701/16 |
| 2015/0331427 | A1 * | 11/2015 | Chaudary | G05D 1/0858 701/4 |
| 2016/0272308 | A1 * | 9/2016 | Gentry | G05D 1/102 |
| 2017/0075351 | A1 * | 3/2017 | Liu | G05D 1/0011 |
| 2017/0274988 | A1 * | 9/2017 | Nguyen | B64C 25/28 |
| 2018/0208309 | A1 * | 7/2018 | Wang | B64C 35/008 |
| 2018/0265222 | A1 * | 9/2018 | Takagi | B64F 1/32 |
| 2018/0362133 | A1 * | 12/2018 | Toyama | B64B 1/60 |
| 2019/0031221 | A1 * | 1/2019 | Atsumi | B66F 9/14 |

FOREIGN PATENT DOCUMENTS

| | | |
|---|---|---|
| JP | 2017-530043 A | 10/2017 |
| JP | 2017-538611 A | 12/2017 |
| JP | 2018-30431 A | 3/2018 |
| JP | 2018-39420 A | 3/2018 |
| JP | 2018-510805 A | 4/2018 |
| JP | 6384013 B1 | 9/2018 |
| WO | 2017/154474 A1 | 9/2017 |

OTHER PUBLICATIONS

Notice of Reasons for Refusal issued by the Japan Patent Office for corresponding Japanese Patent Application No. 2018-215948, dated Feb. 18, 2019, with an English translation.

* cited by examiner

AIRCRAFT AND AIRCRAFT CONTROL SYSTEM

CROSS-REFERENCE TO RELATED APPLICATIONS

This application is a Continuation of PCT/JP2019/044157, filed on Nov. 11, 2019, and which designated the U.S., which claims priority to Japanese Patent Application No. 2019-106717, filed on Jun. 7, 2019, Japanese Patent Application No. 2019-085317, filed on Apr. 26, 2019, and Japanese Patent Application No. 2018-215948 filed on Nov. 16, 2018. The contents of each are wholly incorporated herein by reference.

TECHNICAL FIELD

The present disclosure relates to an aircraft, and an aircraft control system.

BACKGROUND ART

In recent years, attempts have been made to deliver an object such as a parcel or a device by utilizing an aircraft such as a drone and an unmanned aerial vehicle (UAV). In addition, an aircraft control system has also been developed to deliver an object by utilizing an aircraft. In order to deliver an object safely in this aircraft control system, various structures for mounting a parcel on an aircraft have been proposed. For example, Patent Document 1 describes that a carriage in the form of a substantially rectangular parallelepiped is attached to the lower surface of the body portion of an aircraft via a connection mechanism. Further, Patent Document 2 describes that arms to grasp a container are disposed on the side portions of the base portion of an aircraft.

In general, the aircraft is susceptible to wind, and the posture of the aircraft may be inclined during operation, such as during forward movement.

In this regard, Patent Document 3 describes that the mounting unit that mounts a parcel to a drone has a structure that always holds a predetermined direction (e.g., vertically downward), and maintains the position and the orientation of the parcel for example. Specifically, the mounting unit has a hinge (gimbal), and is configured to cause the parcel to bend at the hinge, serving as a fulcrum, in accordance with the inclination of the aircraft.

RELATED ART DOCUMENTS

Patent Literature

[Patent Document 1] Japanese Laid-open Patent Publication No. 2018-39420
[Patent Document 2] Japanese Patent No. 6084675
[Patent Document 3] Japanese Patent No. 6384013

SUMMARY

As the above, in delivering of an object such as a parcel through the use of an aircraft, a demand has arisen for properly fixing the object and also controlling the posture of the object while flying.

With the foregoing problems in view, one of the objects of the present disclosure is to provide an aircraft that can enhance the stability of object while flying. Another of the objects is to provide an aircraft control system that can enhance the stability of object while flying. In addition to the above object, an advantageous effect that is derived from each configuration shown in the following detailed modes to carry out the present disclosure and which is not obtained by the conventional technique can be regarded as another object of the present disclosure.

(1) The aircraft of the present disclosure includes: a first frame body that comprises an attaching unit on an upper portion thereof, that is formed into a frame-shape structure, and that couples an object to a lower portion thereof, the attaching unit being configured to be capable of adjusting a position in an up-down direction of the attaching unit; a main body that is positioned on an upper portion of the first frame body and that comprises a flying mechanism; and a control unit that controls a position in the up-down direction of the attaching unit such that a flying posture of the object is controlled in accordance with a posture of the flying mechanism.

(2) It is preferable that the control unit controls the position in the up-down direction of the attaching unit such that the flying posture of the object is horizontally maintained.

(3) It is further preferable that the object is another frame body comprising a mounting surface that mounts a load thereon.

(4) A system for controlling an aircraft of the present disclosure includes the aircraft; and a controller that controls the aircraft. The control unit of the aircraft carries out flight control that controls working of the flying mechanism, and the aircraft further comprises a first communication unit that wirelessly communicates with the controller. The controller is characterized by including a second communication unit that wirelessly communicates with the aircraft.

Since the present disclosure has a structure that carries out flying posture control that controls the flying posture of an object coupled to a lower portion of the first frame body, the stability of the flying posture of the object such as parcel is enhanced.

DETAILED DESCRIPTION

Figure 1:
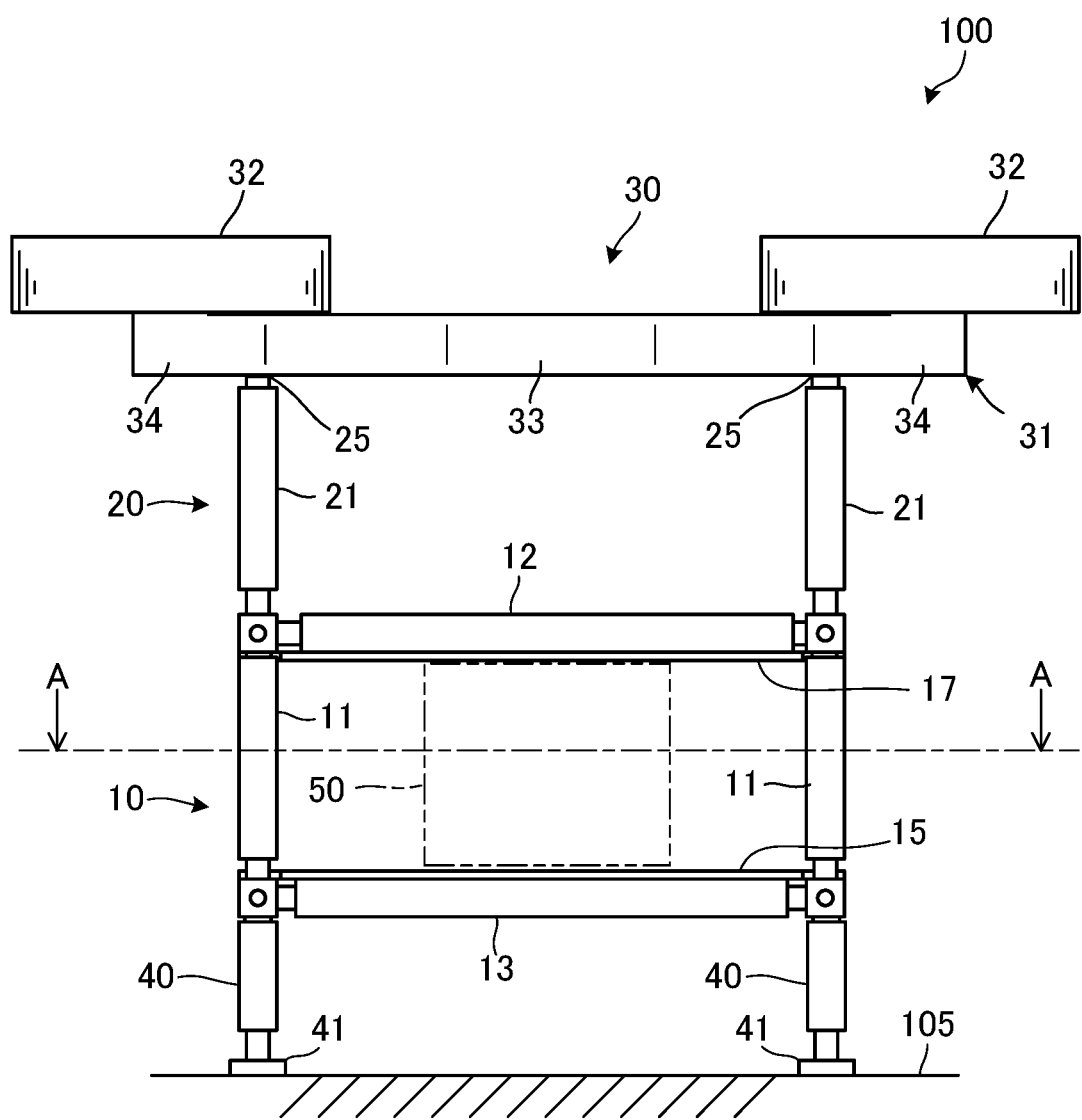
FIG. 1 is a side view of an aircraft according to the present embodiment.
Figure 1:
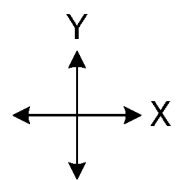

Hereinafter, embodiments of the present disclosure will now be described with reference to the accompanying drawings.

Each following embodiment is merely example, and there is no intention to eliminate the application of various modifications and techniques not explicitly described therein. Each configuration of the following embodiments can be implemented with various modifications without departing from the scope thereof, can be selected or omitted as necessary, or can be appropriately combined.

Further, each of the drawings can include additional components not illustrated therein to the elements illustrated in the drawing. Hereinafter, in the drawings, same reference numbers designates the same or similar parts, unless otherwise specified.

I. Aircraft

First Embodiment

1. Overall Configuration

Figure 2:
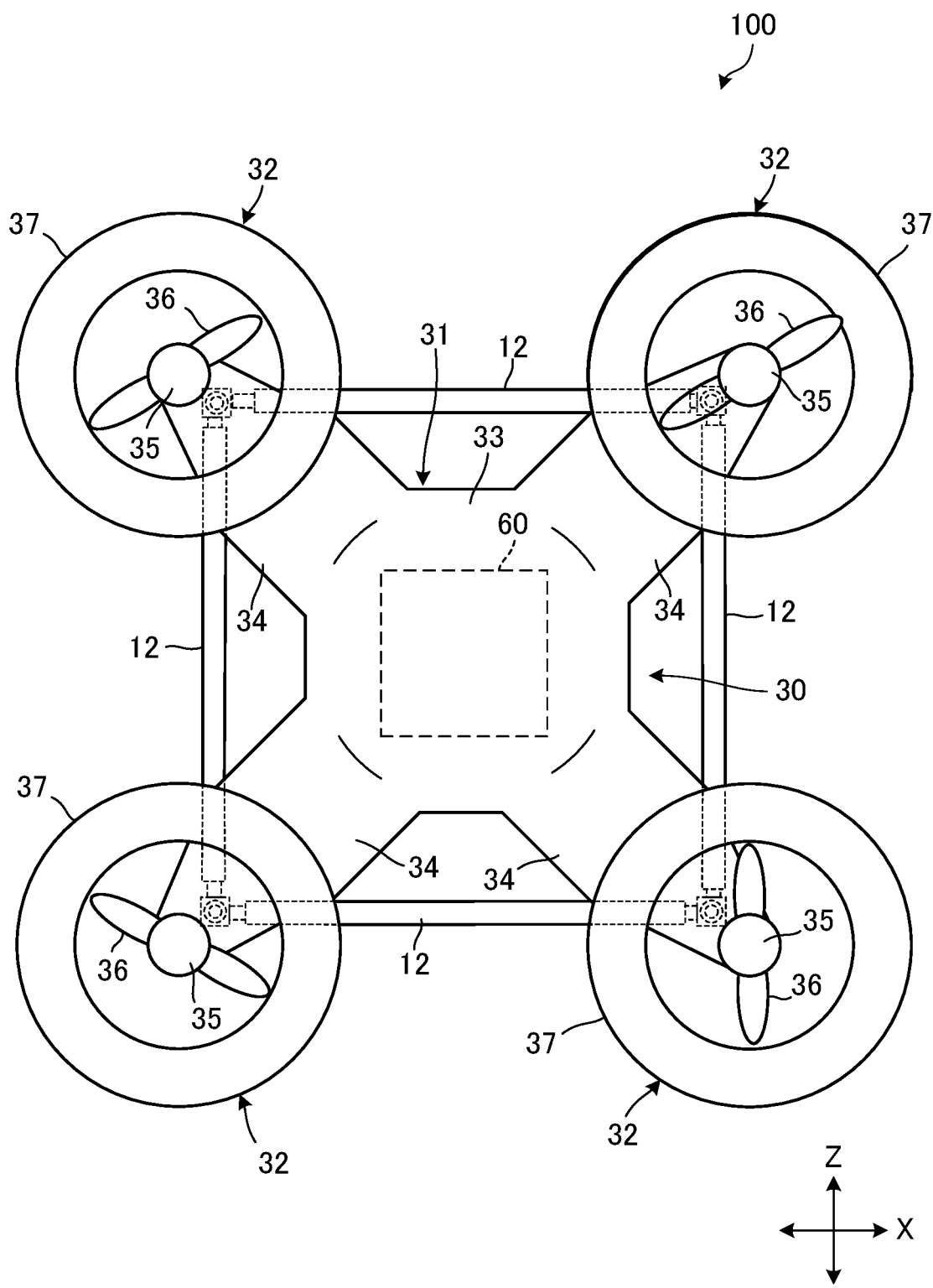
FIG. 2 is a plan view showing the aircraft shown in FIG. 1 as viewed from above.

FIG. 1 is a side view illustrating the overall structure of an aircraft 100 according to the first embodiment, and FIG. 2 is a plan view of the aircraft 100 as viewed from above. The aircraft 100 of the present embodiment is an unmanned aircraft (so-called drone), is intended to deliver a parcel 50 (indicated by a two-dot chain line) mounted on a first frame body 10 (corresponding to "second frame body" described in the claims) by flight. Throughput this specification, the parcel 50 is a load mounted on the first frame body 10, and is a target for the delivery. The term "flying" refers to moving in space three-dimensionally. In each of the following drawings, the direction of both arrows X is the left-right direction, the direction of both arrows Y and the up-down direction, the direction of both arrows Z and the depth direction (front-rear direction). Since FIG. 1 shows the aircraft 100 being in a state of landing on a horizontal landing surface 105, the up-low direction coincides with the vertical direction and the front-rear direction and the left-right direction coincide with the horizontal direction.

The aircraft 100 is provided with a first frame body 10 mounted with a parcel 50, a second frame body 20 (corresponding to the "first frame body" described in the claims) attached to the upper portion of the first frame body 10, and a main body 30 attached to the upper portion of the second frame body 20. The main body 30 is positioned on the upper portion of the second frame body 20 and has a flying mechanism 31 for flying the aircraft 100.

The second frame body 20 is a frame-shape structure having an attaching unit 25 at the upper portion thereof and being configured to be capable of adjusting the position in the up-down direction of the attaching unit 25. The main body 30 is coupled to the upper portion of the second frame body 20 through the attaching unit 25. An object is coupled to the lower portion of the second frame body 20. The second frame body 20 functions as a posture adjusting mechanism that controls the flying posture of an object coupled to the lower portion thereof by adjusting the position in the up-down direction of the attaching unit 25.

The object coupled to the lower portion of the second frame body 20 in FIG. 1 is a first frame body 10. The first frame body 10 has a mounting surface 15 for mounting the parcel 50 on its lower portion and functions as a mounting mechanism (i.e., a carrier) for fixing the loaded parcel 50 on the mounting surface 15.

On the upper portion of the first frame body 10, the pressing surface 17 arranged so as to face the mounting surface 15 is provided. The pressing surface 17 is attached so as to be movable in the up-down direction, and exert a function of depressing the parcel 50 mounted on the mounting surface 15 from above.

The second frame body 20 is configured to include multiple second struts 21 (corresponding to the "struts" described in the claims) extending in the up-down direction, and the attaching unit 25 is provided on the upper end of each of the second struts 21. Each of the second struts 21 is a telescopic pipe body having an outer pipe and an inner pipe contained in the outer pipe, and is extendable and contractible in the up-low direction (axial direction of the second strut 21). The position in the up-low direction of each of the attaching units 25 is adjusted by extending and contracting of each of the second struts 21.

The first frame body 10 is configured to include multiple first struts 11 (corresponding to the "strut members" described in the claims) rising from the upper surface of the mounting surface 15, and is coupled to the lower surface of the second frame body 20 at the respective upper ends of the first struts 11. Each of the first struts 11 is formed of a telescopic pipe body having an outer pipe and an inner pipe contained in the outer pipe, and is extendable and contractible in the up-low direction (axial direction of the first strut 11).

The pressing surface 17 is attached to the respective upper ends of the first struts 11 and is movable in the up-low direction in conjunction with the extension and contraction of the first struts 11. That is, the first struts 11 are interposed between the mounting surface 15 and the pressing surface 17, and support the pressing surface 17 at a predetermined position of the up-low direction. The distance between the mounting surface 15 and the pressing surface 17 is adjusted by moving the pressing surface 17 in the up-low direction.

Further, multiple legs 40 are provided so as to project downward from the lower portion of the first frame body 10. The multiple legs 40 are members that support the aircraft 100 when landing. Each of the legs 40 are attached to the lower end of the first frame body 10 at the upper end, and has a grounding unit 41 that grounds when the aircraft 100 lands at the lower end. Each of the legs 40 is also formed of a telescopic pipe body having an outer pipe and an inner pipe contained in the outer pipe, and is extendable and contractible in the up-low direction (axial direction of the leg 40). The multiple legs 40 function as an outrigger that stabilizes the landing posture of the aircraft 100 by extending or contracting each of the legs 40 in accordance with the landform (degree of inclination).

2. Detailed Structure

Next, description will now be made in relation to an example of a detailed structure of each part of the aircraft 100. First of all, description will now be made in relation to an example of a detailed structure of the main body 30. Then, description will be made in relation to an example of a detailed structure the first frame body 10, and the second frame body 20, the legs 40.

Flying Mechanism

The flying mechanism 31 of the main body 30 is of a multicopter type consisting of four rotary wings 32 disposed one to the tip of each of four arms 34 extending radially from the base 33 located in the center.

As shown in FIG. 2, the rotary wing 32 includes a rotary shaft 35 disposed along the vertical direction, two blades (propellers) 36 projecting radially from the rotary shaft 35, and a protective ring 37 provided on the outer periphery of these blades 36, and is connected to an electric motor driven by a non-illustrated battery. The power source of the electric motor is not limited to a battery, but may alternatively be a generator. Any type of a generator may be any applied and is exemplified by one using an engine as a power source, such as a generator, a photovoltaic generator, or a wind power generator. The driving source of the rotary wings 32 is not limited to an electric motor and may alternatively be any type exemplified by an internal combustion engine or a jet engine as far as it can drive the rotary wings 32.

When each of the rotary wings 32 is driven to rotate by a non-illustrated electric motor, the blades 36 rotate about the rotary shaft 35 to generate the propulsive force of the aircraft 100. This propulsion force takes off the aircraft 100 from the ground, moves the aircraft 100 vertically and horizontally in space, and lands the aircraft 100 on the ground. Each rotary wing 32 can be rotated in either a clockwise or counter-clockwise direction as viewed from above the aircraft 100.

Incidentally, the flying mechanism 31 of the multicopter type is a well-known technique. Further, for example, the specific structure of each rotary wing 32, such as the number of blades 36 provided thereto and the shape thereof, is not limited to that illustrated in the drawing and may alternatively be arbitrarily set. For example, the size of the blades 36 of each rotary wing 32 may be larger than the blades 36 shown in FIG. 2. Further, each rotary wing 32 may have a multi-rotor structure in which multiple sets of blades 36, e.g., two sets of blades 36, are coaxially arranged. For example, if each rotary wing 32 has two sets of blades 36 that are arranged coaxially and is configured as a double inverting rotor that rotates the sets of blades 36 in opposite directions to each other, this structure brings an advantage that counter torque can be offset as is well known.

Further, the flying mechanism 31 of the multicopter type is not limited to the flying mechanism of the quadcopter type having four rotary wings 32 as shown in FIGS. 1 and 2, and may alternatively be of a tricopter type flying mechanism having three rotary wings 32, or may be a flying mechanism having four or more rotary wings 32 such as a hexacopter type or an octocopter type. Incidentally, the flying mechanism is not limited to the multicopter type, may alternatively be of a tilt-rotor type (osprey type) to be described below or may be of a helicopter type.

Further, the frame of the flying mechanism 31 (i.e., the base 33 and the arms 34) may be formed in an assembly frame-like structure consisting of telescopic pipe bodies like the first struts 11, the second struts 21, and the legs 40, and joint blocks to be described below. This structure allows the flying mechanism 31 to freely change the size and the shape of the frame thereof.

Incidentally, an effort to enhance the lift can appropriately be paid, of course, to the specific structure of the flying mechanism 31, such the sizes and the shapes of the base 33 and the arms 34, the number of the rotary wings 32, or the size and the shape of each blade 36.

The flying mechanism 31 may have any shape and dimension. For example, the flying mechanisms 31 may be circular as viewed from above.

Control Unit

Inside the base 33, a control apparatus 60 (indicated by a broken line) that performs various controls including the control of the flight by the flying mechanism 31 is provided. The control apparatus 60 is a computer including a CPU (Central Processing Unit) (not shown), a storing device including a ROM (Read Only Memory) and a RAM (Random Access Memory), an input interface, an output interface, and a bus that connects them to one another. The storing device stores various control programs and the various data required to execute these control programs.

The control apparatus 60 performs flight control that controls the working of the flying mechanism 31, and also telescopic movement control on each first strut 11 of the first frame body 10, each second strut 21 of the second frame body 20, and each leg 40. The flight control includes various controls necessary to fly the aircraft 100, such as the rotation control on each of the four rotary wings 32. The flight control is achieved by well-known techniques as flight control on flying mechanism of a multicopter type. Details of the telescopic movement control of the first struts 11, the second struts 21, and the legs 40 will be described below. The flight control and the telescopic movement control are each provided as a software program executed using the hardware resource of the control apparatus 60.

Various peripheral devices necessary for performing the flight control and the telescopic movement control are connected to the control apparatus 60, and are exemplified by non-illustrated various sensors, a non-illustrated GPS device, a non-illustrated wireless communication device. Needless to say, the flying mechanism 31 and telescopic movement mechanisms (to be described below) for the first struts 11, the second struts 21, and the legs 40 which mechanisms serve as targets for the controls are each provided with a transmitter and/or a receiver that are communicable with the above wireless communication device.

The flight control is, for example, automatic operation control in which the control apparatus 60 autonomously or automatically controls flight of the aircraft 100 on the basis of the current position information obtainable by means of a known GPS function and the map information. Alternatively, the flight control may be remote control in which the control apparatus 60 controls the flight of the aircraft 100 on the basis of control remotely made from the user or a remote computer. The flight control may be a combination of automatic operation control and remote control.

Figure 3:
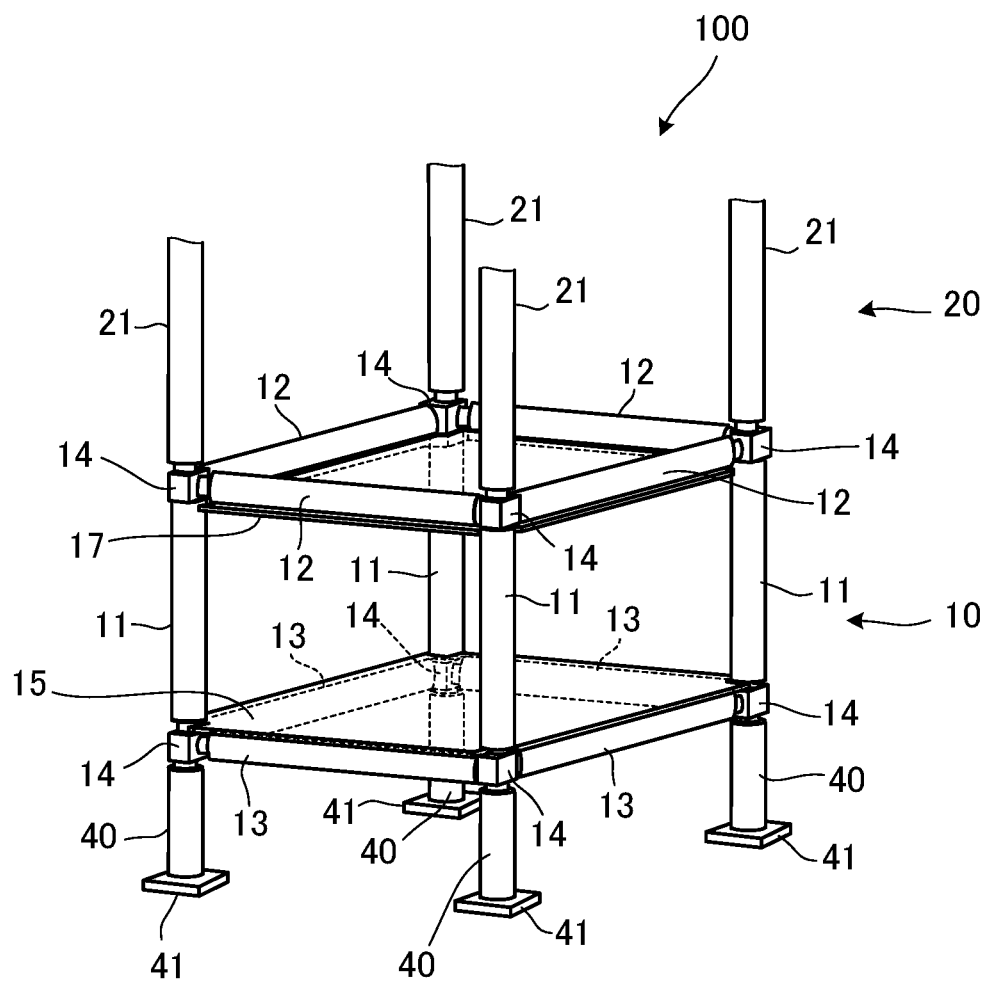
FIG. 3 is a perspective view of an aspect of the aircraft shown in FIG. 1, omitting a main body having a flying mechanism.
Figure 3:
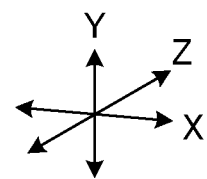
Figure 4:
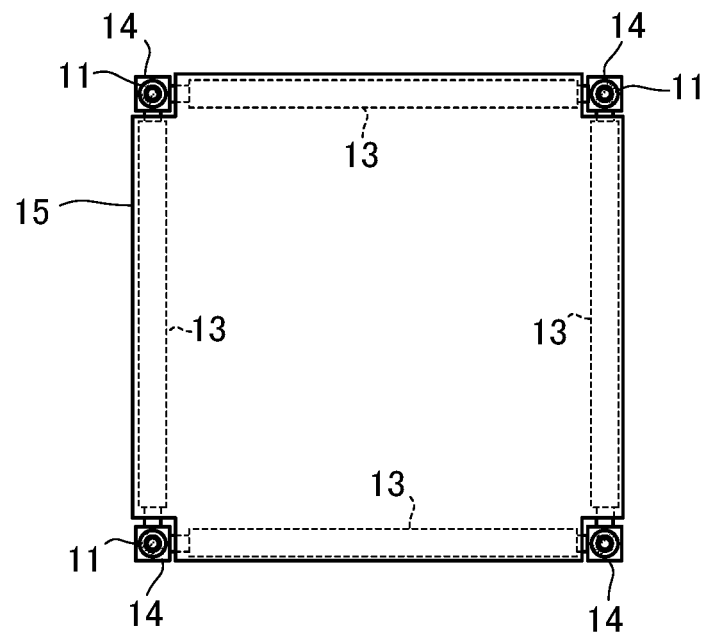
FIG. 4 is a plan view of a first frame body as viewed from a section cut along the line A-A of FIG. 1.

Next, description will now be made in relation to an example of a detailed structure the first frame body 10, and the second frame body 20, and the legs 40. FIG. 3 is a perspective view of an aspect of the aircraft 100. FIG. 3 omits illustration of the main body 30 including the flying mechanism 31 and the parcel 50. Further, FIG. 4 is a plan sectional view of the first frame body 10 cut along the line A-A of FIG. 1. FIG. 4 omits illustration of the parcel 50.

First Frame Body

The first frame body 10 is a frame-shape structure formed by coupling four first struts 11, four upper-end coupling rods 12, four lower-end coupling rods 13 into a cubic shape or a rectangular parallelepiped shape by eight joint blocks 14. Each of the first struts 11 is in the form of a telescopic pipe body as described above. Each of the upper-end coupling rods 12 and the lower-end coupling rods 13 is in the form of a pipe body. The joint blocks 14 are each coupling member that couples ends of pipes to each other.

The lower portion of the first frame body 10 is formed by four lower-end coupling rods 13 which are arranged in a rectangular shape in plan view. The joint blocks 14 are positioned one at each of these four corners the rectangular frame formed of the lower-end coupling rods 13, which are coupled to one another by these joint blocks 14. On the upper surfaces of these joint blocks 14, the lower ends of the first struts 11 are coupled. The lower ends of these first struts 11 are coupled to each other by the four lower-end coupling rods 13.

The rectangular frame formed of the lower-end coupling rods 13 serves as a lower face portion of the first frame body 10, and the mounting surface 15 is provided on the upper surface of the rectangular frame. The mounting surface 15 is made of a plate member covering the entire surface of the lower face portion of the first frame body 10, and the top face of the mounting surface 15 serves as a mount to mount the parcel 50. A non-illustrated a reinforcing rib may be provided on the back face of the mounting surface 15, so that a heavy object can be mounted. Alternatively, the mounting surface 15 may be provided on the lower surface of the rectangular frame formed of the lower-end coupling rods 13.

The upper portion of the first frame body 10 is formed by four upper-end coupling rod 12 which are arranged in a rectangular shape in plan view. The joint blocks 14 are positioned at the four corners the rectangular frame formed of the upper-end coupling rods 12, which are coupled to one another by these joint blocks 14. The upper ends of the first struts 11 are coupled to the respective lower surfaces of these joint blocks 14. The upper ends of the first struts 11 are connected to each other by four upper-end coupling rods 12.

The rectangular frame formed of the upper-end coupling rods 12 serves as an upper face portion of the first frame body 10, and the pressing surface 17 is provided on the lower face of the rectangular frame. The pressing surface 17 is made of a plate member covering the entire surface of the upper face portion of the first frame body 10. The parcel 50 (see FIG. 1) is sandwiched between the lower surface of the pressing surface 17 and the upper surface of the mounting surface 15. Alternatively, the pressing surface 17 may be provided on the upper surface of the rectangular frame formed by the four upper-end coupling rods 12.

The mounting surface 15 and the pressing surface 17 are not limited to plate members covering the entire face of the respective rectangular frames, and may alternatively be formed of plate members that partially cover the rectangular frame. Further, the mounting surface 15 and the pressing surface 17 are each not limited to a single plate member that solely covers the face and may alternatively be a mesh member, a lattice-like member made of multiple square members or plate members disposed intersecting each other, or a fence-like member made of multiple square members or plate members arranged parallel to each other. In short, the mounting surface 15 and the pressing surface 17 may be formed into any shape, size and may also be formed of any material as far as the surfaces can mount the parcel 50 and presses the parcel 50 from above.

The shapes of the rectangular frame formed by the upper-end coupling rods 12 or the lower-end coupling rods 13 may be any shapes such as triangles, pentagons, hexagons, and circles.

<Second Frame Body>

To the respective upper surfaces of the joint blocks 14 disposed at the four corners of the upper face portion of the first frame body 10, the lower ends of the second struts 21 are coupled. The second struts 21 are erected upward from the respective joint blocks 14, and the main body 30 is adapted to be attached to the upper ends of the second struts 21 via the attaching units 25. These second struts 21 form the second frame body 20.

Leg

Further, each of the lower surfaces of the joint blocks 14 disposed at the four corners of lower face portion of the first frame body 10, the upper end of the leg 40 is coupled. The legs 40 are erected downward from the respective joint blocks 14 and are each provided with the grounding unit 41 at the lower end.

Pipe Body

Next, description will now be made in relation to the structure of the pipe bodies forming the first frame body 10, the second frame body 20, and the legs 40. Among the pipe bodies, the first strut 11, the second strut 21, and the leg 40 are each formed of a telescopic pipe body. First, description will now be made in relation to an example of the structure of a telescopic pipe body, first and then an example of the upper-end coupling rod 12 and the lower-end coupling rod 13.

The four first struts 11 are set to have the same dimension, the four second struts 21 are set to have the same dimension, and the four legs 40 are set to have the same dimension. Further, the first struts 11, the second struts 21, and the leg 40 may be set to the same dimension as each other, or may be set to different dimensions from each other. For example, in the first frame body 10 shown in FIG. 1, the first struts 11 and the second struts 21 are set to the same dimension, and the legs 40 are set to be shorter than the first struts 11 and the second struts 21.

First Strut

Figure 5:
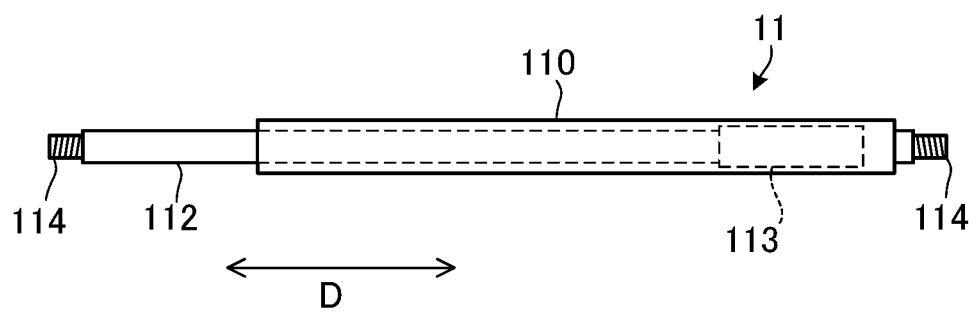
FIG. 5 is a side view showing a pipe body to be used as a first strut, a second strut, an upper-end coupling rod, a lower-end coupling rod, and a leg.

FIG. 5 is a side view of the first strut 11. The first strut 11 has an outer pipe 110 and an inner pipe 112. Each of the outer pipe 110 and the inner pipe 112 is a hollow pipe body made of a square pipe or a round pipe, and the inner pipe 112 is contained in the outer pipe 110. At the both ends of the first strut 11, a male screws 114 are provided to serve as means for being coupled to the joint block 14.

The outer pipe 110 incorporates therein an actuator 113 for moving the inner pipe 112. The actuator 113 is, for example, an electric motor driven by a non-illustrated battery. The actuator 113 is connected to the inner pipe 112 via a conversion mechanism (not shown) that converts rotational motion of the electric motor into linear motion in the axial direction of the first strut 11.

Description will now be made in relation to an example of the conversion mechanism having a structure formed of a male screw and a female screw. The rotation shaft of the electric motor is coaxially arranged with the first strut 11 and the male screw part is formed on the rotation shaft. A female screw part screwed with the male screw body is formed on the inner peripheral face of the inner pipe 112. When the male screw part rotates in conjunction with the rotation of the electric motor, the rotational motion of the male screw part is converted into linear motion in the axial direction by the female screw part, and the inner pipe 112 moves in the axial direction (the direction of the arrow D).

The actuator 113 is connected to a non-illustrated battery, is wirelessly and communicably connected to the control apparatus 60 (see FIG. 2) and operates in response to receipt of a control signal from the control apparatus 60. The inner pipe 112 is moved in the axial direction (the direction of the arrow D) in the outer pipe 110 by the operation of the actuator 113, so that the first strut 11 is extended and contracted in the axial direction (the direction of the arrow D) as a whole. That is, a mechanism that the actuator 113 moves the inner pipe 112 in the axial direction through the conversion mechanism constitutes a "telescopic movement mechanism".

The conversion mechanism is not limited to the above, and alternatively may apply a well-known conversion mechanism, such as a rack-pinion mechanism, for converting the rotational motion into linear motion. The configuration of the telescopic movement mechanism is not limited to the structure that converts the rotational motion of the actuator into linear motion by the conversion mechanism. For example, a solenoid having a mover that makes linear motion in the axis direction or a fluid cylinder having a piston rod that makes linear motion in the axis direction may be used as the actuator 113. In that alternative, no conversion mechanism is required.

Second Strut

Each of the second strut 21 is the same as the first struts 11 shown in FIG. 5 in the points of being formed of a telescopic pipe body made of a square pipe or round pipe and being configured to be telescopically movable in the axis direction by the actuator 113 incorporated, but has a different shape from that of the first struts 11 since the each second strut 21 is not coupled to the joint block 14 at the upper end. Incidentally, the illustration of the pipe body used as the second strut 21 is omitted.

The upper end of each of the second strut 21 is provided with the attaching unit 25 (see FIG. 1) to the main body 30 in place of the male screw 114. The attaching unit 25 is constituted by, for example, a pivot joint (ball joint). A ball joint consists of a spherical portion formed on the upper end of the second strut 21 and a recess portion which is recessed on the lower surface side of the base 33 (body portion 30) and is fitted to the spherical portion. The ball joint allows the main body 30 to three-dimensionally swing relative to the second strut 21 about each of the axes of the front-rear direction, left-right direction, and the up-down direction.

The attaching unit 25 may further have a detachable latch mechanism (attachment) that detachably latches the upper end of the second strut 21 on the main body 30. In this case, under a state where the second frame body 20 is bound to the main body 30, the second strut 21 is swingably bound to the main body 30 by a ball joint, and when the second frame body 20 is to be separated (removed) from the main body 30, the second frame body 20 can be freely, simply, and easily detached from the main body 30 by the presence of the attachment.

Leg

Further, each of the legs 40 is the same as the first struts 11 shown in FIG. 5 in the points of being formed of a telescopic pipe body made of a square pipe or round pipe and being configured to be telescopically movable in the axis direction by the actuator 113 incorporated, but has a different shape from that of the first struts 11 since not being coupled to the joint block 14 at the lower end. Here, the illustration of the pipe body used as the leg 40 is omitted.

The lower end of the leg 40 is provided with a coupling unit that is coupled to the grounding unit 41 (see FIGS. 1 and 3). An example of the coupling unit is a ball joint. This structure allows the grounding unit 41 to swing three-dimensionally with respect to the leg 40 when the airplane 100 is landing.

Upper-End Coupling Rod, Lower-End Coupling Rod

Each of the four upper-end coupling rods 12 and the four lower-end coupling rods 13 is a single pipe body made of a square pipe or round pipe and are provided with the male screws for screwing with a female screws 141 of the joint block 14 at the both ends.

As another example, each of the four upper-end coupling rods 12 and the four lower-end coupling rods 13 may be formed into a telescopic pipe body and may be configured to be capable of telescopically movable in the axial direction by an incorporated actuator like the first struts 11, the second struts 21, and the legs 40. In this alternative, it is possible to change the size and shape of the upper face portion and the lower face portion of the first frame body 10 by telescopic movement of each of the upper-end coupling rods 12 and each of the lower-end coupling rods 13.

Joint Block

Figure 6:
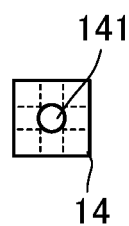
FIG. 6 is a side view showing the structure of a joint block.

FIG. 6 is a side view of the joint block 14. The joint block 14 has a regular hexahedral shape, and have female screws 141 on all the six sides. Each of the female screws 141 is a screw hole that screws with the male screw 114 provided at both ends of the first strut 11. By screwing the male screw 114 with the female screw 141, the first strut 11 is coupled to the joint block 14.

The shape of the joint block 14 is not limited to a regular hexahedral shape, but may be any shape. Examples of the shape of the joint block 14 are prisms having bottoms in an arbitrary form such as a pentagon or a hexagon, a column, and a sphere. The joint blocks 14 having various shapes can be used in combination.

3. Telescopic Movement Control

Next, description will now be made in relation to the telescopic movement control on the first strut 11, telescopic movement control on the second strut 21, and telescopic movement control on the leg 40 each of which control is performed by the control apparatus 60. The telescopic movement control described below is performed by the control apparatus 60 giving a control signal to the actuator 113 incorporated in each of the individual first struts 11, the second struts 21, or the legs 40 to control its working.

First Strut

Figure 7A:
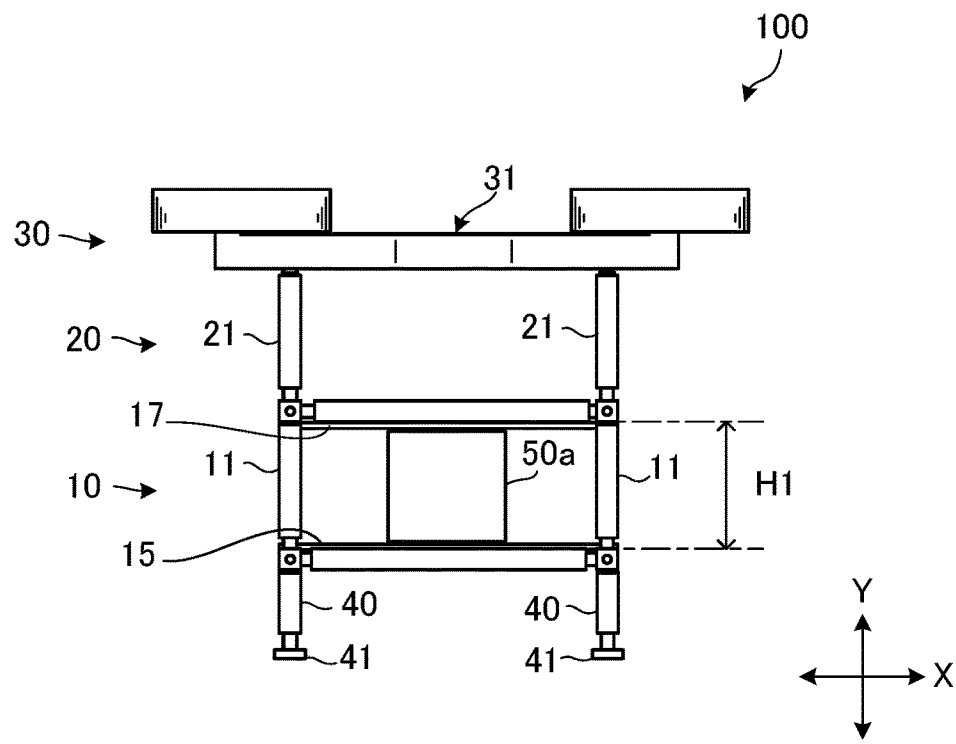
FIG. 7A is a side view showing the telescopic movement control on the first strut, illustrating a state of contracting the first strut.
Figure 7B:
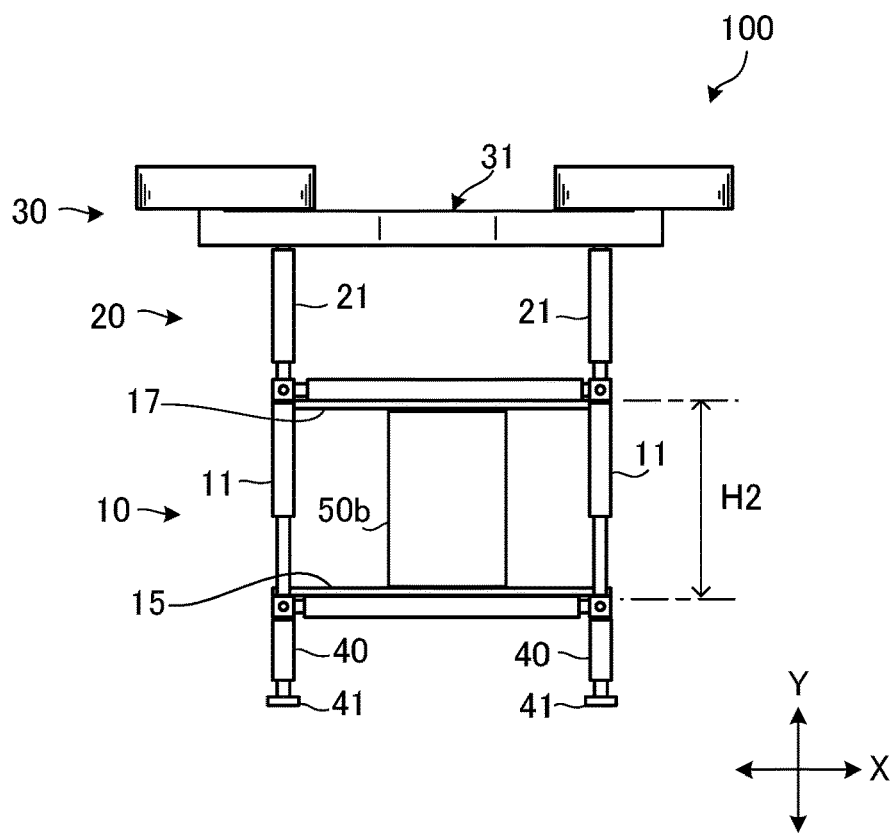
FIG. 7B is a side view showing the telescopic movement control on the first strut, illustrating a state of stretching the first strut.

First of all, description will now be made in relation to the telescopic movement control performed on the first strut 11 to sandwich the parcel 50 between the depressing surface 17 and the mounting surface 15 when the parcel 50 is mounted onto the aircraft 100. FIGS. 7A and 7B are side views illustrating the telescopic movement control on the first strut 11; FIG. 7A illustrates an example of a case where the parcel 50a having a certain height is mounted, and FIG. 7B illustrates an example of a case where the parcel 50b having a larger height than that of the parcel 50a is mounted.

An example of a procedure of the telescopic movement control on the first strut 11 is as follows. The control apparatus 60 (see FIG. 2) first extends each first strut 11 of the first frame body 10 to the maximum length, and then contracts each first strut 11 in the axial direction. In conjunction with the contraction of each first strut 11, the pressing surface 17 is moved downward to abut the upper portion of the parcel 50. When the abutting is detected by a non-illustrated sensor, the control apparatus 60 (see FIG. 2) stops the telescopic movement control on each first strut 11. Consequently, as shown in FIGS. 7A and 7B, the length of each first strut 11, i.e., the heights H1, H2 of the first frame body 10, is set to the heights of the mounted parcel 50a, 50b (i.e., the heights at which the pressing surface 17 abuts the upper portion of the parcels 50a, 50b).

Since the position of the pressing surface 17 is lowered to a position abutting the upper portion of parcel 50a, 50b, the parcels 50a, 50b are sandwiched between the pressing surface 17 and the mounting surface 15, so that the clamping force makes it possible to fix the parcels 50a, 50b on the mounting surface 15.

Thus, simply performing the telescopic movement control on the first struts 11 constituting the first frame body 10 moves the pressing surface 17 in the up-low direction to sandwich the parcel 50 by the pressing surface 17 and the mounting surface 15 so that the parcel 50 can be properly fixed to the first frame body 10. The strength of the force (clamping force) for fixing the parcels 50a, 50b is adjustable by the amount of telescopic motion of each first strut 11 (in other words, the amount of movement in the up-low direction of the pressing surface 17). The telescopic movement control on the first strut 11 corresponds to "control the telescopic motion of the plurality of strut members such that the load is sandwiched between the pressing surface and the mounting surface".

Second Strut

Next, description will now be made in relation to the telescopic movement control on the second struts 21. The telescopic movement control on the second struts 21 is a control (flying posture control) performed to maintain the flying posture of the first frame body 10 horizontally while the aircraft 100 is flying.

Figure 8:
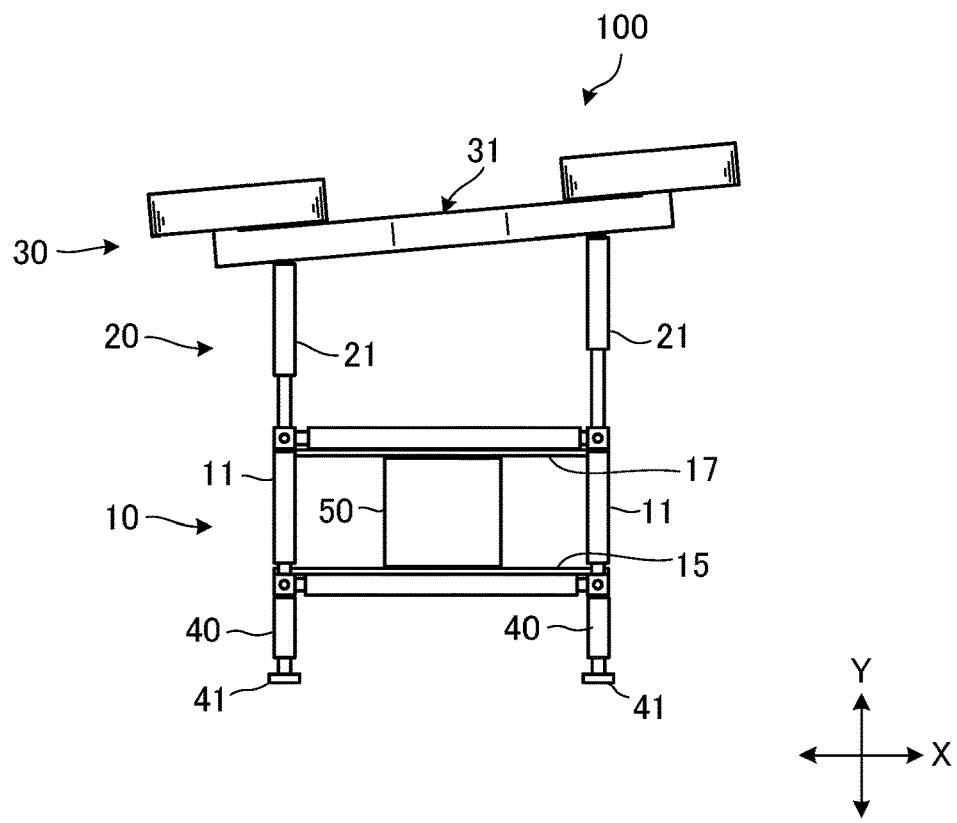
FIG. 8 is a side view showing the telescopic movement control on the second strut.

FIG. 8 is a side view showing the telescopic movement control on the second struts 21. A traditional flying mechanism of the multicopter type, a control which autonomously maintains the posture horizontally during the flight is carried out. The main body 30 of the present embodiment, (the flying mechanism 31) also has a function of autonomously maintaining the posture of the flying mechanism 31 itself horizontally. However, the aircraft 100 may be temporarily inclined due to, for example, wind or its own driving status. For this reason, it is desirable to control the flying posture of the first frame body 10 independently of the control on the posture of the flying mechanism 31. In this specification, the "flying posture" of the first frame body 10 is the posture of the first frame body 10 in the aircraft 100 in flight.

The telescopic movement control on the second strut 21 is performed by the following procedure, for example. The control apparatus 60 (see FIG. 2) firstly detects an inclination of the posture of the aircraft 100 (in detail, the flying mechanism 31 of the main body 30) by using the sensor. Next, the control apparatus 60 performs the telescopic movement control on each individual second strut 21 in accordance with the detected inclination of the flying mechanism 31. The telescopic movement control is the control that adjusts the dimension in the up-low direction of each second strut 21 (in other words, the length of each second strut 21) such that the inclination of the flying mechanism 31 is absorbed.

Since this control adjusts the position in the up-low direction of the attaching unit 25 with respect to the upper face of the first frame body 10, the flying posture of the first frame body 10 is maintained horizontally, irrespective of the inclination of the flying mechanism 31. Incidentally, the inclination of the posture of the flying mechanism 31 is the inclination of the aircraft 100 with respect to the horizontal plane (rotation angle around the X-axis and rotation angle around the Z-axis).

FIG. 8 illustrates an example of a case where the flying mechanism 31 is inclined in such a posture that the left side of the drawing come lower than the right side of the drawing. In this case, among the four second struts 21, the posture of the first frame body 10 can be maintained horizontally by setting the length of the two second struts 21 located on the left side of the drawing to be shorter than the two second struts 21 located on the right side of the drawing.

As the above, by performing the telescopic movement control on each individual of the four second struts 21 disposed between the main body 30 (flying mechanism 31) and the first frame body 10, the flying posture of the first frame body 10 can be maintained horizontally even when the flying mechanism 31 is inclined. Consequently, the parcel 50 can be transported in a stable posture. The telescopic movement control on the second struts 21 corresponds to "control the telescopic motion of the multiple struts to control the flying posture of the object".

The above telescopic movement control on the second struts 21 described above can also be regarded as a control (flying posture control) that adjusts the position in the up-low direction of the attaching unit 25 in order to control the flying posture of the first frame body 10 (object) in accordance with the posture of the flying mechanism 31. In that case, the telescopic movement control (flying posture control) on the second strut 21 performed by the control apparatus 60 is not limited to the control to maintain the flying posture of the first frame body 10 horizontally, and may alternatively be a control to tilt the flying posture of the first frame body 10 at an arbitrary angle. That is, the flying posture control is a control that adjusts the flying posture of the first frame body 10 to an arbitrary angle and maintains the adjusted angle (flying posture).

Leg

Figure 9:
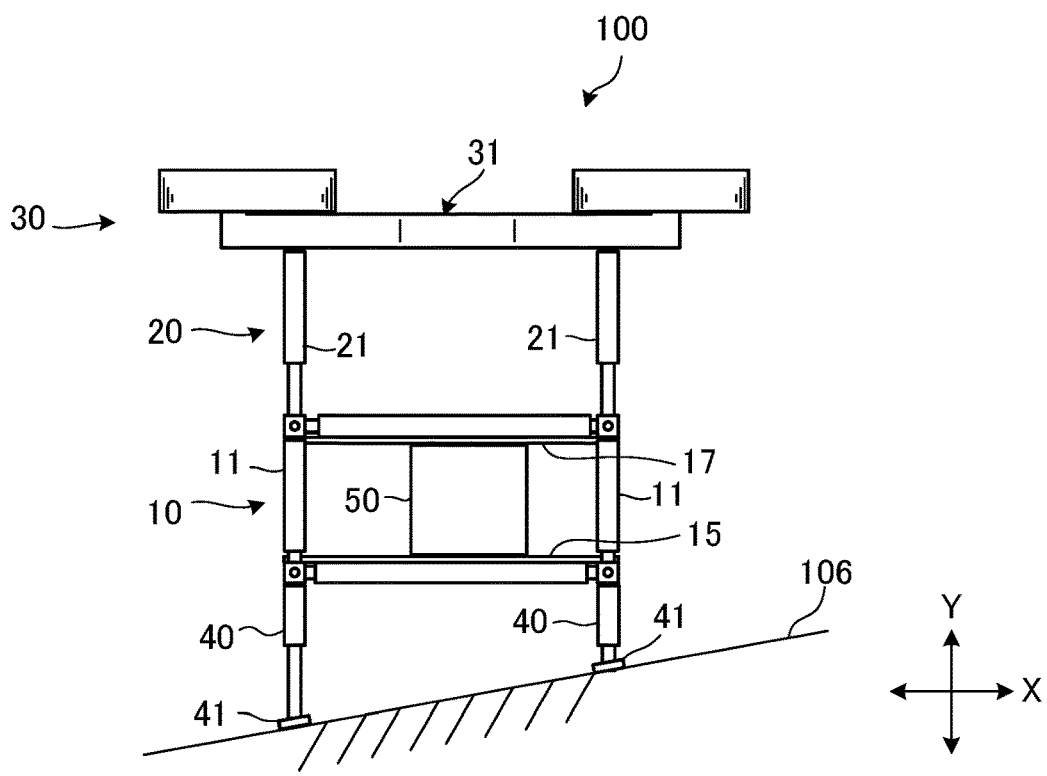
FIG. 9 is a side view showing the telescopic movement control on the leg.

Next, description will now be made in relation to the telescopic movement control on the leg 40. The telescopic movement control on the legs 40 is performed to maintain the posture of the first frame body 10 horizontally during the aircraft 100 is landing. FIG. 9 is a side view showing the telescopic movement control on the leg 40.

The control apparatus 60 (see FIG. 2) performs the telescopic movement control on the four legs 40 independently of one another in accordance with the landform of the landing site when the aircraft 100 is landing. Specifically, the control apparatus 60 (see FIG. 2) detects the distance between the grounding unit 41 of each leg 40 and the landing surface by using, for example, a distance sensor or the like, and performs the telescopic movement control on the leg 40 in accordance with the detected distance. The amount of telescopic movement of each leg 40 is determined, for example, according to the height difference of the point where the ground unit 41 of the individual legs 40 is grounded.

FIG. 9 illustrates an example of a case where the aircraft 100 is landing on a tilt surface 106 that downward declines from the right side to the left side of the drawing. In this case, among the four legs 40, the length of the two legs 40 located on the left side of the drawing are set to be shorter than the two legs 40 located on the right side of the drawing. This makes it possible to maintain the posture of the first frame body 10 horizontally when the aircraft 100 is landing on the tilt surface 106.

Thus, by performing the telescopic movement control on the legs 40 at the time the aircraft 100 is landing, for example, it is possible to land the aircraft 100, maintaining the posture of the first frame body 10 horizontally, irrespective of the landform condition such as a tilt surface. The telescopic movement control of the legs 40 corresponds to "controlling the telescopic movement of multiple legs in accordance with to the landform of the landing site".

4. Action and Effects of First Embodiment

According to the aircraft 100 of the embodiments described above, the first frame body 10 has a mounting surface 15 for mounting the parcel 50, multiple telescopic first struts 11 which rise from the mounting surface and is stretchable and contractible, and the pressing surface 17 that faces the mounting surface 15 and is attached so as to be movable in the up-low direction in conjunction with telescopic motion of the multiple first struts 11. On the upper portion of the first frame body 10, the second frame body 20 made of multiple telescopically movable second struts 21 are attached. On the upper portion of the second frame body 20, the main body 30 having a flying mechanism 31 is attached. In the above structure, the control apparatus 60 performing the telescopic movement control on the multiple first struts 11 makes it possible to sandwich the parcel 50 by the pressing surface 17 and the mounting surface 15, so that the parcel 50 can be fixed to the first frame body 10. This eliminates the need to install a fastener to secure the parcel 50. Further, by sandwiching the parcel 50 by the pressing surface 17 and the mounting surface 15, it is possible to effectively suppress the collapse of the parcel 50 mounted on the first frame body 10. Further, the control apparatus 60 performing the telescopic movement control on the multiple second struts 21 in accordance with the posture of the flying mechanism 31 makes it possible to maintain the flying posture of the first frame body 10 horizontally. Therefore, it is possible to deliver the parcel 50 mounted on the first frame body 10, keeping the parcel 50 in an appropriate posture. That is, with a simple structure formed of the first frame body 10 and the second frame body 20 made of telescopic pipe bodies, the parcel 50 can be appropriately fixed and the posture of the first frame body 10 during flight can be controlled.

Further, the first frame body 10 and the second frame body 20 are a three-dimensional frame made of pipe bodies, which receive less air resistance during flight, so that flight efficiency is not reduced. Additionally, the structure that controls the flying posture of the first frame body 10 by the telescopic movement control on multiple second struts 21, for example, is superior to the related art that mounts the parcel to the aircraft through the hinge in the point that the flying posture of the first frame body 10 can be controlled to a desired posture.

Further, the aircraft 100 has multiple legs 40 being projected downward from the lower surface of the first frame body 10, each including the outer pipe and the inner pipe which is housed in the outer pipe, respectively, and being telescopic movable in the axis direction, and the control apparatus 60 controls the telescopic movement of the multiple legs 40 according to the landform of the landing. Therefore, not being restricted to the landform conditions of the landing site, the aircraft 100 can take off and land, being in a stable posture, at a landing site of any landform such as, for example, a slope.

In addition, since the first frame body 10 has a structure in which four first struts 11, four upper-end coupling rods 12, and four lower-end coupling rods 13 are coupled via eight joint blocks 14 and the second frame body 20 has a structure in which each of multiple second struts 21 are coupled to the joint blocks 14 attached to the respective upper ends of the multiple first struts 11, it is possible to easily change the size, expand, change the shape, and increase the number of frames of the first frame body 10 and the second frame body 20.

Further, since the aircraft 100 of the present embodiment is formed by assembling a group of components of the pipe bodies 11, 12, 13, 21, and 40 and the multiple joint blocks 14, each component can be re-assembled or replaced. By freely combining the number of components and the arrangement of the components, the shapes and the sizes of the first frame body 10, the second frame body 20, and the legs 40 can be freely changed. In addition, maintenance such as repairing and exchanging is easily carried out for each component.

Further, since the aircraft 100 is of the assembly type using a group of components of the pipe bodies 11, 12, 13, 21, and 40 and the multiple joint blocks 14, for example, multiple aircraft 100 can be coupled to each other by using the joint blocks 14 and the upper-end coupling rods 12 and the lower-end coupling rods 13.

In this case, the multiple aircraft 100 may be coupled in a circular shape in the horizontal direction, or coupled side by side in a horizontal direction, or can be arranged in a vertical direction. When multiple aircraft 100 are coupled side by side in the horizontal direction in a row, for example, it is possible to efficiently perform operations such as disinfect injection, water spraying, pesticide spraying, mowing in a large-scale agricultural land having a large area.

In the application of coupling multiple aircraft 100 side by side, multiple aircraft 100 fly in formation in cooperation with one another. In formation flight, multiple aircraft 100 communicate with each other to cooperatively control the flight of each other. To control flying of multiple aircraft in formation, any known technique in automatic driving of an automobile can be applied.

In the application in a type of flying in the formation, since the aircraft 100 is of the assembly type using a group of components of the pipe bodies 11, 12, 13, 21, 40 and the multiple joint blocks 14, the multiple aircraft 100 have advantages of high degree of freedom in the number and arrangement of the aircraft 100.

As the above, the aircraft 100 of the present embodiment is also characterized by forming the first frame body 10, the second frame body 20, and the leg 40 with a plenty of the pipe bodies 11, 12, 13, 21, and 40.

The flying mechanism 31, which adopts the multicopter type, is excellent in posture stability, and is suitable for delivery of the parcel 50.

The load (parcel 50) may be any article. In addition to the so-called parcel 50, other examples of the parcel are automobiles, buses, motorcycles, ships, boats, hovercrafts, rafts, submarines, snowmobiles, construction vehicles such as bulldozers and excavators, agricultural vehicles such as tractors and combine harvesters, industrial vehicles such as forklifts and unmanned transfer vehicles, various vehicles such as wheelchairs, agricultural work machines used for various agricultural operations and exemplified by pesticide spreaders and mowers. Further alternatively, the load may be a person or a living object, not limited to an article.

The parcel 50 as a load may be any object to be delivered, such as a container loaded with a parcel, a box, a cage, a vessel, or the like.

Second Embodiment

The aircraft of the present disclosure may be provided with various attachment mechanisms as exemplified in the following embodiments.

Winch of Main Body

Figure 10A:
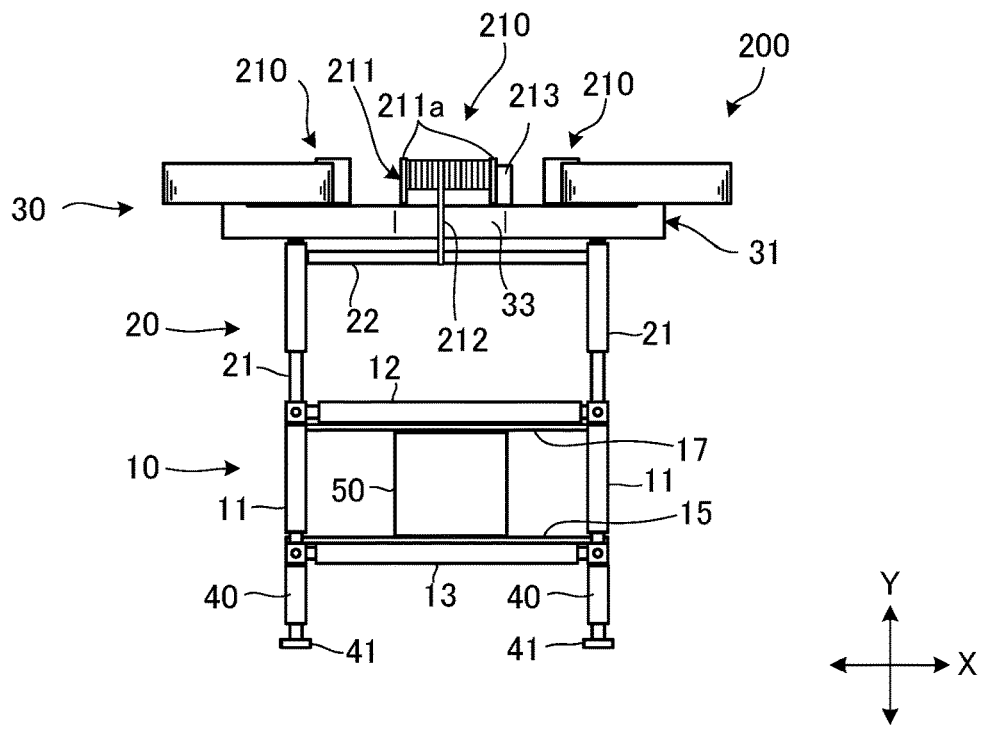
FIG. 10A is a side view illustrating the configuration of the aircraft according to a second embodiment, showing a state in which the second frame body is attached to the main body.
Figure 10B:
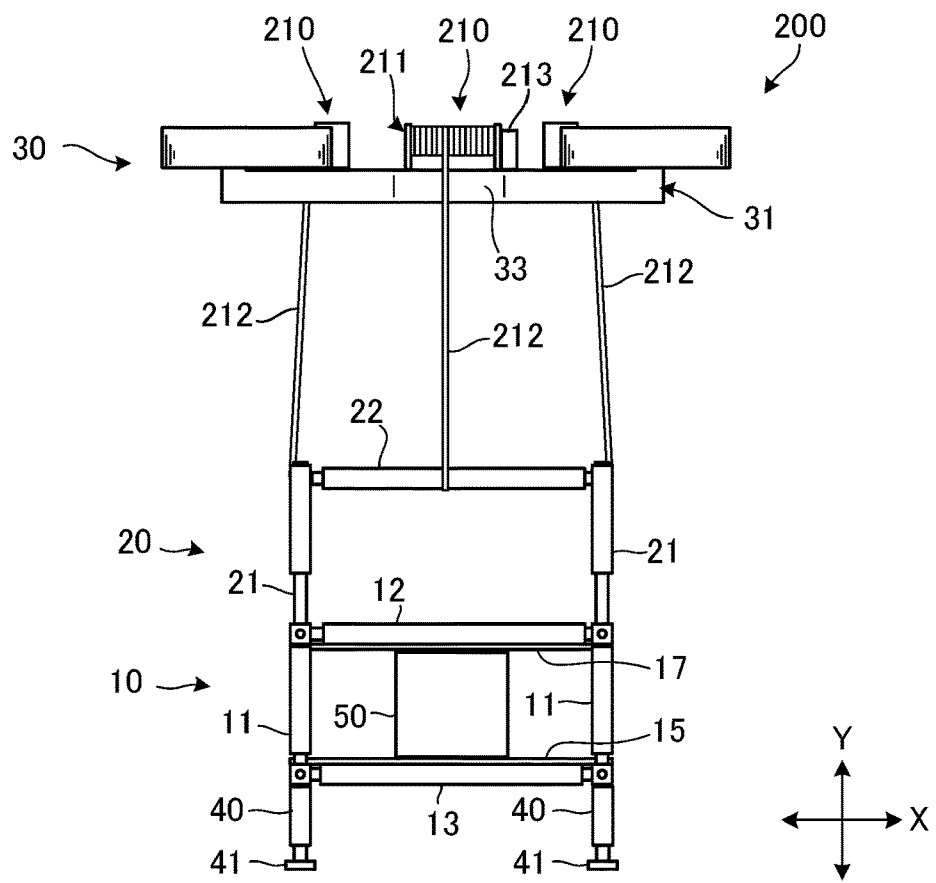
FIG. 10B is a side view illustrating the configuration of the aircraft according to the second embodiment, showing a state in which the second frame body is lowered away from the main body via a winch.

FIGS. 10A and 10B are side views showing an aircraft 200 according to a second embodiment. The elements already described with reference to FIGS. 1 to 9 are denoted by the same reference numerals as in FIGS. 1 to 9, and description thereof will be omitted. An aircraft 200 includes multiple winches 210 in the main body 30. The winch 210 is a lifting mechanism that raises and lowers the second frame body 20 separated from the main body 30 in the vertical direction.

The aircraft 200 shown in FIGS. 10A and 10B is provided with the winches 210 one to each of the four sides of the front, rear, left and right of the base 33 of the main body 30 (see FIG. 2). Each winch 210 consists of a rotatable drum 211, a cable 212 wound around the drum 211, and a driving apparatus 213 that rotates the drum 211. The driving apparatus 213 is an electric motor driven by, for example, a non-illustrated battery.

The drum 211 of each winch 210 is rotatably supported at both axial ends thereof by a pair of supporting frames 211a protruding from the upper surface of the base 33. Each winch 210 is arranged such that the axis of rotation of the drum 211 is parallel to the four sides of the base 33 (see FIG. 2). The cable 212 unwound from the drum 211 hangs down in the vertical direction from the main body 30. The cable 212 is, for example, a rope.

Between the respective upper ends of the second struts 21, four attaching rods 22 are attached to couple the cables 212. The attaching rods 22 are arranged in parallel with the upper-end coupling rods 12 coupling the respective lower ends of the second struts 21. To each attaching rod 22, one end of the cable 212 of the winch 210 provided above the rod 22 is coupled.

Next, description will now be made in relation to a lifting control on the second frame body 20 and the first frame body 10 using the winches 210. The attaching unit 25 is formed of a detachable latch structure (attachment), and the main body 30 and the second frame body 20 is detachably coupled to each other by the attachment. Detaching through attachments can be performed easily and simply.

Releasing of the coupling between the second frame body 20 and the main body 30 via the attachment is assumed to be automatically controlled by the control of the control apparatus 60 (see FIG. 2).

The control apparatus 60 controls the working of the driving apparatus 213 of each winch 210 in response to a remote control using, for example, a remote controller by the user to unwind the cable 212 from the drum 211, releasing the coupling between the second frame body 20 and the main body 30.

FIG. 10B shows a state in which the second frame body 20 and the first frame body 10 are separated from the main body 30 and are lowered during flight. As shown in FIG. 10B, while the main body 30 including the flying mechanism 31 is kept to wait in the sky, only the second frame body 20 and the first frame body 10 mounted with the parcel 50 are lowered.

When raising the lowered second frame body 20 and first frame body 10, the control apparatus 60 (see FIG. 2) controls the working of the respective driving apparatuses 213 of the winches 210 to wind the cables 212 around the drums 211 and thereby raise the second frame body 20 and the first frame body 10. Then, when the upper end of the second frame body 20 is raised to a position in contact with the lower surface of the main body 30, the control apparatus 60 (see FIG. 2) couples the second frame body 20 to the main body 30.

The structure in which only the second frame body 20 and the first frame body 10 mounted with the parcel 50 are lowered using the winches 210 as described above is suitable for a case where this aircraft 200 is applied to an agricultural purpose, for example, when an agricultural work machine such as an pesticide spreader is mounted as the parcel 50 on the first frame body 10. Alternatively, the aircraft 200 may of course be applied to other applications such as, for example, an architectural application and a forestry application. This is because, by making the main body 30 including the flying mechanism 31 wait in the sky, it is possible to suppress the influence on the crop caused by the wind pressure from the flying mechanism 31. The working control of the driving apparatus 213 of each winch 210 described above corresponds to "controlling operation of the driving apparatus such that the cable is unwound from the drum and wound by the drum".

Figure 11A:
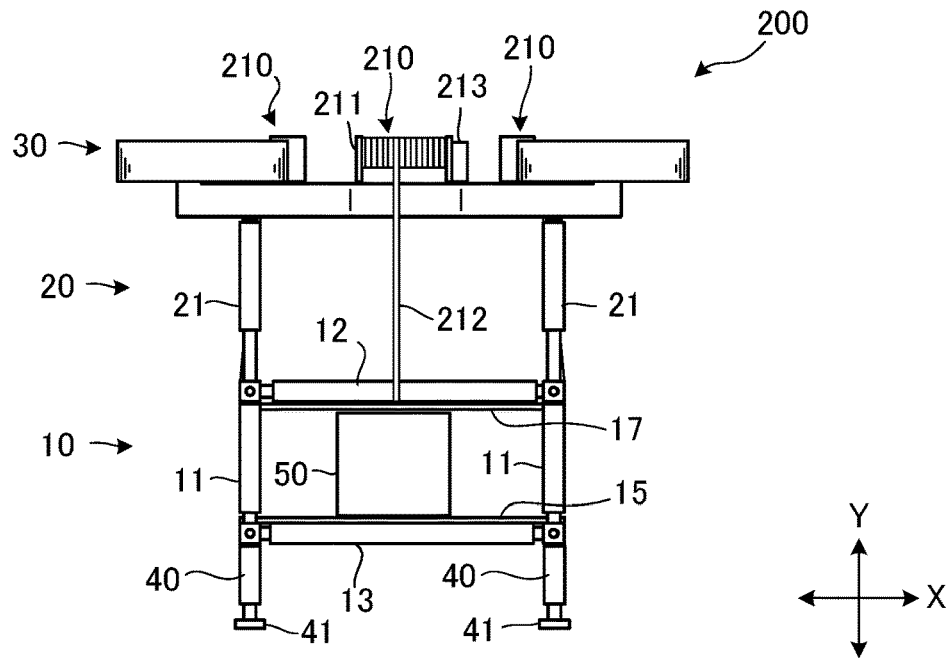
FIG. 11A is a side view illustrating the configuration of the aircraft according to a modification to the second embodiment, showing a state in which the first frame is attached.
Figure 11B:
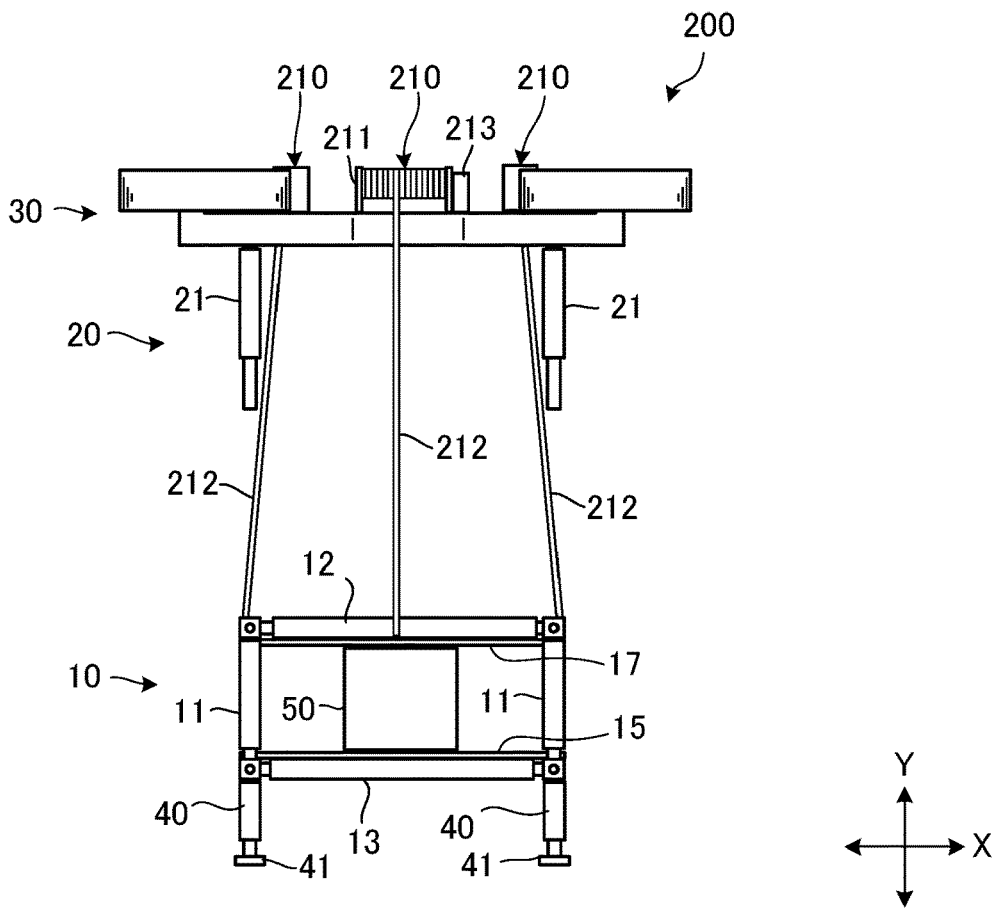
FIG. 11B is a side view illustrating the configuration of the aircraft according to a modification to the second embodiment, showing a state in which the first frame body is lowered away from the main body via the winch.

FIG. 11A and FIG. 11B are side views illustrating a modification of FIGS. 10A and 10B. The aircraft 200 shown in FIGS. 11A and 11B is different from that of FIGS. 10A and 10B in the point that one end of each of the cables 212 is coupled to one of the four upper-end coupling rod 12 of the first frame body 10.

In this case, as shown in FIG. 11B, the first frame body 10 is separated from the second frame body 20 and is lowered. The second frame body 20 is kept to be coupled to the main body 30. This configuration is also suitable for agricultural applications because of the point that the first frame body 10 mounted with the parcel 50 can be lowered while keeping the main body 30 including the flying mechanism 31 waiting in the sky. Alternatively, the aircraft 200 may of course be applied to other applications such as, for example, an architectural application and a forestry application.

Action and Effects of Second Embodiment

By providing winches 210 to the main body 30, the second frame body 20 or the first frame body 10 is liftably attached, via a winches 210, to the main body 30. In this case, it is possible to lower the first frame body 10 mounted with the parcel 50 by the control apparatus 60 controlling the working of driving apparatuses 213 to unwind the cables 212 from the drums 211 while keeping the main body 30 including the flying mechanism 31 waiting in the sky. By winding the cable 212 around each drum 211, the first frame body 10 can be recovered to the aircraft 200. This structure is suitable for delivery of the parcel 50 to the destination difficult to secure the landing space, such as stores and general houses, because of the point that it is possible to suppress the influence of wind pressure directly below the aircraft 200. In addition, since it is not necessary to land the aircraft 200 itself when delivering the parcel 50, it is possible to more efficiently distribute the parcels 50. It is also suitable for agricultural applications. Alternatively, the aircraft 200 may of course be applied to other applications such as, for example, an architectural application and a forestry application.

Third Embodiment

Tilt-Rotor Type Flying Mechanism

Figure 12:
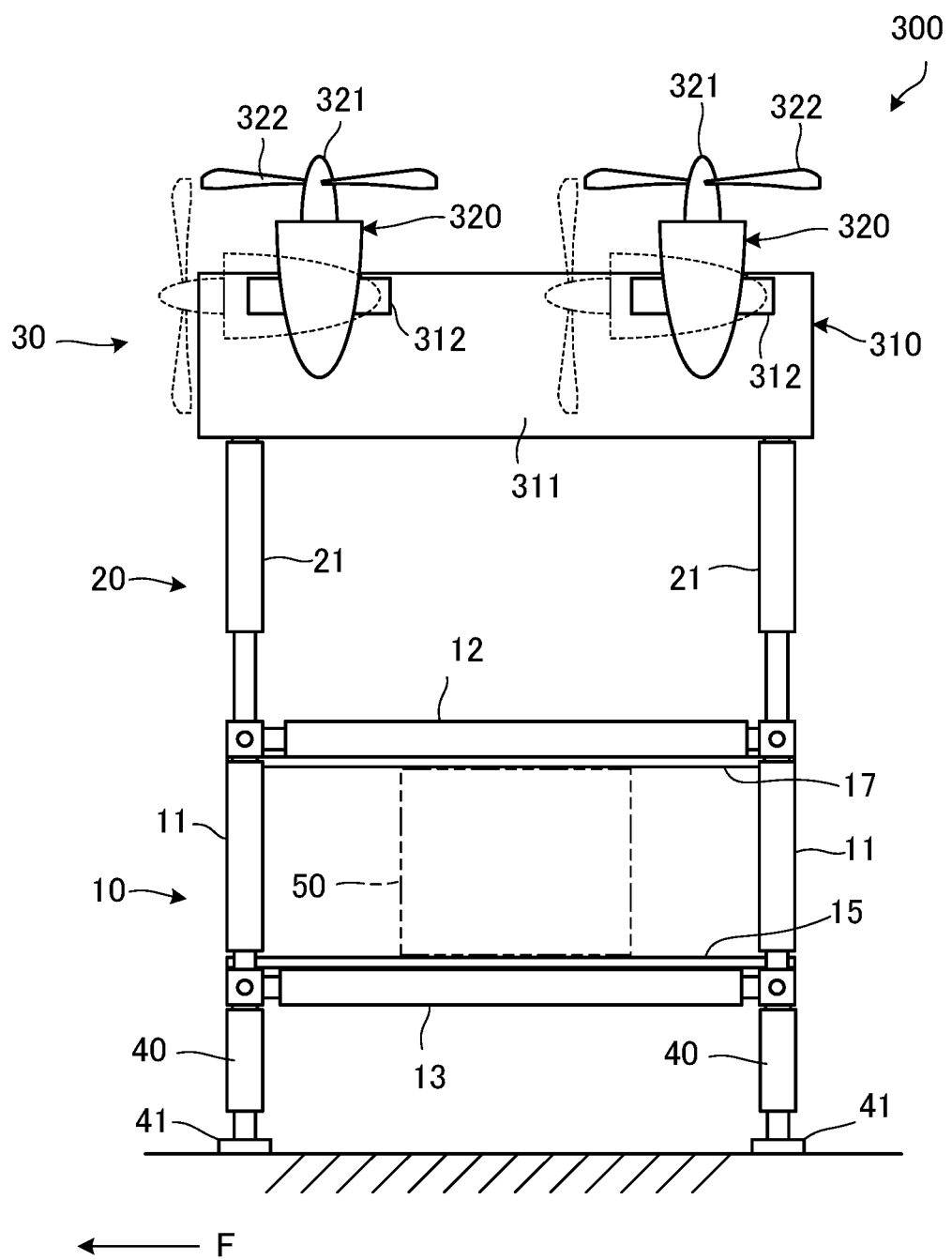
FIG. 12 is a side view showing the configuration of the aircraft according to a third embodiment.
Figure 13:
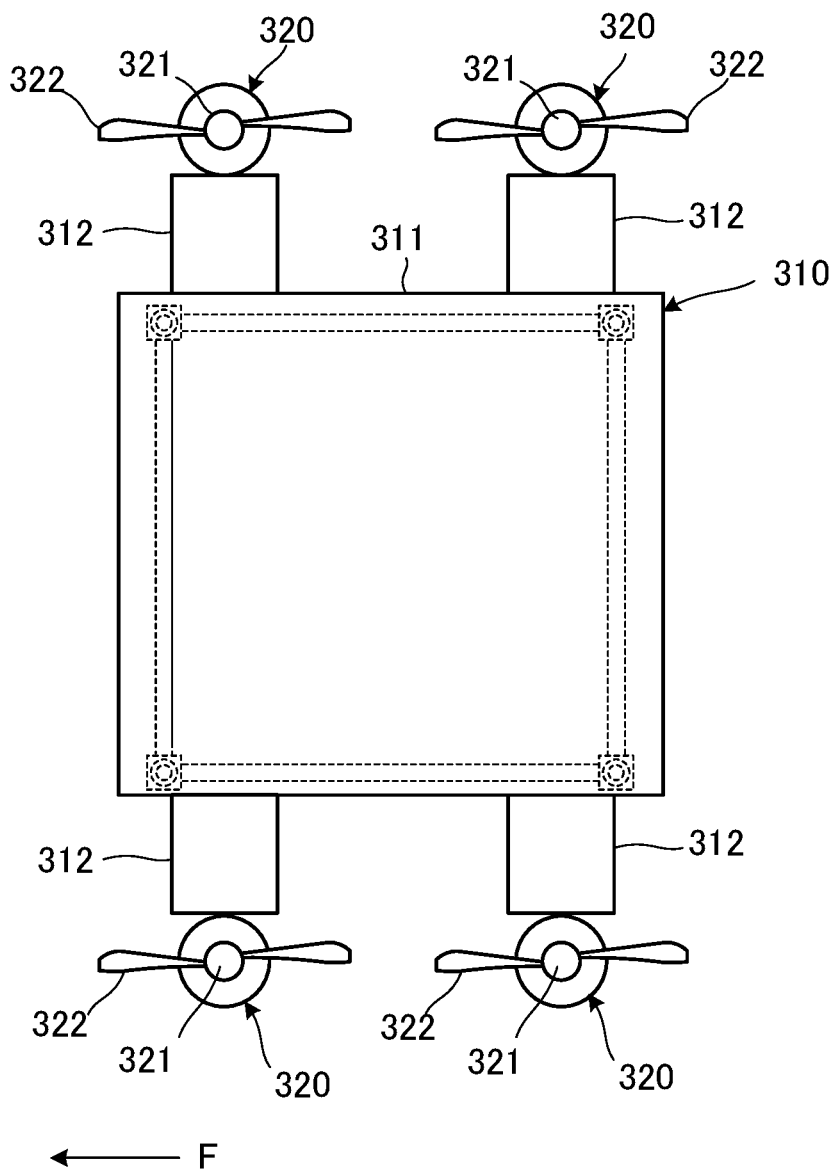
FIG. 13 is a plan view of the aircraft of FIG. 12 from above.

FIG. 12 is a side view illustrating an aircraft 300 according to a third embodiment, and FIG. 13 is a plan view of the aircraft 300 of FIG. 12 viewed from above. The main body 30 of the aircraft 300 shown in FIGS. 12 and 13 includes a flying mechanism 310 of a tilt-rotor type (osprey type).

Here, the left side of the drawings of FIGS. 12 and 13 is assumed to be the forward direction in the traveling direction F of the aircraft 300.

As shown in FIGS. 12 and 13, on the base portion 311 of the flying mechanism 310, a pair of left and right arms 312 extending from each of the left and right sides in the left-right direction (the direction perpendicular to the drawing in FIG. 12) are provided in each of the front and rear portion in the traveling direction F. A rotary wing 320 is attached to the tip of each arm 312. Each rotary wing 320 is mounted so as to be rotatable about an axis extending in a left-right direction, and the angle of attaching to the arm 312 can be changed.

Each rotary wing 320 includes a rotary shaft 321 and multiple blades 322 protruding radially from the rotary shaft 321, and is connected to an electric motor driven by a non-illustrated battery. When each of the rotary wings 320 is driven to rotate by a non-illustrated electric motor, the blades 322 rotate about the rotary shaft 321 to generate the propulsive force of the aircraft 300. The power source of the electric motor is not limited to a battery, but may alternatively be a generator. Any type of a generator may be any applied and is exemplified by one using an engine as a power source, such as a generator, a photovoltaic generator, or a wind power generator. The driving source of the rotary wings 320 is not limited to an electric motor and may alternatively be any type exemplified by an internal combustion engine or a jet engine as far as it can drive the rotary wing 320.

Each rotary wing 320 is set to a first attachment angle that erects the rotation axis 321 in the vertical direction during vertical flight, and to a second attachment angle that directs the rotation axis 321 in the traveling direction during forward flight. The rotary wing 320 set to the second attachment angle is shown by broken lines in FIG. 12. It is assumed that each arm 312 is set in such a length that the tip of each blade 322 does not come into contact with or interfere with the side surface of the base portion 311 of the flying mechanism 310 even in a state where the rotary wing 320 is set to the second attachment angle.

For example, when the aircraft 300 is flown in the vertical direction during takeoff and landing, for example, each rotary wing 320 is set to the first attachment angle. When the aircraft 300 is advanced in the traveling direction F, each rotary wing 320 is set to a second attachment angle. Including the first frame body 10 and the second frame body 20 consisting of the telescopic first struts 11 and second struts 21, also the aircraft 300 including the tilt-rotor type flying mechanism 310 can fix the parcel 50 to the first frame body 10 by sandwiching the parcel 50 between the pressing surface 17 and the mounting surface 15 and can maintain the flying posture of the first frame body 10 mounted with the parcel 50 horizontally by the telescopic movement control on the multiple second struts 21 of the second body frame 20.

As a modification, the flying mechanism 310 may be a flying mechanism of a tilt-wing type. In that case, the arm 312 is mounted to the base portion 311 so as to be rotatable about an axis extending in the left-right direction, and the attachment angle of the arm 312 to the base portion 311 is changeable between first attachment angle and the second attachment angle. The attachment angle of each rotary wing 320 to the arms 312 are fixed. Changing the attachment angle of the arm 312 switches the angle of the rotor shaft 321 of the rotary wing 320 fixed to the tip of the arm 312.

Application of the tilt-rotor type flying mechanism 310 to a flying mechanism is suitable for the delivery of the parcel 50 since both forward flight and vertical flight are stable.

Incidentally, in this specification, the term "a tilt-rotor type flying mechanism" generally represents a conversion type rotary wing flying mechanism capable of switching the angle of the rotor shaft 321 of the rotary wings 320, and includes a tilt-wing type flying mechanism.

Fourth Embodiment

Mounting of Vehicle

Figure 14:
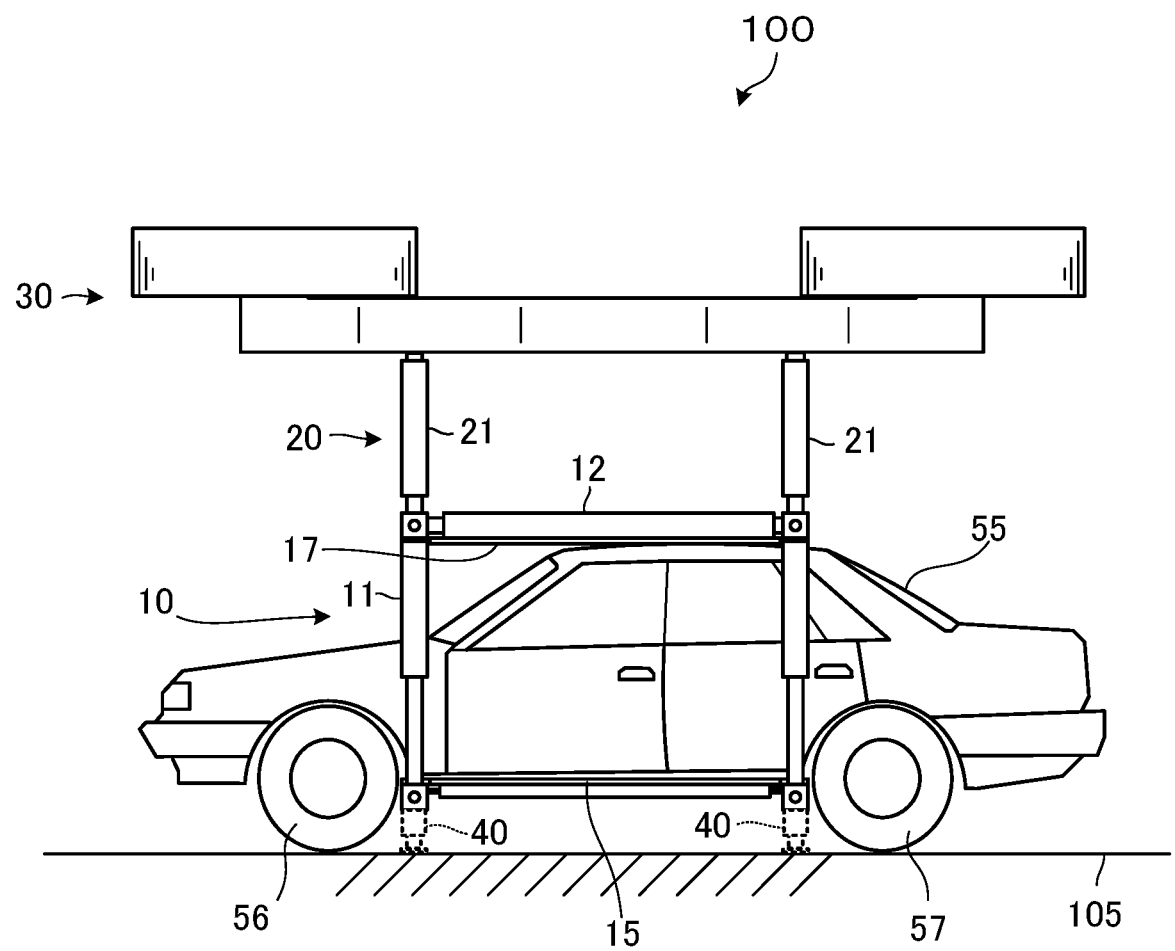
FIG. 14 is a side view showing an aircraft according to a fourth embodiment, illustrating a state in which a vehicle is mounted on the aircraft shown in FIG. 1.

For example, when a vehicle is to be mounted (such as a normal passenger car), as a load, to the aircraft 100, the mounting surface 15 of the first frame body 10 is positioned between front wheels 56 and rear wheels 57 at the bottom surface of a vehicle 55 as shown in FIG. 14, and the vehicle 55 is mounted on the first frame body 10 by pressing the roof portion of the vehicle 55 with the pressing surface 17 of the first frame body 10. In the aircraft 100 shown in FIG. 14, the front wheels 56 and the rear wheels 57 of the vehicle 55 are positioned below the lower surface of the first frame body 10, the front wheels 56 and rear wheel 57 of the vehicle 55 are configured as grounding units to a landing site.

Each leg 40 (shown by a broken line in FIG. 14) is preferably contracted so as not to ground at its lower end (the grounding portion 41 in FIG. 1). In this case, for example, each leg 40 may be configured to be accommodatable in the lower face side of the first frame body 10, being in a folded state.

Also in the aircraft 100 shown in FIG. 14, the lower ends (the grounding units 41 in FIG. 1) of the leg 40 may of course be used as the grounding units by extending the legs 40 to be positioned below the wheels (the front wheels 56 and the rear wheels 57) of the vehicle 55.

For example, the wheels 56 and 57 of the vehicle 55 are utilized as the grounding units when the landing site is a road or leveled flat ground. In contrast, if the landing site is not suitable for using the wheels 56, 57 of the vehicle 55 as the grounding units, such as an uneven terrain or muddy ground, the legs 40 are extended to use the grounding units 41 at the lower end of the legs 40. As the above, by using the wheels 56 and 57 of the vehicle 55 and the legs 40 as the grounding units, the wheels 56 and 57 of the vehicle 55 or the legs 40 can be selectively used according to the state of a landing site.

The telescopic movement control on the legs 40 may be performed automatically based on the detection signal of a non-illustrated sensor, or may be controlled by remote operation by a user using a non-illustrated remote controller. If the wheels 56 and 57 of the vehicle 55 serve as the grounding units to landing site as the above, the vehicle 55 itself can travel on the ground, keeping the state where the vehicle 55 is kept to be mounted on the aircraft 100. This means that the aircraft 100 of the present embodiment can be used as a kind of roadable aircraft (flying vehicle). Furthermore, in order to more reliably fix the vehicle 55, the vehicle 55 may be fixed to the mounting surface 15 with a non-illustrated stopper in addition to pressing from above with the pressing surface 17. When the vehicle 55 is to be mounted, it is sufficient that the vehicle 55 is run into the first frame body 10 and stopped on the mounting surface 15 in a state where the stopper is opened and then the depressing surface 17 is moved downward to shut the stopper. The vehicle 55 can be removed from the aircraft 100 easily by moving upward the pressing surface 17, removing the stopper, and then starting the vehicle 55. If the wheels 56 and 57 of the vehicle 55 serve as the grounding units to a landing site, the legs 40 may be omitted.

Although not shown, it is of course also possible to mount the vehicle 55 to the aircraft 300 of a tilt-rotor type of FIG. 12. The manner of mounting the vehicle 55 is not limited to that shown in FIG. 14, the entire vehicle 55 may be mounted on the mounting surface 15 of the first frame body 10, for example.

Further, when the vehicle 55 is mounted, as a load, on the aircraft 100, the power generating capacity of the mounted vehicle 55 may be used as the power source of the driving apparatus such as the electric motor (actuator 113) for telescopically moving the first struts 11 and the second struts 21 and the electric motor for driving the rotor wings 32 of the flying mechanism 31. Further, the power of the mounted vehicle 55 may be used as a power source for driving the rotary wings 32 of the flying mechanism 31.

Further, the vehicle mounted on the aircraft 100 is not limited to an ordinary passenger car, and may alternatively be an emergency vehicle such as a fire engine and an ambulance. For example, the aircraft 100 can be used as a doctor helicopter by mounting an ambulance thereon. Further, it is possible to use the aircraft 100 as a fire fighting aircraft for performing aerial fire fighting by mounting a fire engine thereon. The load is not limited to the traveling body traveling on the ground as a vehicle, and may alternatively be an aircraft such as a rocket.

Fifth Embodiment

Winch of Second Frame

Figure 15A:
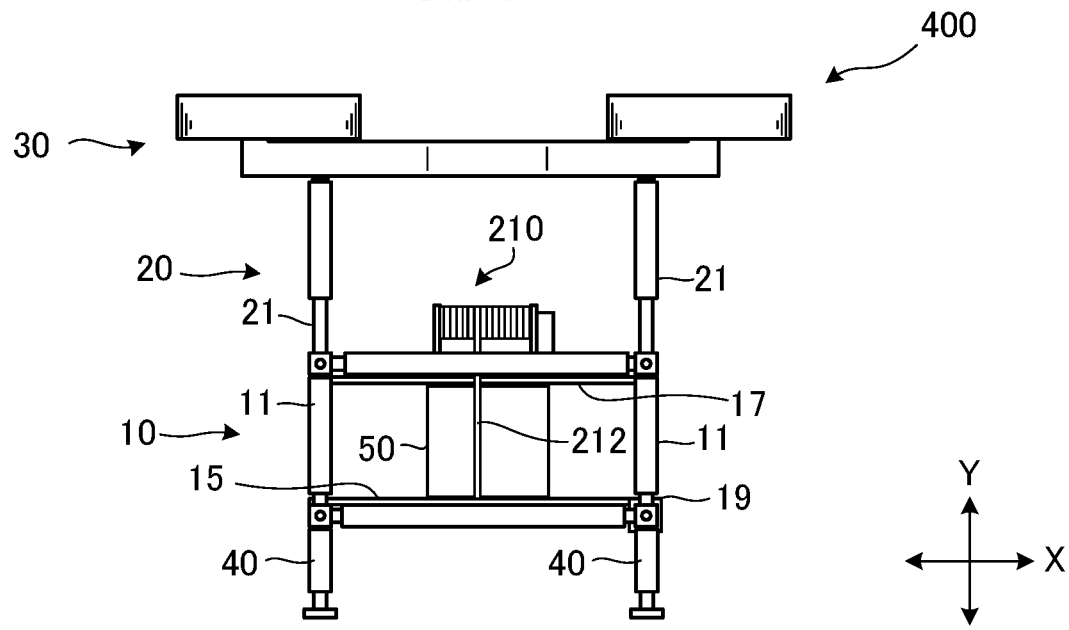
FIG. 15A is a side view showing the configuration of the aircraft according to a fifth embodiment.
Figure 15B:
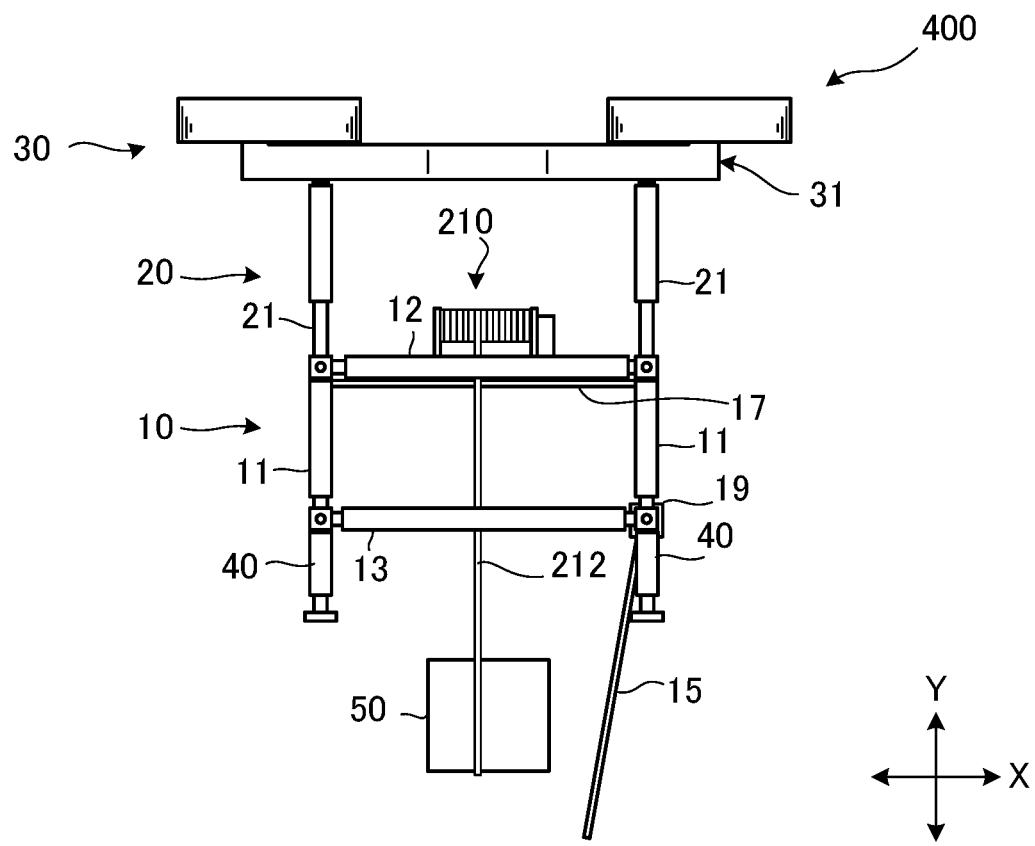
FIG. 15B is a side view illustrating the configuration of the aircraft according to the fifth embodiment, showing a state in which a parcel is lowered via a winch.

Further, the aircraft 400 of the fifth embodiment shown in FIGS. 15A and 15B includes a winch 210 on the lower portion of the second frame body 20, i.e., the upper surface of the pressing surface 17 forming an upper face portion of the first frame body 10. In this case, the upper surface of the pressing surface 17 may be provided with a hole for passing the cable 212 of the winch 210, and the cable 212 may preferably be attached to the parcel 50.

The first frame body 10 is provided with an opening and closing mechanism 19 that opens and closes the bottom face of the first frame body 10 by moving the mounting surface 15. The opening and closing mechanism 19 includes a driving apparatus for moving the mounting surface 15. The driving device is an electric motor driven by, for example, a non-illustrated battery. Incidentally, the electric motor may be driven by not only a battery but also a generator. Any type of a generator may be any applied and is exemplified by one using an engine as a power source, such as a generator, a photovoltaic generator, or a wind power generator. The opening and closing mechanism 19, for example, opens and closes the bottom face by swinging the mounting surface 15 in the up-low direction around one side of the bottom surface of the first frame body 10.

The control apparatus 60 unwinds the cable 212 from the winch 210 and winds the cable 212 around the winch 210 by controlling the working of the driving apparatus, and also opens and closes the bottom face of the first frame body 10 by controlling the movement of the mounting surface (controls the opening and closing of the opening and closing mechanism 19). FIG. 15B shows a state in which the bottom surface of the first frame body 10 is opened by downward swinging the mounting surface 15 and the parcel 50 is lowered from the first frame body 10 by using the winch 210. The aircraft 400 of the fifth embodiment is suitable for delivery of the parcel 50 to the destination difficult to secure the landing space, such as stores and general houses because it is possible to suppress the influence of wind pressure directly below the aircraft 400 In addition, since it is not necessary to land the aircraft 400 itself when delivering the parcel 50, it is possible to efficiently distribute the parcels 50.

The opening and closing mechanism 19 is not limited to the example shown, and may alternatively be of any type such as a hatch-type opening and closing mechanism or a slide-type opening and closing mechanism.

In the usage in which the bottom face of the first frame body 10 is opened and the parcel 50 is lowered from the first frame body 10 using the winch 210 as shown in FIG. 15B, the aircraft 400 can be used for taking a dog for a walk by replacing the parcel 50 with the dog. In this case, the cable 212 functions as a rope (leash) for walking dogs with its end part coupled to the collar or harness of the dog. In this usage, for example, the aircraft 400 with a dog mounted on the first frame body 10 is flown to a large area (riverbed, etc.), and after arrival, the dog is lowered to the ground, the aircraft 400 take the dog for a walk.

In addition, when an agricultural work machine (not shown) such as a tractor or a cultivator is mounted as the parcel 50, the bottom surface of the first frame body 10 may be opened to lower the agricultural work machine from the first frame body 10 to the ground by using the winch 210, and then the agricultural work machine may be towed by the aircraft 400. By towing the agricultural work machine by the aircraft 400, it is possible to support the running of the agricultural work machine and suppress the fall of the agricultural work machine.

In this usage, the aircraft 400 with the agricultural work machine mounted on the first frame body 10 flies to the work place (such as a field), after arrival, the agricultural work machine is lowered to the ground, performs a predetermined work while the aircraft 400 is towing the agricultural work machine, then the aircraft 400 pulls up the agricultural work machine to the first frame body 10, and moves to another work place or returns to the warehouse. Here, the operation of the agricultural work machine to be towed may be remotely controlled. Specifically, the control apparatus 60 of the aircraft 400 may wirelessly or wiredly transmit a control signal for the remote control to the agricultural work machine, or the control apparatus 60 may wirelessly or wiredly relay a control signal for the remote control transmitted from a remote controller (not shown) separated from the aircraft 400 to the agricultural work machine.

In addition, an example of an agricultural work machine to be towed by the aircraft 400 is a weeder device utilizing a chain. The weeder has a pole member and multiple chains (e.g., chains as long as several tens of centimeters). The chains are attached to the pole member at one ends thereof, arranged side by side in the axial direction of the pole member, and thereby hang from the pole member. The aircraft 400 tows the weeder such that the pole member is perpendicular to the towing direction and also to the vertical direction. With this structure, grass in the field is removed by scratching the ground of the field with multiple chains. Use of the aircraft 400 reduces the labor of weeding operation using such weeder.

Sixth Embodiment

Wheel

Figure 16A:
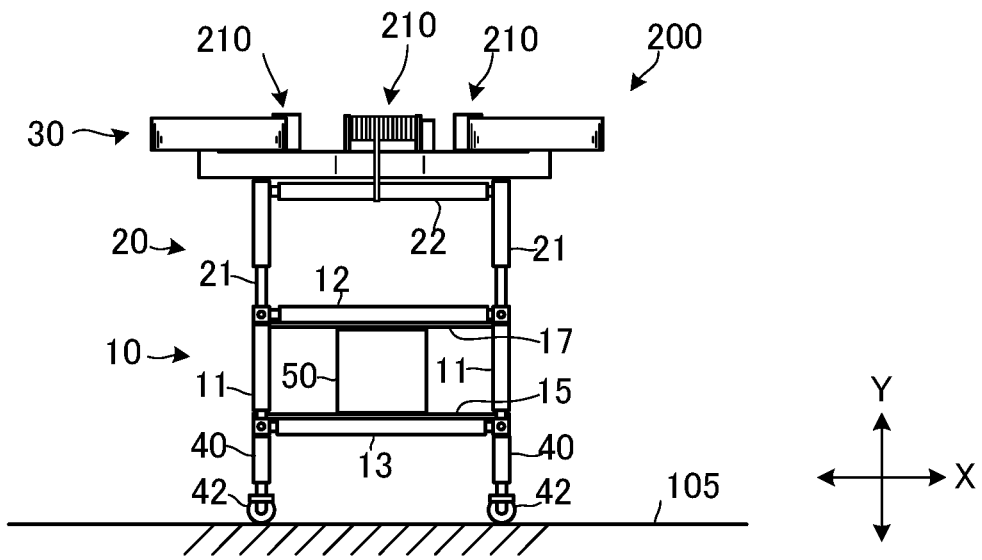
FIG. 16A is a diagram showing an aircraft according to a sixth embodiment, showing a state in which the second frame is attached to the main body in a configuration that wheels are attached on the legs.
Figure 16B:
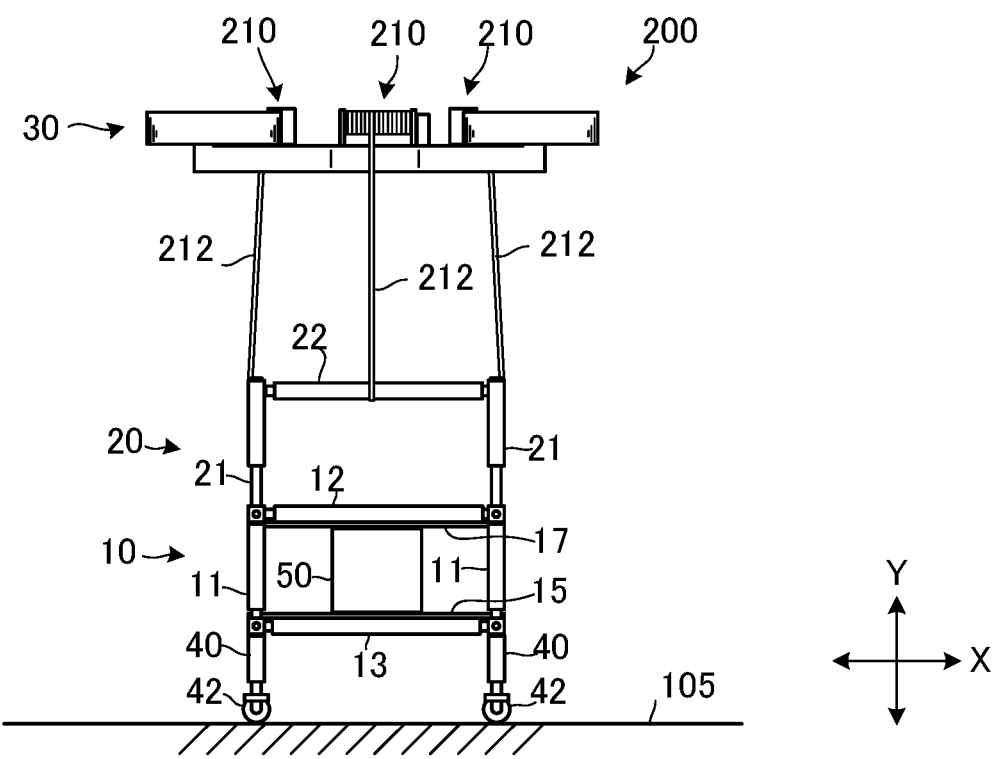
FIG. 16B is a diagram showing an aircraft according to the sixth embodiment, showing a state in which the second frame body is lowered away from the main body via a winch in a configuration that wheels are attached on the legs.

Further, as a modification of the aircraft 100 (200, 300, and 400), the grounding unit 41 of the lower end of each leg 40 may be replaced with a wheel 42. FIG. 16A, FIG. 16B shows a modification in which wheels 42 are provided at the lower ends of the legs 40, using the aircraft 200 as an example. FIG. 16A shows a state where the aircraft 200 with wheels 42 has landed on the landing surface 105. In this case, the aircraft 200 can be used as a bogie. To brake the aircraft 200 on the ground, a non-illustrated stopper may be disposed on the lower surface of the first frame body 10. Further, a driving apparatus for driving a wheel may be provided for each wheel 42, so that the aircraft 200 can self-propel on the ground. The driving device is an electric motor driven by, for example, a non-illustrated battery. Although not shown, the lower end of each leg 40 can of course be replaced by the wheel 42 in any structure such as the aircraft 100 and 300 of FIGS. 1 and 12, respectively.

As shown in 16B, under a state where the second frame body 20 and the first frame body 10 are separated from the main body 30 and lowered to the ground, the main body 30 may tow the second frame body 20 and the first frame body 10 lowered on the ground through the cables 212 of the winch 210 from the air. The first frame body 10 and the second frame body 20 on the ground may be temporarily disconnected from the main body 30 (from the cables 212). In that case, the second frame body 20 and the first frame body 10 are recovered in the main body 30 by coupling the cables 212 to the attaching rods 22 of the second frame body 20 and upwardly winding the cables 21 by the winches 210. In addition, a usage in which the main body 30 tows the first frame body 10 on the ground from the air is suitable for an application to migrate multiple livestock and animals such as sheep and cattle, for example.

Seventh Embodiment

Multiple Flying Mechanisms

Figure 17:
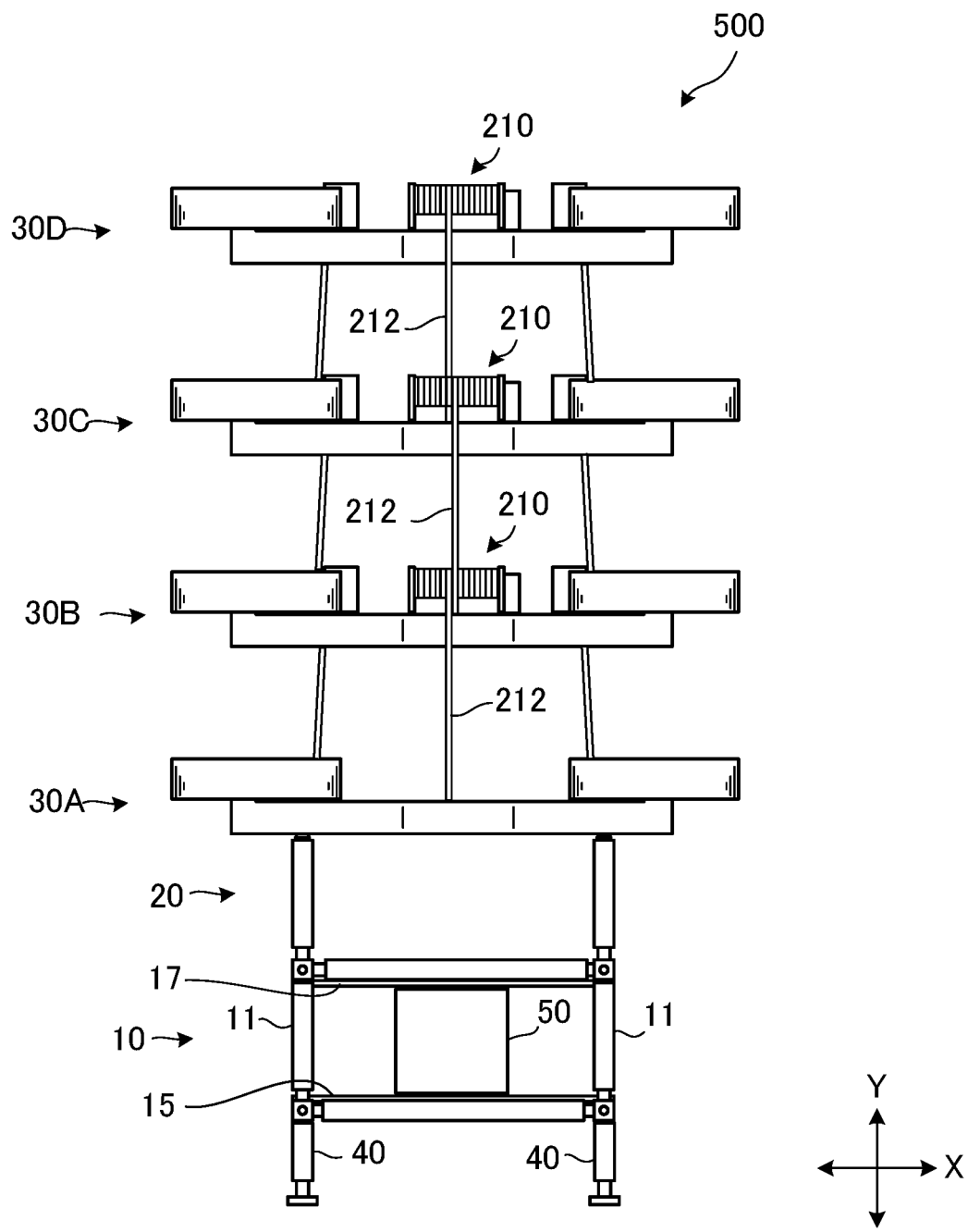
FIG. 17 is a side view sowing an aircraft having a structure consisting of multiple flying mechanisms according to a seventh embodiment.

Further, an aircraft 500 shown in FIG. 17 according to a modification has multiple main bodies 30 (multiple flying mechanisms). The aircraft 500 shown in FIG. 17 includes four main bodies 30A, 30B, 30C, and 30D, and the main bodies 30B, 30C, and 30D are vertically aligned above the main body 30A attached to upper portion of the second frame body 20 is connected to each other. The main body 30B, 30C, and 30D are each provided with a winch 210. The cable 212 of the winch 210 the uppermost main body 30D is coupled to the main body 30C; the cable 212 of the winch 210 the main body 30C is coupled to the main body 30B; and the cable 212 of the winch 210 the main body 30B is coupled to the lowermost main body 30A. In this case, while the flight is stopping, the main bodies 30A-30D may be housed compactly in a lump by superimposing the main body 30B on the main body 30A, superimposing the main body 30C on the main body 30B, and superimposing the body portion 30D on the main body 30C. In flight, the vertical spacing of the main bodies 30A, 30B, 30 C, and 30D can be adjusted according to the length of the cables 212 unwound from the winches 210.

Figure 18:
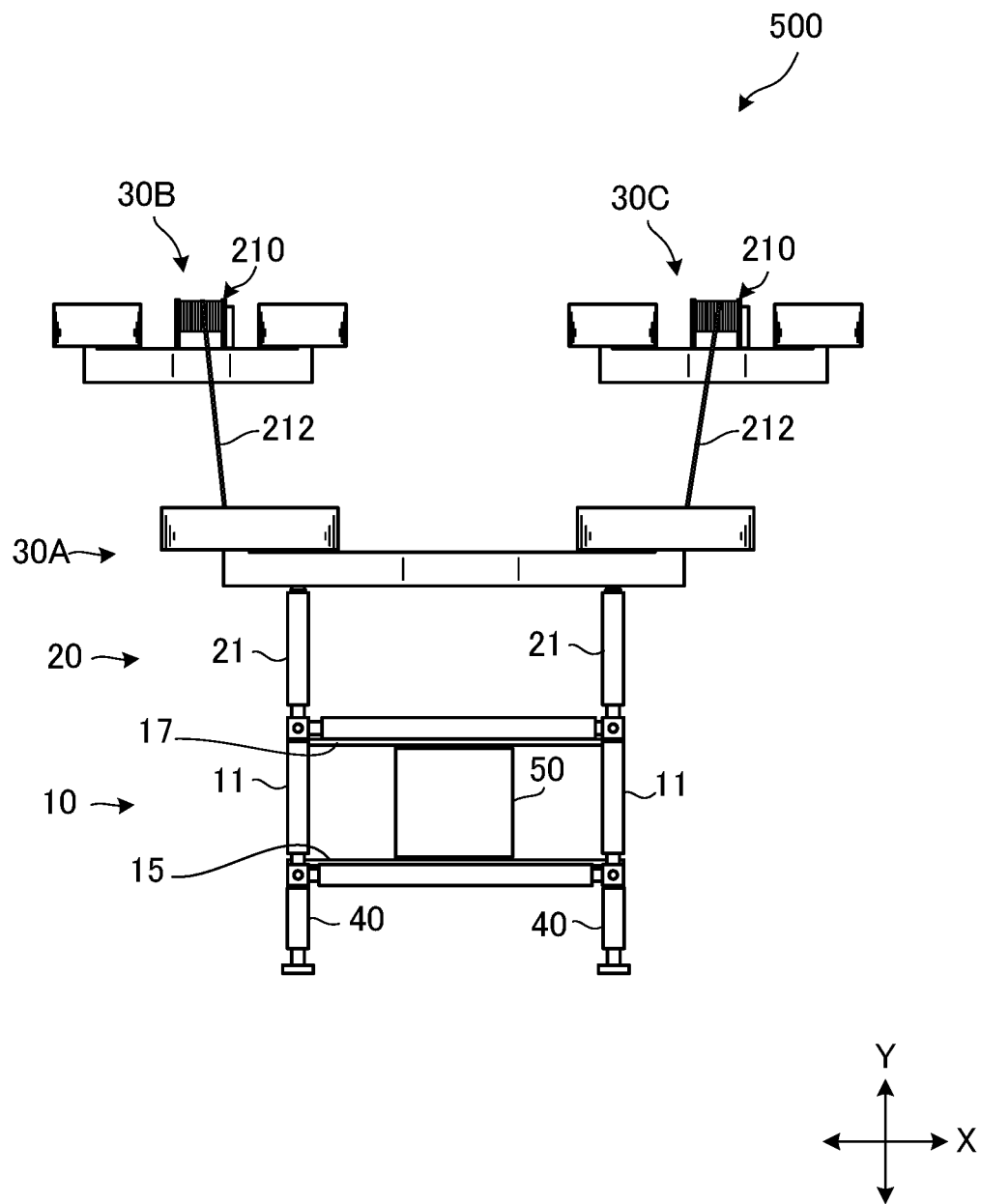
FIG. 18 is a side view showing an aircraft having another structure consisting of multiple flying mechanisms according to the seventh embodiment.

FIG. 18 shows a modification of the aircraft 500 having multiple main bodies 30 (multiple flying mechanisms), among which multiple main bodies 30B and 30C are arranged horizontally above the main body 30A attached to the upper portion of the second frame body 20. The multiple main bodies 30B and 30C each has a winch 210 is connected to the main body 30A via a cable 212. In this case, the horizontal sizes of the multiple main bodies 30B and 30C are preferably smaller than that of the main body 30A. This structure aims at reserving a wide horizontal space between the main bodies 30B and 30C in the flight state.

In the aircraft 500 having multiple main bodies 30 (multiple flying mechanisms) shown in FIGS. 17 and 18, means for coupling the multiple main bodies 30A, 30B, 30C, and 30D to each other is not limited to the winches 210. Alternatively, the multiple main bodies 30A, 30B, 30C, and 30D may be coupled to each other by telescopic pipe bodies used as the first struts 11 and the second struts 21. In this alternative, while the aircraft 500 is flying, the distance between the main bodies 30A, 30B, 30C, and 30D may be increased by extending the pipe bodies coupling the multiple main bodies 30A, 30B, 30C, and 30D to each other, and also, while flight of the aircraft 500 is stopped, the multiple main bodies 30A, 30B, 30C, and 30D are housed in a superimposed state by contracting the pipe bodies. The flight force of the aircraft 500 can be enhanced by providing multiple main bodies 30 (multiple flying mechanisms) on the upper portion of the second frame body 20. The number of main bodies 30 which is connected in multiple stages can be freely expanded and changed.

Alternatively, the frames of the multiple main bodies 30A, 30B, 30C, and 30D (i.e., the base portion and the arms of each flying mechanism) may each have an assembled frame structure formed of telescopic pipe bodies the same as the first struts 11 and the second struts 21, and the joint blocks 14. Thus, the size of the individual main bodies 30A, 30B, 30C, and 30D can be freely changed. For example, depending on the size of the blade 36 (propeller) of the rotary wing 32 mounted on the individual main bodies 30A, 30B, 30C, and 30D, it is possible to freely change the sizes of the main bodies 30A, 30B, 30C, and 30D. The sizes of the individual main bodies 30A, 30B, 30C, and 30D can also be different to one another. For example, the sizes of the main bodies 30A, 30B, 30C, and 30D may be sequentially increased from the bottom to the top, or may be sequentially decreased from the bottom to the top. The combination of the sizes of the main bodies 30A, 30B, 30C, and 30D can be freely set and changed. Further, if the frames of the main bodies 30A, 30B, 30C, and 30D are of the assembly type, the number of rotary wings 32 provided in each main body 30 can also be freely expanded and changed and also the shapes of the frames can be freely changed. Extending and changing of the frame are simply and easily accomplished by using the joint blocks 14 and the pipe bodies.

Eighth Embodiment

Left and Right Supporting Members

Figure 19A:
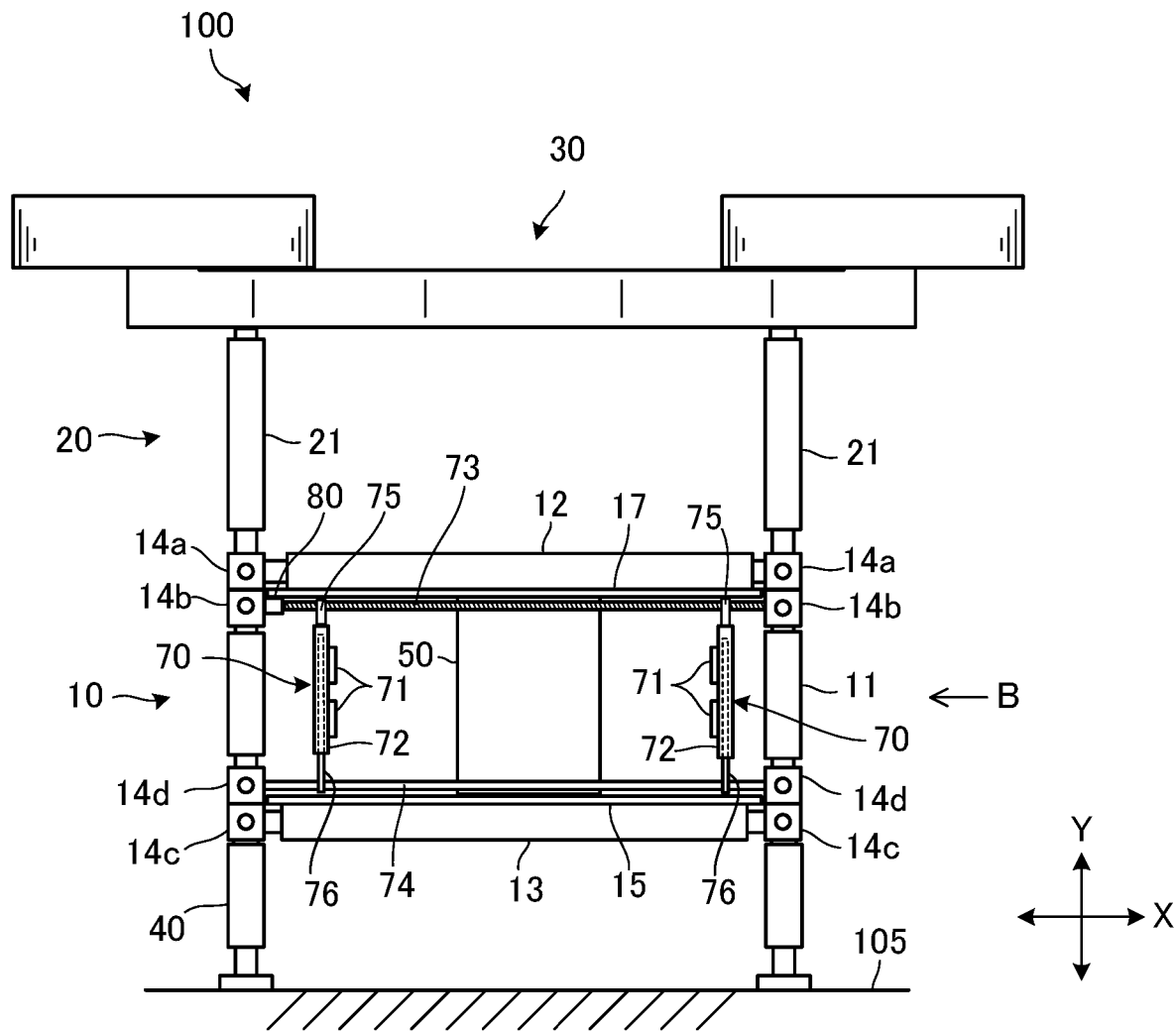
FIG. 19A is a side view of an aircraft having the first frame body provided with a supporting member that supports a mounted load from the left and the right side faces according to an eighth embodiment.

Further, as shown in FIG. 19A, a pair of left and right supporting members 70 may be attached to the first frame body 10. Each supporting member 70 is attached to the first frame body 10 so as to be movable in the left-right direction, adjusting the interval between the supporting members 70 makes it possible support the parcel 50 mounted on the mounting surface 15 by pressing the parcel 50 from the left and right sides. Each of the supporting members 70 is disposed along a surface extending in the up-low direction and also in the front-rear direction, and includes support plates 71 for supporting the parcel 50, and third struts 72 for movably attaching the support plates 71 to the first frame body 10.

Above the first frame body 10, an upper supporting rod 73 arranged along the left-right direction is provided. To the upper supporting rod 73, the upper end portions 75 of the third struts 72 are coupled. A lower supporting rod 74 is provided below the first frame body 10, being arranged along the left-right direction. The lower supporting rod 74 is coupled to lower end portions 76 of the third struts 72.

To attach the upper supporting rod 73, joint blocks 14*b* are disposed between the joint blocks 14*a* arranged on the both left and right ends and also on the upper ends of the first frame body 10 and the upper ends of the first struts 11. The upper supporting rod 73 is disposed between the joint blocks 14*b* of the left and right sides. Further, to attach the lower supporting rod 74, joint blocks 14*d* are disposed between the joint blocks 14*c* arranged on the both left and right ends and also on the upper ends of the first frame body 10 and the lower ends of the first struts 11. The lower supporting rod 74 is disposed between the joint blocks 14*d* of the left and right sides.

Although not appearing in FIG. 19A, the upper supporting rod 73 and the joint blocks 14*b* on the left and right sides, the lower supporting rod 74, and the joint blocks 14*d* on the right and left sides are provided on the both left and right sides in the front-rear direction.

Figure 19B:
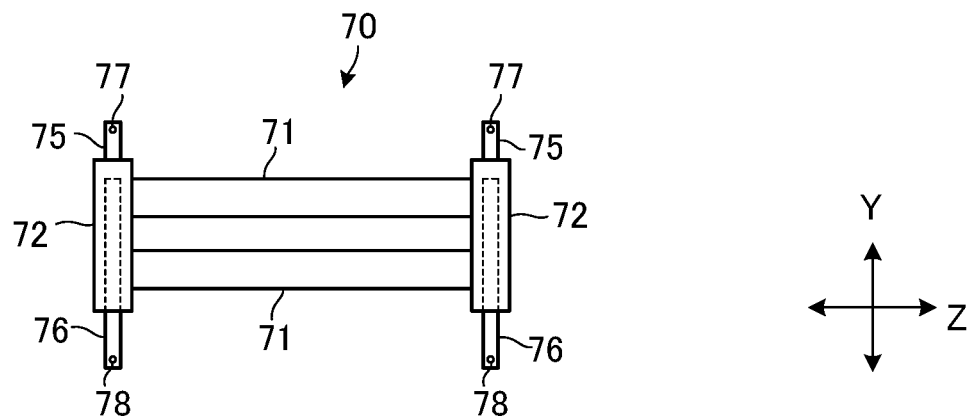
FIG. 19B is a side view illustrating a supporting member of the aircraft according to the eighth embodiment.

FIG. 19B is a diagram showing the supporting member 70 viewed from the arrow B. The supporting member 70 shown in FIGS. 19A and 19B has two plates arranged in the up-low direction to serve as supporting plates 71, and a pair of the third struts 72 are attached to both ends in the front-rear direction of these support plates 71. Each third strut 72 is provided with a hole 77, through which the upper supporting rod 73, penetrates on the upper end portion 75 and a hole 78, through which the lower supporting rod 74 penetrates, on the lower-end portion 76.

As shown in FIG. 19A, one end of the upper supporting rod 73 is connected to an electric motor 80. The electric motor 80 is driven by a non-illustrated battery. The rotation shaft of the electric motor 80 is disposed coaxially with the upper supporting rod 73. The upper supporting rod 73 is formed as a screw body having a thread on the outer peripheral surface. The hole 77 on the upper end portion 75 of each third strut 72 is formed as a female screw body having a thread on the inner peripheral surface. Therefore, the rotational motion of the electric motor 80 is converted into a linear motion of the supporting member 70 along the axial direction of the upper supporting rod 73 (movement in the left-right direction).

In the pair of left and right supporting members 70, the respective screw threads of the inner peripheral surfaces of the holes 77 are formed in the opposite directions, and therefore the pair of left and right supporting members 70 are moved in the opposite directions to each other in response to the rotational motion of the electric motor 80. If the electric motor 80 is rotated in one direction, the supporting member 70 on the right side moves to the left and the supporting member 70 on the left moves to the right. If the electric motor 80 is rotated in the other direction, the supporting member 70 on the right side moves to the right and the supporting member 70 on the left moves to the left. This means that only by switching the rotation direction by one electric motor 80, the pair of left and right supporting members 70 come to be spaced apart from and close to each other.

Threads are not formed on the lower supporting rod 74 and the lower end portions 76 of the third struts 72. Therefore, the lower end portion 76 of each third strut 72 moves along the lower supporting rod 74, following the linear motion of the upper end portion 75 of the third strut 72.

As shown in FIG. 19B, the lower end portion 76 of each third strut 72 is telescopically inserted into the inner side of the third strut 72 and therefore can extend and contract in an up-down direction with respect to the third strut 72. Therefore, when the first strut 11 of the first frame body 10 extends and contracts in the up-low direction, the lower end portion 76 of each third strut 72 also extends and contracts, following the extension and contraction.

The control apparatus 60 controls driving of the electric motor 80 to move the pair of left and right supporting members 70 in the left-right direction close to each other. Consequently, the pair of left and right supporting members 70 presses the parcel 50 mounted on the first frame body 10 from the left and right sides. Therefore, the stability of the parcel 50 is enhanced. Further, it is possible to further effectively suppress the collapse of the parcel 50. Incidentally, the electric motor 80 may be driven by not only a battery but also a generator. Any type of a generator may be any applied and is exemplified by one using an engine as a power source, such as a generator, a photovoltaic generator, or a wind power generator. Further, the movement of the pair of left and right supporting members 70 is not limited to automatic control using the control apparatus 60 and the electric motor 80, but may alternatively be performed manually.

Further, as a modification, the supporting member 70 may be moved at the lower ends of the third struts 72 by connecting the electric motor 80 to the lower supporting rod 74 and also forming threads on the lower supporting rod 74 and the lower end portions 76 of the third struts 72. Further, both the upper supporting rod 73 and the lower supporting rod 74 may be rotatably driven by the electric motor 80.

The shape of the supporting member 70 is not limited to the illustrated example. For example, the support plate 71 may be formed of a single plate piece. Further, for example, the outside of each of the upper supporting rod 73, the electric motor 80, and the lower supporting rod 74 may be covered with a cylindrical body. The mechanism for moving the supporting member 70 in the left-right direction is not limited to the above example.

Ninth Embodiment

Direct Coupling of Vehicle

Figure 20:
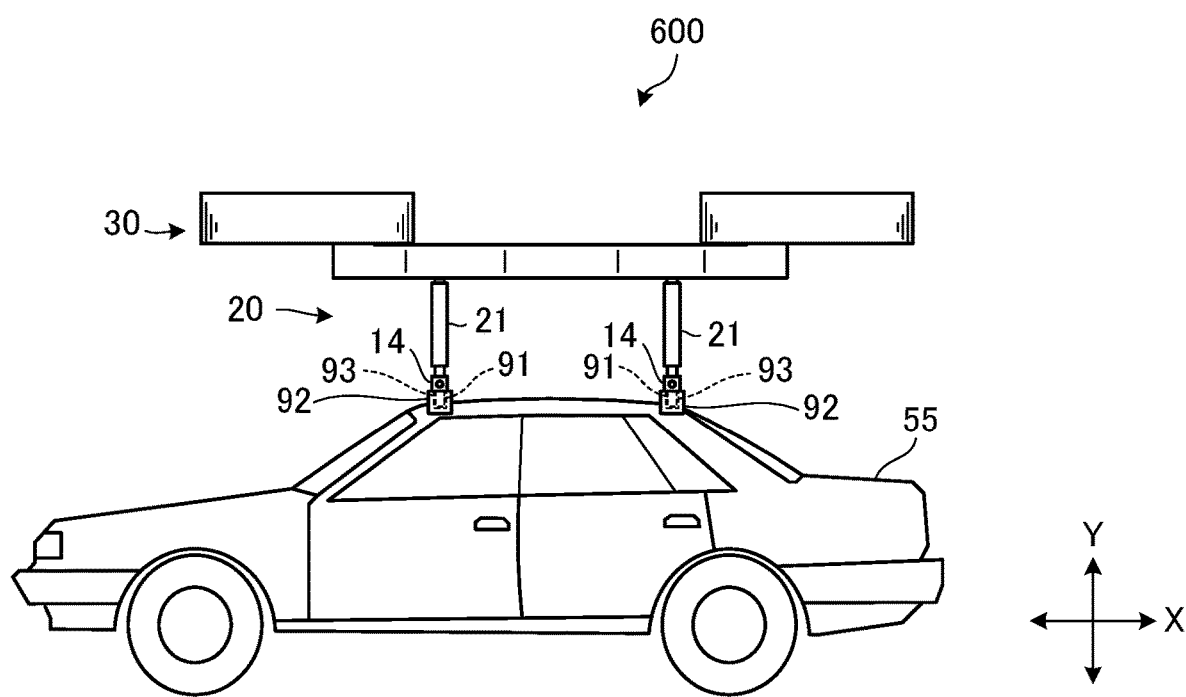
FIG. 20 is a side view showing the configuration of the aircraft according to a ninth embodiment.

FIG. 20 is a side view illustrating an aircraft 600 according to a ninth embodiment. As shown in FIG. 20, an object coupled to the lower portion of the second frame body 20 is an automobile (vehicle) 55 in the aircraft 600. The aircraft 600 is configured to have a structure in which a parcel (in this example, an automobile (vehicle)) to be delivered is directly coupled to the lower portion of the second frame body 20. As compared with the aircraft 600 of the ninth embodiment, a structure in which the first frame body 10 is coupled to the lower portion of the second frame body 20 like the above-described aircraft 100 to 500 can be understood as a structure in which the parcel 50 (the mounted load) is indirectly coupled to the lower portion of the second frame body 20 through the first frame body 10.

In FIG. 20, the coupling protrusion (coupler) 91 is provided, as means to couple the vehicle 55 to lower portion of the second frame body 20, on the lower surface of the joint block 14 provided on the lower end of each second strut 21 constituting the second frame body 20. The coupling protrusion 91 is formed as a column protrusion projecting downward from the lower surface of the joint block 14.

On the roof of the vehicle 55, four coupling members (coupled unit) 92 are provided to coincide with the coupling protrusions 91 provided on the respective lower ends of the four second struts 21. Each coupling member 92 is a means for coupling the vehicle 55 to the aircraft 600 (specifically, the second frame body 20) and is fixed to the upper surface of the roof of the vehicle 55. In FIG. 20, only two coupling members 92 disposed on the front side in the front-rear direction appear and illustration of the other two are omitted.

The upper surface of each coupling member 92 of FIG. 20 protrudes upward above the top face of the vehicle 55, and is provided with a fitting hole 93 for fitting the coupling protrusion 91.

To the coupling protrusion 91 and the coupling member 92, the locking mechanism (not shown) is provided for fixing the coupling protrusion 91 to the coupling member 92 in a state where the coupling protrusion 91 are fitted to the fitting hole 93. The structure of the locking mechanism is exemplified by a structure in which a boss portion is provided on the outer periphery of the coupling protrusion 91, a groove for engaging the boss portion is provided on the inner periphery of the fitting hole 93, and the coupling protrusion 91 is detachably fixed to the coupling member 92 by engagement between the boss portion and the groove. The locking mechanism is not limited to the above and may have any structure.

The procedure for coupling the vehicle 55 to the lower portion of the second frame body 20 is as follows. First, the aircraft 600 is positioned above the vehicle 55. Next, the coupling protrusion 91 provided on the lower end of each of the second strut 21 is positioned above each coupling member 92 on the roof of the vehicle 55 (specifically, the fitting hole 93). Then, by lowering the aircraft 600, the respective coupling protrusions 91 are fitted to the fitting holes 93. Then, the coupling protrusions 91 are fixed to the coupling member 92 by the locking mechanisms. Thereby, the vehicle 55 is coupled to the lower portion of the second frame body 20.

The coupling of the vehicle 55 to the second frame body 20 may be reinforced by using a rope, a chain, or a net, for example. Further, the vehicle 55 coupled to the lower portion of the second frame body 20 may be covered and protected with, for example, a protective net, a protective cover.

In the aircraft 600 having the above configuration, the control apparatus 60 can control the flying posture of the vehicle 55 by performing telescopic movement control on the second struts 21. For example, when the inclination of the posture of the aircraft 600 (specifically, the main body 30) is detected by a sensor, the control apparatus 60 carries out the telescopic movement control on each of the second struts 21 in accordance with the detected inclination. This makes it possible to maintain the posture of the vehicle 55 coupled to the lower portion of the second frame body 20 horizontally.

As the above, since the aircraft 600 has a structure in which the vehicle 55 is coupled to the lower portion of the second frame body 20, the vehicle 55 can be appropriately fixed to the aircraft 600, and also, the flying posture of the vehicle 55 can be controlled simply by telescopic movement control on the second struts 21 of the second frame body 20 in the axial direction. Consequently, the aircraft 600 can deliver the vehicle 55 coupled to the lower portion of the second frame body 20 in a stable posture. Incidentally, the coupling member (coupled unit) 92 provided on the vehicle 55 may of course be formed as a column protrusion which protrudes upward and a fitting hole 93 (coupling portion) fitted to the protrusion may also be of course provided to the lower surface of the joint block 14 provided on the lower end of each second strut 21.

Incidentally, in a state where the vehicle 55 is separated from the aircraft 600, each coupling member 92 provided on the roof of the vehicle 55 may be used as an attaching unit for attaching, for example, a roof carrier to the vehicle 55.

Figure 21:
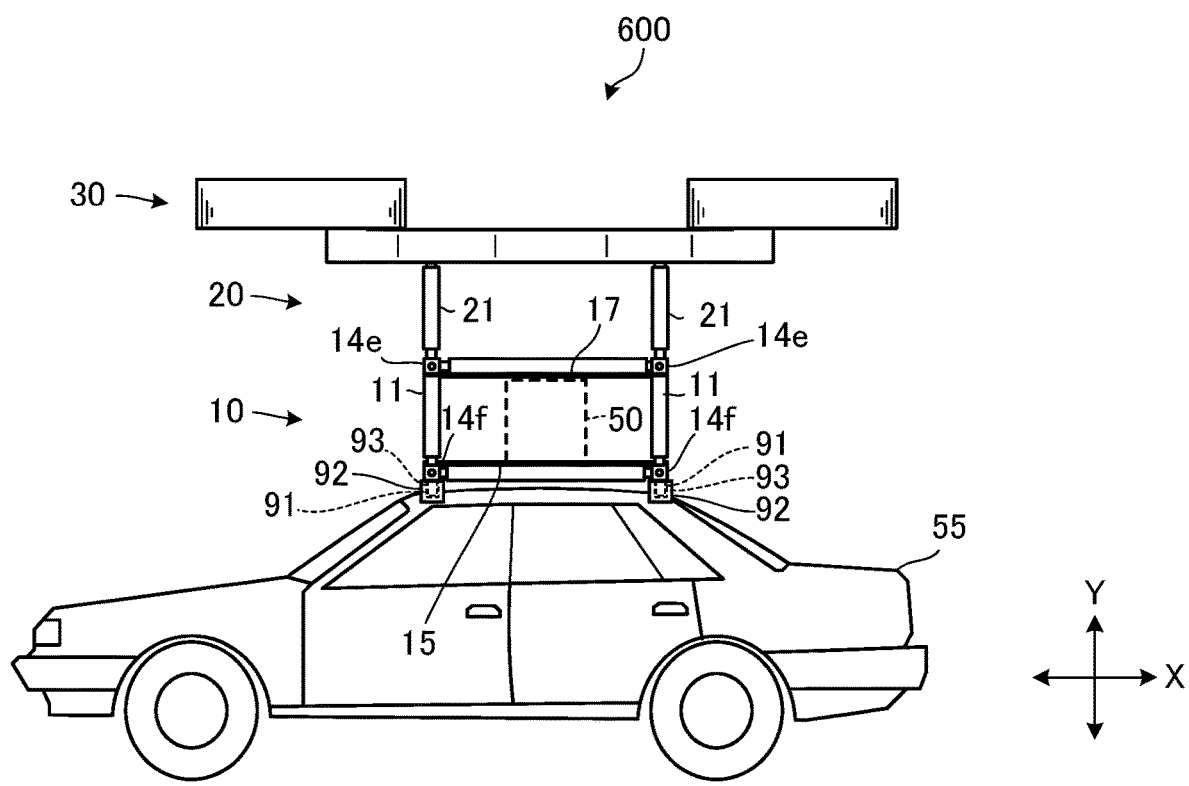
FIG. 21 is a side view illustrating the configuration of the aircraft according to a modification to the ninth embodiment.

As a modification of the aircraft 600, as shown in FIG. 21, the first frame body 10 may be provided on the lower portion of the second frame body 20 and the automobile (vehicle) 55 may be coupled to the lower portion of the first frame body 10. This means that the vehicle 55 is coupled to the lower portion of the second frame body 20, being interposed by the first frame body 10 (i.e., indirectly). In this alternative, the object coupled to the lower portion of the second frame body 20 can be understood to be the first frame body 10 and the vehicle 55.

At the lower portion of the second frame body 20, a joint block 14e serving as first coupler for coupling the first frame body 10 is provided on the lower end of each second strut 21, and additionally, the first frame body 10 is provided with male screws 114 (see FIG. 5), serving as first coupled unit for coupling to the first coupler, on the upper end of each first strut 11. Further, at the lower portion of the first frame body 10, the coupling protrusion 91 protruding from the lower surface of the joint block 14f provided on the lower end of each first strut 11 and serving as a second coupler for connecting the vehicle 55 is provided, and additionally the vehicle 55 is provided with a coupling member 92 serving as a second coupled unit for coupling to the second coupler and having the fitting hole 93.

In the above configuration, the vehicle 55 is coupled to the lower portion of the first frame body 10 by fitting the coupling protrusion 91 of the lower end of each first strut 11 into the fitting hole 93 of the coupling member 92 provided on the roof of the vehicle 55 and thereby fixing (coupling) the coupling protrusion 91 to the coupling member 92.

In this case, the parcel 50 (shown by a broken line in FIG. 22) can be mounted on the mounting surface 15 of the first frame body 10, and the parcel 50 can be sandwiched between the pressing surface 17 and the mounting surface 15 by controlling telescopic movement of the first trusts 11.

In relation to the embodiment shown in FIG. 21, any aircraft of the embodiments shown in FIGS. 1 to 20 may be mounted on the upper portion of the vehicle 55. In this case, the second coupler is provided on the lower end surface of each leg 40 of the embodiment shown in FIGS. 1 to 20, or each leg 40 is removed from the aircraft of the embodiment shown in FIGS. 1 to 20 and the second coupler is provided on the lower end surface of the joint block 14f of each first strut 11.

Incidentally, the vehicle 55 is not limited to the vehicle (ordinary passenger cars) illustrated in FIGS. 20 and 21, but may alternatively be of any type exemplified by a bus, a truck, a railway vehicle, a motorcycle, a bicycle, a snowmower, a construction vehicle such as a bulldozer or a excavator, an agricultural vehicle such as a tractor or a combine harvester, an agricultural work machine such as an agricultural cultivating machine, an agricultural machine, a mower, an industrial vehicle such as a forklift or an unmanned guided vehicle, and a wheelchair. Furthermore, various vehicles such as a ship, a boat, a hovercraft, a raft, an airplane, a rocket, and a satellite may also be coupled to the lower portion of the frame body 20.

When an agricultural work machine such as an agricultural vehicle, an agricultural cultivating machine, an agricultural machine, and a mower is detachably attached to the aircraft 600, the aircraft 600 mounted with the agricultural work machine flies to the work place (such as a field), and after arrival, the agricultural work machine is detached and execute a predetermined work. After the work, the agricultural work machine is coupled (docked) to the aircraft 600, and then moved to the next work place, or returned to the warehouse, being mounted on the aircraft 600.

An object directly connected to the lower portion of the second frame body 20 or the first frame body 10 in the aircraft 600 is not limited to the vehicle described above, and may alternatively be any load to be delivered exemplified by various parcels and a container, a box, a cages loaded with a parcel.

Tenth Embodiment

Vertical Flying Mechanism and Horizontal Flying Mechanism

Figure 22:
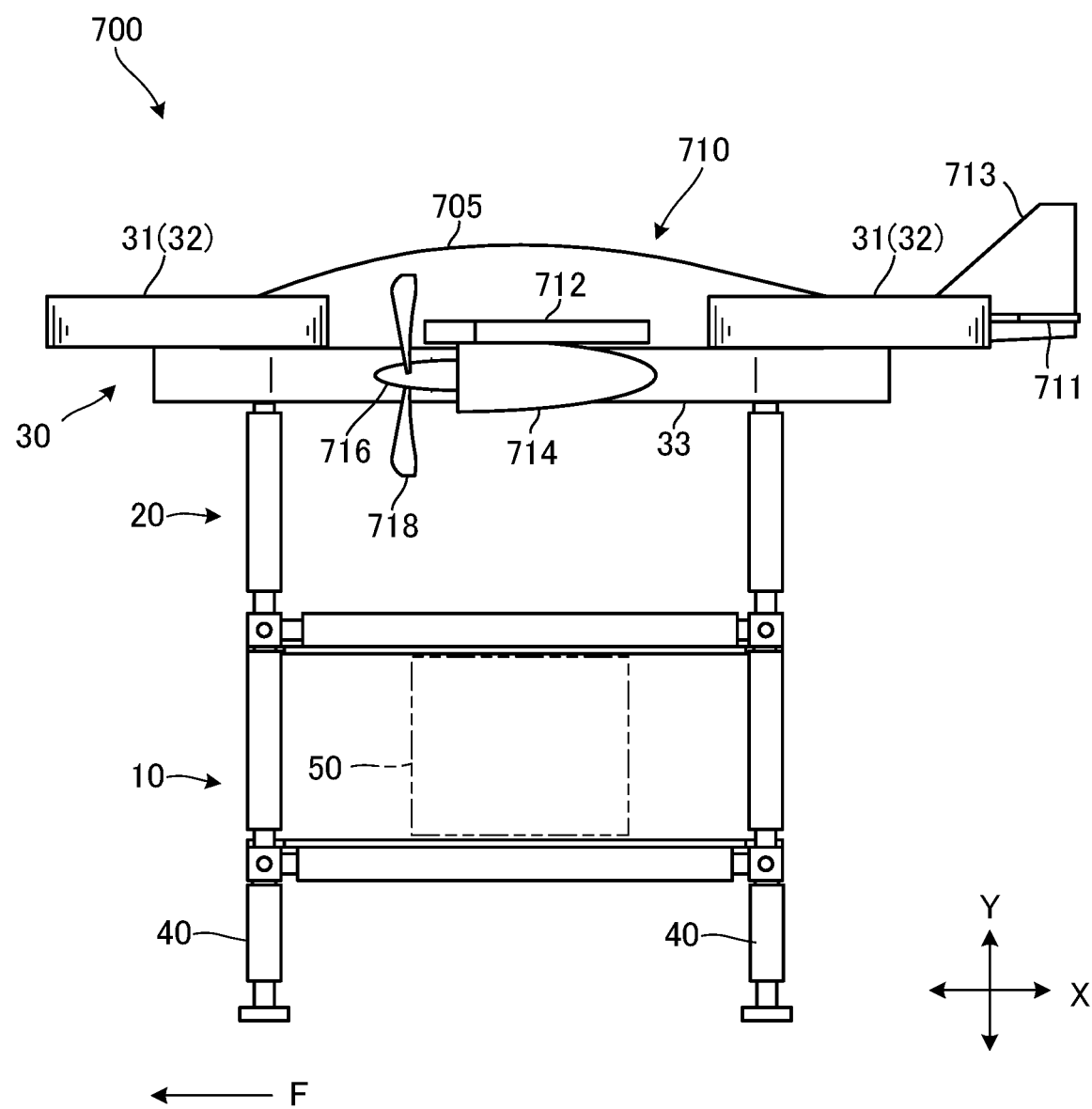
FIG. 22 is a side view of the aircraft according to a tenth embodiment.
Figure 23:
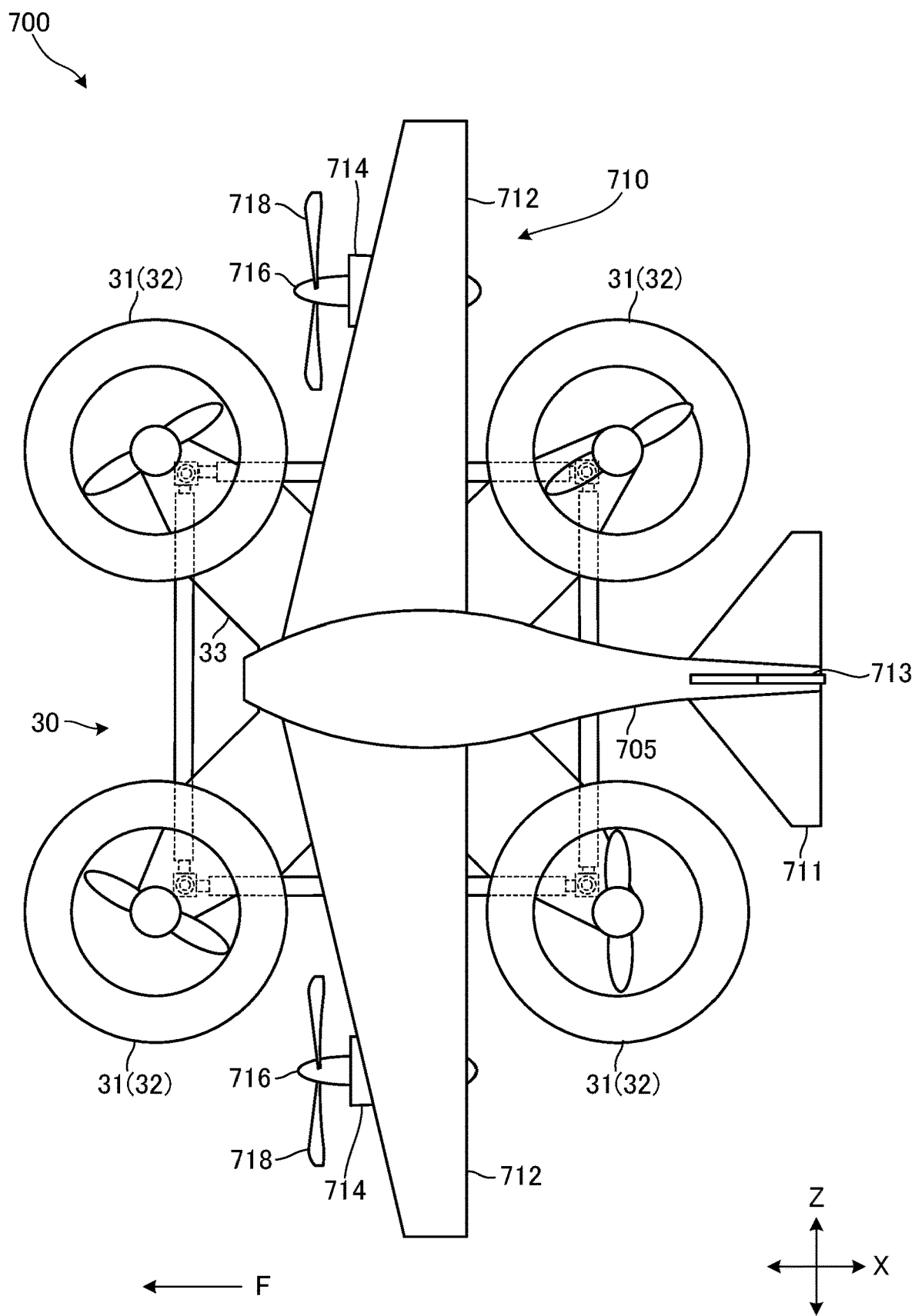
FIG. 23 is a plan view of the aircraft according to the tenth embodiment, as viewed from above.

FIG. 22 is a side view of an aircraft 700 according to a tenth embodiment; and FIG. 23 is a plan view of the aircraft 700 of FIG. 22 viewed from above.

The aircraft 700 is different from the aircraft 100 to 600 described above in that, in addition to the multicopter type flying mechanism 31 shown in FIGS. 1 and 2, a horizontal flying mechanism 710 for horizontal flight is provided in the main body 30. Here, the flying mechanism 31 of the multicopter type can be understood as a vertical flying mechanism for vertical flight.

The horizontal flying mechanism 710 is a flying mechanism suitable for flying the aircraft 700 in the horizontal direction. The horizontal flying mechanism 710 shown in FIGS. 22 and 23 includes a body portion 705 fixed to the base portion 33, a main wing 712 extending in a left-right direction from the body portion 705, a pair of right and left propeller portions 714 attached to the main wing 712, a tail 711 provided at a rear end portion of the body portion 705, and a vertical tail 713 provided at a rear end portion of the body portion 705.

Each propeller portion 714 includes a shaft 716 disposed along the forward direction F of the aircraft 700, and multiple blades (vanes) 718 protruding radially from the shaft 716, and is connected to the electric motor driven by a non-illustrated battery.

When each propeller portion 714 is driven to rotate by the non-illustrated electric motor, the blades 718 rotate about the shaft 716 to generate a propulsive force in the horizontal direction of the aircraft 700. Incidentally, the electric motor may be driven by not only a battery but also a generator. Any type of a generator may be any applied and is exemplified by one using an engine as a power source, such as a generator, a photovoltaic generator, or a wind power generator. The driving source of the propeller portion 714 is not limited to an electric motor, but may alternatively be of any type, such as an internal combustion engine or a jet engine, as far as it can drive the propeller portion 714.

The control apparatus 60 controls the flight of the flying mechanism (vertical flying mechanism) 31 of the multicopter type and the horizontal flying mechanism 710 independently of each other. For example, the control apparatus 60 activates exclusively the flying mechanism (vertical flying mechanism) 31 when moving in the vertical direction such as takeoff and landing, and exclusively activates the horizontal flying mechanism 710 when moving in the horizontal direction.

Thus, the aircraft 700, which has a flying mechanism (vertical flying mechanism) and the horizontal flying mechanism 710, possesses long-distance movability and also high-speed movability in the horizontal direction of the horizontal flying mechanism 710 in addition to excellent vertical flyability of the flying mechanism 31 of the multicopter type.

The aircraft 700 has the common components with the aircraft 100 of the first embodiment except for the point of having the horizontal flying mechanism 710 in addition to the flying mechanism 31 and therefore can be used as an aircraft of the distribution system 1. The aircraft 700, when being used as an aircraft of the distribution system 1, brings advantages of, in addition to the distribution stability of the parcel 50, expansion of the distribution service area and shortening of the distribution time.

Eleventh Embodiment

Vertical Flying Mechanism and Horizontal Flying Mechanism

Figure 24:
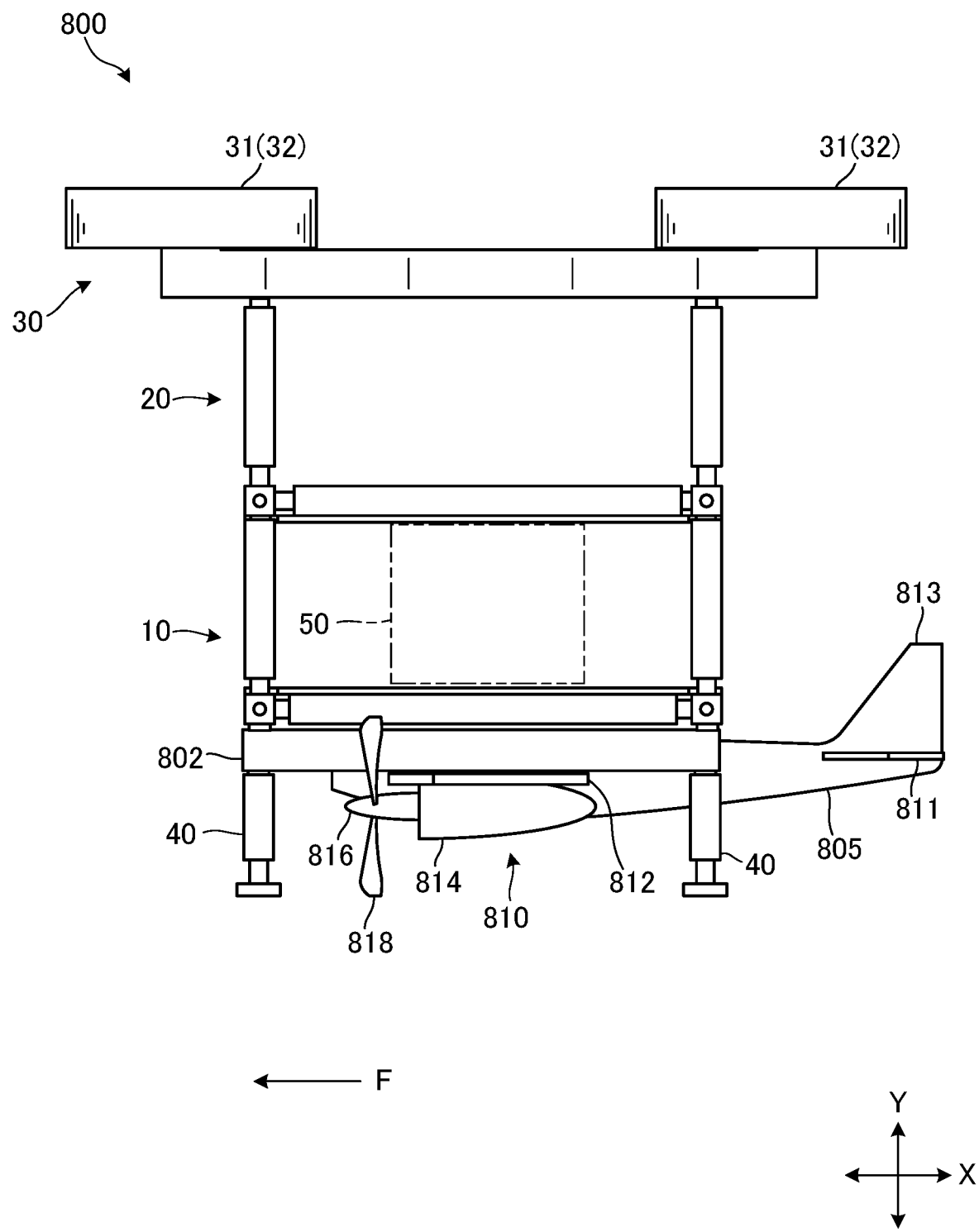
FIG. 24 is a side view of the aircraft according to an eleventh embodiment.
Figure 25:
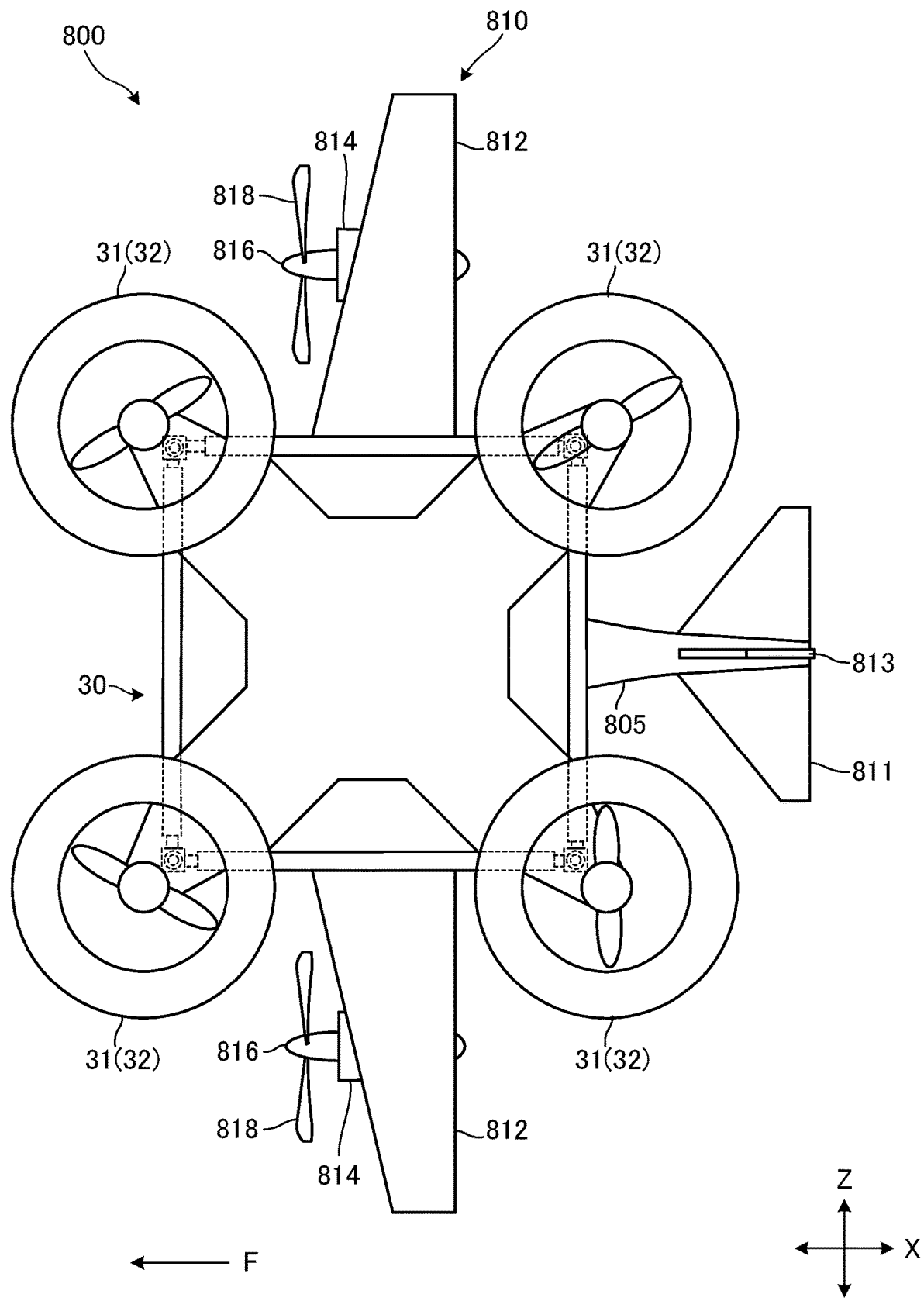
FIG. 25 is a plan view of the aircraft according to the eleventh embodiment, as viewed from above.

FIG. 24 is a side view of an aircraft 800 according to an eleventh embodiment; and FIG. 25 is a plan view of the aircraft 800 of FIG. 24 viewed from above. The aircraft 800 is different from the tenth embodiment in the point of including, in the main body 30, the flying mechanism 31 of a multicopter type serving as a vertical flying mechanism for vertical flight and also including, at the lower portion of the first frame body 10, a horizontal flying mechanism 810 for horizontal flight. In this case, the object coupled to the lower portion of the second frame body 20 can be understood to be the first frame body 10 and the horizontal flying mechanism 810.

The horizontal flying mechanism 810 is coupled to the lower portion of the first frame body 10 through the base portion 802, and includes a body portion 805 fixed to the base portion 802, a main wing 812 extending in a left-right direction from the body portion 805, a pair of right and left propeller portions 814 attached to the main wing 812, a tail 811 provided at a rear end portion of the body portion 805, and a vertical tail 813 provided at a rear end portion of the body portion 805.

Each propeller portion 814 includes a shaft 816 disposed along the forward direction F of the aircraft 800, and multiple blades 818 protruding radially from the shaft 816, and is connected to an electric motor driven by a non-illustrated battery.

When each propeller portion 814 is driven to rotate by the non-illustrated electric motor, the blades 818 rotate about the shaft 816 to generate a propulsive force in the horizontal direction of the aircraft 800. Incidentally, the electric motor may be driven by not only a battery but also a generator. Any type of a generator may be any applied and is exemplified by one using an engine as a power source, such as a generator, a photovoltaic generator, or a wind power generator. The driving source of the propeller portion 814 is not limited to an electric motor, but may alternatively be of any type, such as an internal combustion engine or a jet engine, as far as it can drive the propeller portion 814.

The control apparatus 60 controls the flight of the flying mechanism (vertical flying mechanism) 31 and the horizontal flying mechanism 810 independently of each other. For example, the control apparatus 60 activates exclusively the flying mechanism (vertical flying mechanism) 31 when the vertical flight and exclusively activates the horizontal flying mechanism 710 when moving in the horizontal direction. Thus, the aircraft 800 also possesses long-distance movability and also high-speed movability in the horizontal direction of the horizontal flying mechanism 810 in addition to excellent vertical flyability of the flying mechanism 31 of the multicopter type.

The aircraft 800 has the common components with the aircraft 100 of the first embodiment except for the point of having the horizontal flying mechanism 810 in addition to the flying mechanism 31, and therefore can be used as an aircraft of the distribution system 1. Therefore, also the aircraft 800, when being used as an aircraft of the distribution system 1, brings advantages of, in addition to the distribution stability of the parcel 50, expansion of the distribution service area and shortening of the distribution time.

As a modification of the eleventh embodiment, the aircraft 800 may have a structure in which the horizontal flying mechanism 810 is coupled to the lower portion of the second frame body 20 and the first frame body 10 is coupled to the lower portion of the horizontal flying mechanism 810.

The aircraft 700 of the tenth embodiment and the aircraft 800 of the eleventh embodiment described above each can be understood to be aircraft having a horizontal flying mechanism 710, 810 suitable for horizontally flying the aircraft 700 separately from the flying mechanism 31 (vertical flying mechanism) of the multicopter type shown in, for example, FIGS. 1 and 2.

Twelfth Embodiment

Single-Point Supporting Mechanism

Figure 26:
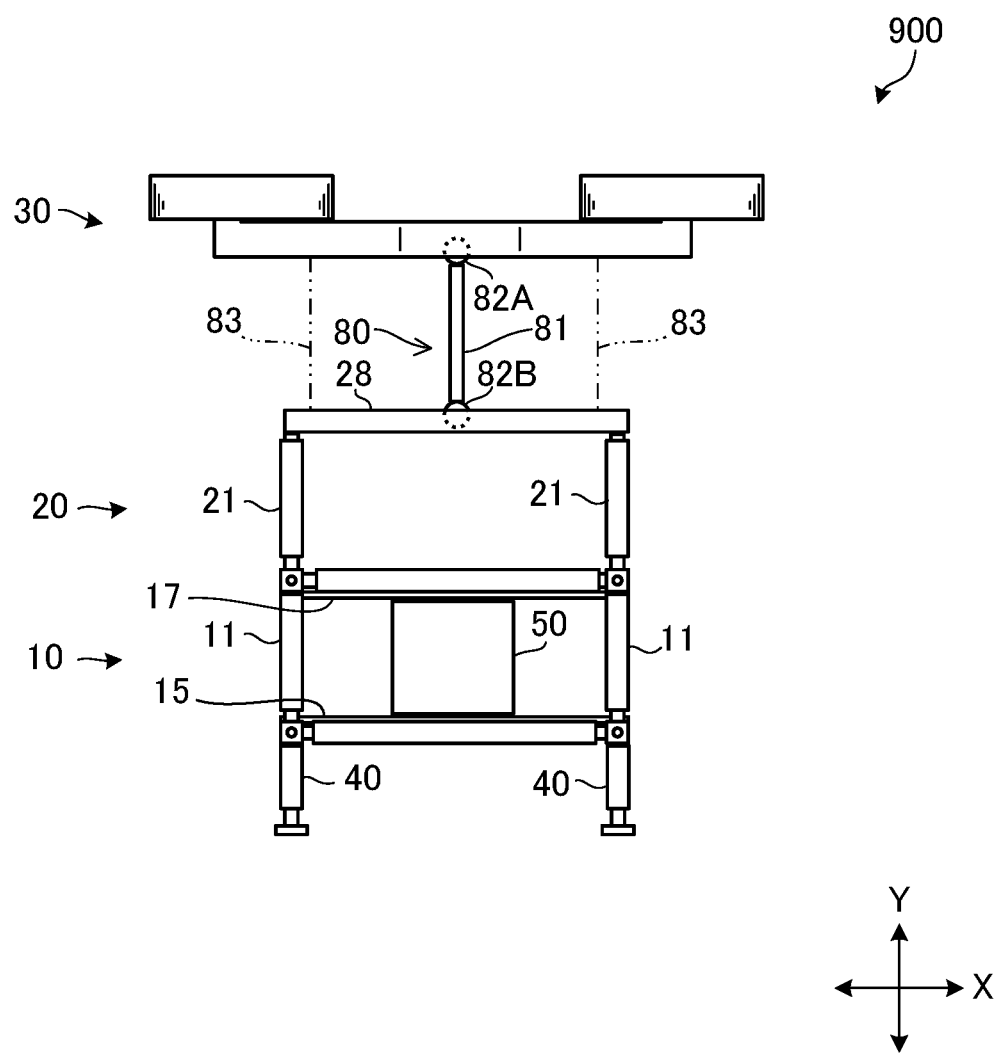
FIG. 26 is a side view of the aircraft according to a twelfth embodiment.

FIG. 26 is a side view of the aircraft 900 according to the twelfth embodiment. In the aircraft 900, an auxiliary coupling mechanism 80 is attached to the second frame body 20. The auxiliary coupling mechanism 80 has a single rod-shaped pole 81 interposed between the second frame body 20 and the main body 30. The auxiliary coupling mechanism 80 is formed by a single-point supporting mechanism which is coupled to the lower surface of the main body 30 at one point of the upper portion of the pole 81 and is also coupled to the upper portion of the second frame body 20 at one point of the lower portion of the pole 81.

The auxiliary coupling mechanism 80 is provided in order to auxiliarily maintain the first frame body 10 (object) horizontally in cooperation with the flying posture control achieved by adjusting the position in the up-down direction of the attaching unit 25 of the second frame body 20.

The pole 81 shown in FIG. 26 is coupled to the lower surface of the main body 30 and the upper portion of the second frame body 20 via pivot joints (ball joints). For this purpose, spherical bodies 82A and 82B are formed on the upper and lower ends of the pole 81.

The upper spherical body 82A is fitted to a recess (not shown) which is recessed in a spherical shape at the lower surface of the main body 30. On the upper face portion of the second frame body 20, a top plate 28 is provided as a coupling body to the auxiliary coupling mechanism 80. The lower spherical body 82B is fitted to recess (not shown) which is recessed in a spherical shape at the upper surface of the top plate 28.

The auxiliary coupling mechanism 80 includes, as a structure for auxiliarily maintaining the horizontality of the first frame body 10 (object) in accordance with the posture of the flying mechanism 31 (main body 30), a driving mechanism and a sensor at each of the upper and lower ends of the pole 81. The driving mechanism includes, for example, a gear pair of a first gear that rotates about an axis along the front-rear direction and a second gear that rotates about an axis along the left-right direction, and electric motors each of which rotatably drives one of the first gear and the second gear. Each electric motor is driven by a non-illustrated battery. The sensor may include a variety of sensors, such as a distance sensor and an angle sensor for detecting inclination of the three directions of the front-rear, left-right, and up-down directions.

The control apparatus 60 controls the driving mechanism of the auxiliary coupling mechanism 80 on the basis of a signal detected by the sensor. Control of the driving mechanism is implemented to assist the horizontal maintenance of the first frame body 10 (object) by the flying posture control in the second frame body 20 in cooperation with the flying posture control in the second frame body 20. The aircraft 900 further enhances the stability of the flying posture of the first frame body 10.

The driving mechanism of the auxiliary coupling mechanism 80 may be any known mechanism, such as an actuator mechanism, a gyro mechanism, a stabilizer, that controls a rotation angle about an axis along the front-rear direction and a rotation angle about an axis along the left-right direction as far as the driving mechanism can auxiliarily maintain the horizontality of the first frame body 10.

The driving mechanism of the auxiliary coupling mechanism 80 may be provided on only one of the upper or lower ends of the pole 81.

The control of driving mechanism of the auxiliary coupling mechanism 80 is not limited to automatic control, or may alternatively be manual control made by, for example, wireless or wired remote operation of an operator.

The auxiliary coupling mechanism 80 may be a structure not having a driving mechanism. In that case, the auxiliary coupling mechanism 80 can be understood as a mechanism for suspending the second frame body 20 to the main body 30 via the pole 81 in a gondola type.

The auxiliary coupling mechanism 80 is not limited to a structure that is supported at one point on both of the upper portion and the lower portion, and may be a structure that is supported at one point on one of the upper side or the lower side and supported at multiple points on the other of the upper side or the lower side.

The shape and the dimension of the auxiliary coupling mechanism 80 are not limited to those of the illustrated example. The pole 81 may be formed to be extendable or contractible. The auxiliary connecting mechanism 80 may be detachably attached to the main body 30 and the second frame body 20.

The pole of the auxiliary coupling mechanism 80 is not limited to a single rod, but may be formed by a link member having two arms coupled to each other via a joint mechanism formed of a sphere body (ball joint), for example. In this case, the auxiliary coupling mechanism 80 (link member) is a structure that suspends the second frame body 20 from the main body 30 in a pendulum manner.

Further alternatively, the auxiliary coupling mechanism 80 may also be formed of any link mechanism, such as a rhombic link mechanism of a pantograph type, an arm member (wiper type structure) rotatably mounted on the lower surface of the main body 30.

Incidentally, an auxiliary supporting member 83 (see two-dot chain line in FIG. 26) may be provided for holding the posture of the main body 30 in a constant state when the aircraft 900 is in a stationary state such as a landing state. The auxiliary supporting member 83 is configured to be extendable and contractible or foldable, and is, when the aircraft 900 is in the flight state, housed in the main body 30.

II. System for Controlling Aircraft

1. Overall System Configuration

Next, description will now be made in relation to a system for controlling an aircraft that controls flight of the aircraft 100 to 900 according to the respective embodiments described above. Hereinafter, a control system utilizing the aircraft 100 is exemplified, but the system for controlling an aircraft may use any of the aircraft 100 to 900 of the respective embodiments.

Figure 27:
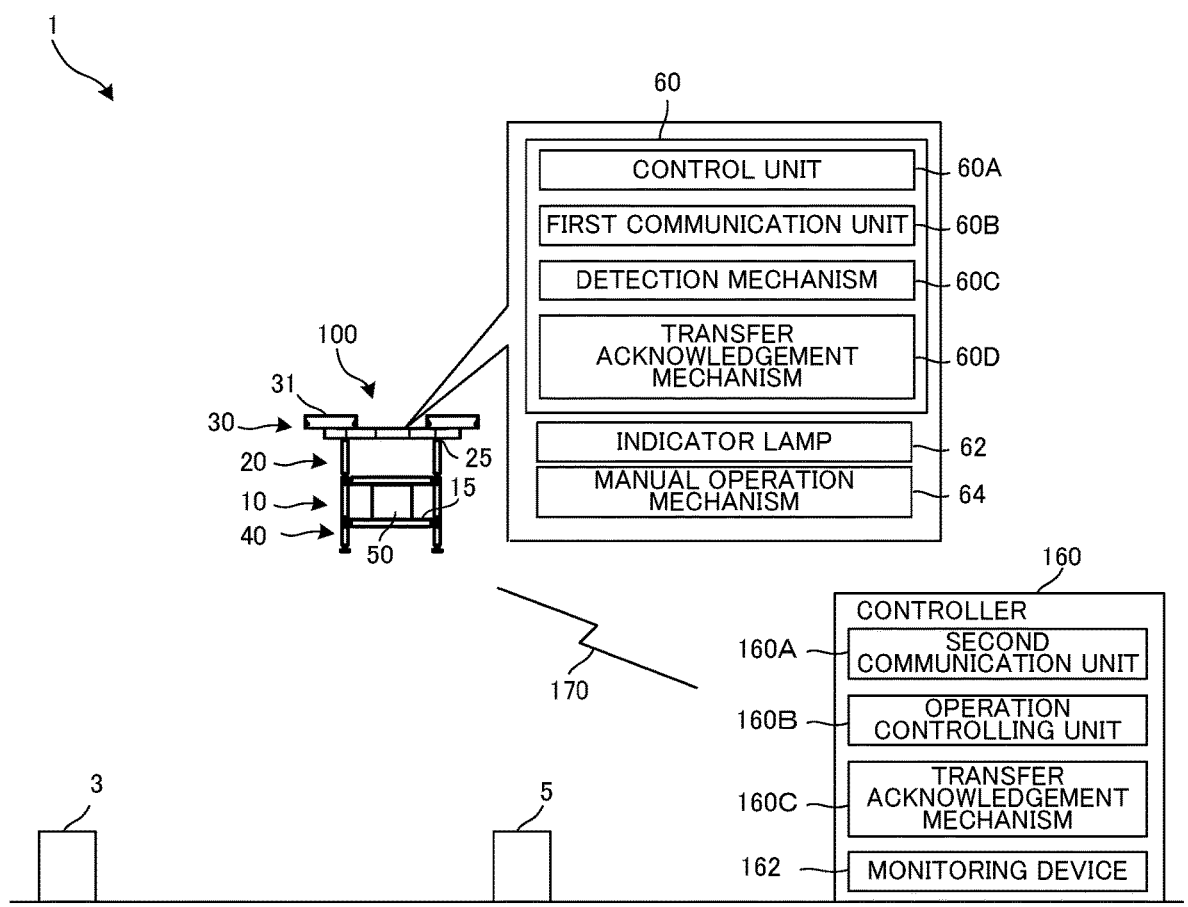
FIG. 27 is an overall configuration diagram of a system for controlling an aircraft.

FIG. 27 is an overall configuration diagram of a system for controlling an aircraft according to the present embodiment. In the present embodiment, description will now be made in relation to the distribution system 1 that distributes the parcel 50 mounted on the aircraft 100 from a predetermined start point 3 to a predetermined destination point 5 as an example.

The distribution system 1 of the present embodiment includes the aircraft 100 capable of mounting the parcel 50, and a controller 160 that controls the operation of the aircraft 100 mounted with the parcel 50 such that the parcel 50 is distributed from the predetermined start point 3 to the predetermined destination point 5. The aircraft 100 and the controller 160 are each configured to be communicable via a radio line 170.

The aircraft 100 is an airplane that flies from the start point 3 to the destination point 5 to distribute the parcel 50. The start point 3 is, for example, the distributor of the parcel 50, such as a warehouse, a factory, or a distributor's sales office. The destination point 5 is, for example, the distribution destination of the parcel 50 such as a store or a private house.

The configuration of the aircraft 100 is different in that the control apparatus 60 includes the functional elements necessary to use the aircraft 100 in the distribution system 1, and the remaining is the same as the above. Namely, the control apparatus 60, as will be described below, includes functions to communicate with the controller 160 and control each elements in obedience to an instruction of the controller 160 in addition to the functions of telescopic movement control on the first struts 11, the second struts 21 and the legs 40, and control on the flying mechanism 31.

In order to control the operation of the aircraft 100, the controller 160 has a wireless communication function for performing wireless communication with the aircraft 100, and a monitoring function for monitoring the operation status of the aircraft 100. The controller 160 is installed at a service base of a delivery service provided by the distribution system 1, which base is exemplified by a sales office of a distribution service or a convenience store.

2: Control Apparatus of Aircraft

The control apparatus 60 of the aircraft 100 is provided with, as a functional element for controlling the aircraft 100, a control unit 60A, a first communication unit 60B, a detection mechanism 60C, and a transfer acknowledgement mechanism (first transfer acknowledgement mechanism) 60D.

The control unit 60A carries out the telescopic movement control (flying posture control) on the above-described first struts 11, the second struts 21, and the legs 40, and the flying control to control the working of the flying mechanism 31. The flying control and the flying posture control are described as functional elements of the control apparatus 60 in the first embodiment.

The first communication unit 60B transmits and receives various kinds of information to and from the controller 160 through the wireless line 170. The aircraft 100, via the first communication unit 60B, receives various piece of control information from the controller 160 and also transmits various information such as detecting information by the detecting mechanism 60C to the controller 160.

The detection mechanism 60C is a mechanism that detects various pieces of information indicating the present flying status of the aircraft 100. The detection mechanism 60C include various sensors (not shown), a camera (not shown) that photographs the surroundings of the aircraft, a GPS (Global Positioning System) device (not shown) that obtains position information, and the like. The various sensors include, for example, a speed sensor, an acceleration sensor, an altimeter, or a radar for recognizing an obstacle or the like present on a flight route, a sensor for detecting information on a flight status, a sensor for height adjustment of the first frame body 10 and the second frame body 20, and the like.

The detection mechanism 60C transmits, as flight information, various pieces of data obtained by the various sensors, the camera, the GPS device or the like described above, to the control unit 60A and also to the controller 160 through the first communication unit 60B. The flight information is information indicating the current flight status of the aircraft 100, and is used for the flight control by the control unit 60A and monitoring of the operation status of the aircraft 100 by the controller 160.

The transfer acknowledgement mechanism 60D is a mechanism for acknowledging transfer of the parcel 50, and is configured to include, for example, an object detection sensor (detection mechanism) for detecting whether or not there is the parcel 50 on the mounting surface 15 of the first frame body 10. For example, the transfer acknowledgement mechanism 60D generates a transfer acknowledgement signal indicating that the parcel 50 is mounted when the parcel 50 is mounted on the first frame body 10 at the start point 3, and generates a transfer acknowledgement signal indicating that the parcel 50 has been passed when the parcel 50 is unloaded from the first frame body 10 at the destination point 5. The transfer acknowledgement signals are transmitted to the controller 160 via the first communication unit 60B. The transfer acknowledgement signal may include ancillary information such as the delivery date and time, the name of the parcel 50, the delivery signature of the delivery source, and the receipt signature of the delivery destination.

Further, the aircraft 100 includes, in addition to the above, an indicator lamp 62 and a manual operation mechanism 64. The indicator lamp 62 is lamps used as an illuminating light that illuminates the front of the aircraft 100, a navigation lamp or warning lamp for notifying the flight direction or the like to the surroundings. The manual operation mechanism 64 includes switches and a communication device for receiving various manual operations. An example of the manual operation mechanism 64 is a switch for manually adjusting the height of the first frame body 10 in order to fix the parcel 50.

3. Configuration of Controller

The controller 160 is a computer that includes a storage device including a non-illustrated CPU, a ROM and a RAM, an input interface, an output interface, and a bus that interconnects these elements. In the storage device, various control programs and various types of data required to execute these control programs are stored.

The controller 160 is provided with, as a functional elements for controlling the operation of the aircraft 100, a second communication unit 160A, an operation controlling unit 160B, and a transfer acknowledgement mechanism (second transfer acknowledgement mechanism) 160C.

The second communication unit 160A is provided for transmitting and receiving various types of information to and from the aircraft 100 via the radio line 170. Through the second communication unit 160A, the controller 160 transmits various pieces of control information to the aircraft 100 and also receives various pieces of information such as detection information by the detection mechanism 60C from the aircraft 100.

The operation control unit 160B is provided for controlling the operation of the aircraft 100, and has a route setting function including the setting of the start point 3 and the destination point 5 of the aircraft 100 and the setting of the route from the start point 3 to the destination point 5, and a monitoring function for monitoring the operation status of the aircraft 100.

The information indicating the start point 3, the destination point 5, and the route set by the route setting function is transmitted, as the route setting information, to the aircraft 100 via the second communication unit 160A. The monitoring function includes, for example, instructions for the starting and finishing the distribution service to the aircraft 100, tracking of the aircraft 100 (monitoring of the flight trajectory), monitoring the flight status of the aircraft 100, monitoring of abnormalities and defects. The route setting functions and the monitoring functions are provided in the form of software programs which are implemented using hardware resources of the controller 160.

The transfer acknowledgement mechanism 160C is a mechanism for acknowledging the transfer of the parcel 50, and has a function of acquiring a transfer acknowledgement signal from the aircraft 100 via the second communication unit 160A to acknowledge that the transfer of the parcel 50 has been performed.

Further, the controller 160 is provided with a monitoring device 162 for presenting the operation status of the aircraft 100 to the operator. The monitoring device 162, for example, is configured to be a display device for displaying the operation status of the aircraft 100 in visual information. Conceivable examples of the display contents are an image taken by the camera mounted on the aircraft 100, a current position of the aircraft 100 on the map image, a flight trajectory, a flight altitude, a speed, a distance to the destination point, and the expected arrival time to the destination point. The monitoring device 162 may be a voice output device for outputting the operation status in voice information.

4. Controls in Distribution System

Flow of Distribution Service

Next, description will now be made in relation to the procedure of the distribution service in the distribution system 1 having the above configuration. The present distribution system 1 performs, when receiving a request (order) for distribution from a client, the distribution service corresponding to the order, for example.

When the operator inputs the information of, for example, the start point 3 and the destination point 5, the article name of the load, the controller 160 sets the start point 3, the destination point 5, and the route of the order by referring to map information stored in the storage device on the basis of the input information. Then, the controller 160 transmits the aircraft 100 the route setting information including the start point 3, the destination point 5 and the route that are set.

In the aircraft 100, the route setting information is acquired from the controller 160, and also the parcel 50 is mounted on the first frame body 10 at the start point 3. Incidentally, the aircraft 100 may be always waiting at a specific start point 3, or may move to the start point 3 indicated in the route setting information upon obtaining the route setting information from the controller 160.

In the aircraft 100, when the parcel 50 is mounted on the first frame body 10, a transfer acknowledgement signal is generated, and the generated transfer acknowledgement signal is transmitted to the controller 160. The controller 160 acquires the transfer acknowledgement signal from the aircraft 100 and acknowledges that the parcel 50 is properly mounted on the aircraft 100. The controller 160 transmits a distribution start instruction to the aircraft 100 after the acknowledgement.

Upon receiving the distribution start instruction from the controller 160, the aircraft 100 sets the start point 3, the destination point 5, and the route based on the route setting information, to fly automatically according to the route (autonomous flight control). When the aircraft 100 flies to and lands at the destination point 5, the parcel 50 of the aircraft 100 is received at the distribution destination. At this time, a transfer acknowledgement signal is generated, and the generated transfer acknowledgement signal is transmitted to the controller 160. The controller 160 acquires the transfer acknowledgement signal from the aircraft 100 to acknowledge that the parcel 50 is properly received by the aircraft 100, and terminates the distribution service responsive to the order.

Example of Autonomous Flight Control

Next, description will now be made in relation an example of autonomous flight control of the aircraft 100.

The control unit 60A of the aircraft 100 sets the start point 3, the destination point 5, and the route based on the route setting information transmitted from the controller 160. Then, the control unit 60A, in order to automatically (autonomously) fly according to the set route, (1) recognizes the flight situation based on the flight information detected by the detection mechanism 60C, (2) determines how the flying mechanism 31 should operate on the basis of the result of the cognition, (3) generates flight control information for controlling the operation of the flying mechanism 31 based on the result of the determination, and (4) controls the operation of the flying mechanism 31 of the main body 30 based on the generated flight control information. The flight control information includes, for example, a control signal for controlling the rotation of multiple rotary wings 32 to be described later independently of one another.

Cognition of the above flight status includes cognition of the current position of the aircraft 100 based on GPS position information and the map information stored in the storage device, cognition of the surrounding conditions (such as the presence or absence of obstacles on the route) based on camera images and/or detected signals by the sensor such as a radar, or cognition of the driving conditions such as the flight altitude, speed, acceleration, and flight direction (up, down, front, back, left, and right) of the aircraft 100.

The autonomous flight control may include not only automatic flying from start point 3 to destination point 5 according to the set route, but also hazard avoidance control to autonomously avoid obstacles on the route, and route setting control to appropriately correct the set route or to re-select the optimum route. Incidentally, the autonomous flight control of the aircraft 100 can adopt a well-known technique.

Further, during autonomous flight of the aircraft 100, the controller 160 monitors the operation of the aircraft 100, and may instruct the aircraft 100 to correct the route as required.

In this distribution system 1, under a state where the operation control unit 160B of the controller 160 is controlling the operation of the aircraft 100, the aircraft 100 autonomously flies from the start point 3 to the destination point 5, so that the parcel 50 can be surely distributed to the destination point 5 in safety.

The above description assumes that the controller 160 sets the route and transmits the route setting information indicating the start point 3, the destination point 5, and the route to the aircraft 100, but the autonomous flight control is not limited to this. Alternatively, the controller 160 may transmit the route setting information indicating the start point 3 and the destination point 5 to the aircraft 100, the control unit 60A of the aircraft 100 may determine the route connecting the start point 3 and the destination point 5 by referring to the map information on the basis of the start point 3 and the destination point 5 transmitted from the controller 160.

Example of Remote Control

As another example, the flight of the aircraft 100 (operation of the flying mechanism 31) may be remotely controlled from the controller 160. In this case, in order to fly the aircraft 100 according to the set route, the controller 160 (1) recognizes the flight status of the aircraft 100 based on the flight information transmitted from the aircraft 100, (2) determines how the flying mechanism 31 should operate on the basis of the result of the cognition, (3) generates the flight control information based on the result of the determination, and (4) transmits the generated flight control information to the aircraft 100. In the aircraft 100, the operation of the flying mechanism 31 is controlled on the basis of the flight control information transmitted from the controller 160.

As another example of the remote control, in the controller 160, the operation of the flight of the aircraft 100 (operation of the flying mechanism 31) may be remotely controlled by the operator manually inputting the operation information (flight control information), monitoring the operation of the aircraft 100 with reference to the monitoring device 162.

Application Example

As one of the application examples of the present distribution system 1, it is conceivable to apply the present distribution system 1 to the final distribution section (so-called last one mile) from the relay base (start point 3) of the logistics to the end consumer (destination point 5). In this case, for example, the distribution of parcels in the long distance interval from the warehouse or the like to the relay base may be carried out by suitable distribution means for long distances, such as a trucks, a freight train, or a freight airplane. Conceivable Examples of the rely base that will serve as the start point 3 are a sales office for a distribution service, a convenience store, a post office, and a police box. Since the aircraft 100 is used to distribute the parcel in the final distribution interval from the start point 3 to the destination point 5, the parcel 50 can be easily distributed even if the destination point 5 is a remote area with insufficient distribution network, such as an isolated island and a mountainous area.

5. Effect of Distribution System

In the aircraft 100 to be applied to the present distribution system 1, the control unit 60A controls the flying posture of the first frame body 10 mounted with the parcel 50 to be maintained horizontally. For the above, even if the posture of the flying mechanism 31 is changed, for example, inclined, due to a change in the flight status such as sudden acceleration of the aircraft 100 or the influence of the surrounding conditions such as wind, the parcel 50 mounted on the first frame body 10 can be stably distributed by controlling the flying posture of the first frame body 10. Therefore, the stability of the parcel 50 mounted on the aircraft 100 is enhanced. Since using the aircraft 100 with enhanced stability of the loaded parcel 50, the present delivery system 1 can provide a highly safe distribution service that suppresses the risk of falling of the parcel 50.

It is needless to say that the present distribution system 1 is suitable for distribution of a common product, and is also suitable for distribution of a medicine, which requires more stability, for example.

III. Others

Deformation and Dimension of Frame Body

The shapes of the first frame body 10 and the second frame body 20 are not limited to a cuboid or a rectangular parallelepipeds having the rectangular upper and lower surfaces, but may be any shapes such as a column shape, a triangular prism shape, and polygonal prism shapes having five or more side surfaces. Therefore, the top view of first frame body 10 and the second frame body 20 may each have a column, a polygonal shape more than a pentagon.

The joint block 14 is not limited to a hexahedron, or may alternatively be formed into another appropriate polyhedron. The shapes of the first frame body 10 and the second frame body 20 can be changed into various shapes by appropriately combining the shapes of the joint blocks 14.

The dimensions of first frame body 10 and the second frame body 20 can be varied variously by appropriately combining the lengths of the pipe bodies. The drawings assume that the first frame body 10 and the second frame body 20 in the aircraft 100 to 900 have the same dimensions in the front-rear direction and the left-right direction, but the dimensions of the first frame body 10 in the front-rear direction and the left-right direction may alternatively be different from those of the second frame body 20.

Also, the shapes and the dimensions of the floor plate (the mounting surface 15, the pressing surface 17) covering the lower face portion of the first frame body 10 and the second frame body 20 are not required to be the same as the shapes and dimensions of lower face portion the first frame body 10 and the second frame body 20. For example, if the lower face portions of the first frame body 10 and the second frame body 20 are rectangular in top face view, the floor plate may be a circular protruding from lower face portions of the first frame body 10 and the second frame body 20.

Use of Ball Joint

Further, if the first frame body 10, the second frame body 20, and the frame of the main body 30 are formed of an assembled frame-like structure using multiple telescopic pipe bodies, the pipe bodies may be coupled to each other by using pivot joints (ball joints) in place of or in combination with the above joint blocks 14.

In this case, the shape of a frame-like structure can be deformed by freely adjusting the angle of the coupling part (joint) of the pipe bodies. For example, if the frame of the main body 30 (the base portion 33 and the arms 34) is formed of multiple pipe bodies coupled to one other by ball joints, the attachment angle of the arm 34 to the base portion 33 can be freely changed. Incidentally, a ball joint may be provided with a fixing mechanism for fixing the angle of the coupling portion (joint) of the pipe bodies. With this configuration, after adjusting the angle of the coupling portion (joint) of the pipe bodies, the angle of the coupling portion of the pipe bodies can be fixed at the angle after adjustment.

Other Attached Structures

Coverage of Frame Body

The first frame body 10 can be formed into a frame-like structure of the container type by providing a wall face which can be opened and closed on each of the four sides of the first frame body 10 to close the four sides of the first frame body 10 with the wall faces.

Further alternatively, the overall part of the first frame body 10 and the second frame body 20, or the overall part of each of first frame body 10 and the second frame body 20 may be covered with a windshield capsule to reduce the resistance of wind.

Air Suspension Device

Further, each of the multiple second struts 21 of the second frame body 20 may have an air suspension device, which exerts a function for maintaining the flying posture of the first frame body 10 horizontally. Further, each of the multiple first struts 11 of the first frame body 10 may have an air suspension device.

Buffer Mechanism

Further, the mounting surface 15 of the first frame body 10 may be attached to the first frame body 10 via a suspension mechanism (loading mechanism of the delivery transporter device type) in which an air damper and a metal spring is combined. For example, the mounting surface 15 may be suspended through such a suspension mechanism mounted on the upper face portion of the first frame body 10. In this case, the suspension mechanism is configured to freely extend and contract in the up-down direction.

Further, each of multiple first struts 11 and the multiple second struts 21 may have a suspension mechanism.

Further, each of multiple first struts 11 and the multiple second struts 21 may have a shock absorber.

Further, each leg 40 may be provided with a buffer mechanism such as a suspension mechanism and a shock absorber.

The aircraft 100 to 900 may be provided with a mechanism in which a linkage mechanism, such as a pantograph mechanism, mitigates impact.

Safety Device

The aircraft 100 to 900 may also be provided with an impact mitigating device serving as a safety device. The impact mitigating device is constructed to include an impact mitigating material that covers the upper surface, the lower surface and/or side faces of the aircraft 100 to 900 and that mitigates impacts. Examples of the impact mitigating material include an air bags, an air cushion (impact mitigating material using a cushion of air-inflating type), and an air cover (impact mitigating material using a cover of air-inflating type). Another example of the safety device may be a parachute that suppresses or inhibits a fall of the aircraft 100 to 900.

The safety device may have both an impact mitigating material and a parachute. When the safety device is activated, the entire perimeter of the configured aircraft 100 to 900 is then wrapped with impact mitigating material such as an air cover, an air cushion, and an airbags, and the parachute opens at the upper portion of the aircraft 100 to 900.

Moving Guide Rope

As one usage form of the aircraft 100 to 900 of the embodiments described above, the aircraft may be moved in the horizontal direction by movably attaching the aircraft 100 to the rope bridged in the horizontal direction, which means that the rope may be used as moving guide and the moving direction of the aircraft 100 may be restricted to the extending direction of the moving guide. The aircraft 100 is attached to the rope via a pulley, for example.

In this case, the flying mechanism of the main body 30 may be constituted by a propeller mechanism of hovercraft type that outputs a propulsive force in the front-rear direction of the forward direction of the aircraft.

As another example, by attaching the aircraft movably along the rope bridged in the vertical direction, the aircraft may be configured to be moved in the vertical direction, using the rope as the moving guide.

The direction of bridging the rope is not limited to horizontal, vertical, or may alternatively be oblique. Regardless the direction of bridging the rope, it is possible to linearly move the aircraft, using the rope as a moving guide. The number of ropes is not limited to one, and may be two or more.

Further, the moving guide of an aircraft is not limited to the rope, and may alternatively be a rail.

Flap-Type Rotor

Further, in the flying mechanism 31 of the multicopter type, the rotary wings 32 may be formed into flap-type rotary wings that are swingable in the up-down direction with respect to the arm 34 via the shaft. In this case, the direction of the wind injected from the flying mechanism 31 of the multicopter type can be controlled by changing the attachment angle of the rotary wing 32. This is beneficial as a measure for avoiding the influence of wind injected from the flying mechanism 31 in operations of spraying pesticides, herbicides, disinfectants, fertilizers, insecticides, and the like, and in operations of handling liquids and powders such as pollination and coating.

Solar Panel

In addition, when flying at an altitude higher than clouds under a state where a solar generator including solar panels is mounted as a power source on the aircraft 100 to 900, the aircraft 100 to 900 can generate electricity with the solar generator by receiving solar light, not being affected by weather. This configuration makes it possible to stably fly for a long time.

Foldable solar panels may be mounted on the aircraft 100 to 900. The foldable solar panels are housed in a compact folded state when not in use, and are expanded and spread when in use. Examples of the shape of a foldable solar panel include the shape of the "ORIGAMI pattern" used in a satellite.

If the aircraft 100 to 900 are mounted with a solar generator including solar panels as a power source, the wired power supply can be omitted or the solar generator can cooperate with the wired power supply.

Battery Charging

It is preferable that the aircraft 100 to 900 are attached with a charging amount detecting mechanism, which monitors a charging amount of a battery used as the power source of the electric motor described above. In this case, when the charging amount becomes less than or equal to a predetermined value, it is possible to issue a warning or return to the charging base by automatic flight. Charging of the battery may be implemented in a wired charging that connects the battery and a charger by a cable, or in a wireless charging that does not use a cable.

Multi-Stage Frame Bodies

In the aircraft 100 to 900, two or more frame bodies may be coupled in the up-down direction. For example, in the aircraft 100, one or more frames may be further coupled below the first frame body 10. Further, forming the multi-stage frame bodies may be achieved not only by adding one or more frame bodies downward but also by adding frame bodies in the horizontal direction (the front-rear direction and/or the left-right direction). The dimension of the frame body to be added may be the same as or different from the first frame body 10 and the second frame body 20. The application of the frame body to be added may be any application, such as coupling of a working machine or a vehicle, as well as loading of a parcel.

Usage of Aircraft

The aircraft 100 to 900 described above can be used in a variety of applications as described in some embodiments. The aircraft 100 to 900 are mounted with various loads depending on their application. The load is directly coupled to the second frame body 20, or mounted on the first frame body 10 (indirectly connected to the second frame body 20).

First, some of the applications of the aircraft 100 to 900 and the methods of using the load for each application will now be exemplified. Then, the methods of using some loads will be specifically introduced.

Illustration of Applications and Methods of Using Agricultural, Fisheries, and Animal Husbandry -Load- Various sheets, nets, chains, tanks, working machines, and the like can be mounted as loads.

-Method of Using-

Sheet

A sheet can be used as mulching material, a collapsible simplified building (greenhouse, livestock barn), an enclosure, a wind shield, a general-purpose sheet (so-called "blue sheet", tarps), and the like.

Net

A nets can be used for an agricultural net, a pest abatement net, a fishing net, a casting net, and the like.

Chain

A chain can be used for a chain for herbicidal purpose, a weight (heavy weights) for a sheet and a net, and the like.

Tank

A tank can be used for storage for the contents of water, pesticide, disinfectant, insecticide, carbon dioxide, and the like, and can be used for spraying operation of the contents.

Working Machine

A working machine include dedicated-purpose working machines used in agricultural, fishery, and animal husbandry, robot hands, and general-purpose machines (dedicated-purpose working machines and general-purpose machines are collectively called "working machines"), exemplified by photographing equipment.

The dedicated-working machines for agriculture include, for example, the above-mentioned various agricultural working machines, as well as a sheet pitching device and a seeding device.

The aircraft 100 to 900 may be used for towing operation machines, watching, road guidance, fall prevention, for example, as well as applications for transporting the working machines.

The aircraft 100 to 900 may be mounted on an agricultural machine. In that case, the aircraft 100 to 900 can fly upward from the agricultural machine and be recovered from the sky to the agricultural machine. An aircraft may be coupled to the agricultural machine via ropes or the like.

Fire Fighting

-Load-

A sheet, a dome body, a tank, a water discharge mechanism, or the like can be mounted as a load.

-Method of Using-

Sheet

A sheet can be used for a simple covering material or a bellows-type simple covering material that covers the building or the like to be extinguished.

Dome Body

A dome body can be used as a dome-shaped simple building (dome-shaped or bell-shaped cover) that covers a building or the like to be extinguished.

Tank

A tank stores water, extinguishing agents, carbon dioxide, and the like, and can be used to spray water, or extinguishing agents for extinguishing fires or to supply carbon dioxide to the dome body covering the building or the like to be extinguished.

-Combination with Fire-Fighting Vehicles-

The aircraft 100 to 900 may be mounted on a fire-fighting vehicle. In that case, the aircraft 100 to 900 can fly upward from the fire-fighting vehicle and be recovered from the sky to the fire-fighting vehicle. In cases of combining an aircraft and a fire-fighting vehicle, for example, a hose is mounted on the aircraft, so that water can be sprayed from the aircraft. This is effective for high-altitude fire-fighting activities such as high-rise building fires.

The aircraft may be coupled to the fire vehicle via ropes or the like. In that case, the aircraft can be used to tow fire engines or watch over the sky.

Disaster Prevention

-Load-

A sheet, a chain, various types of disaster prevention equipment, or the like can be mounted as a load.

-Method of Using-

Sheet

A sheet can be used as a simple roof armor for an affected building or as a general-purpose sheet (so-called "blue sheet", tarp) for preventive roof reinforcement prior to the disaster.

Chain

A chain can be used for roofing and as a heavy weight, or for building a temporary levee in combination with a sheet.

-Measure for Oil Spill Accident Response-

The aircraft 100 to 900 can be used for mounting and delivering an oil fence, an oil recovery device, an oil recovery net, an oil adsorption sheet, and the like.

-Combination with Vehicle or Ship-

The aircraft can be mounted on various vehicles, ships, and the like. In that case, the aircraft can fly upward from the various vehicles, ships, and the like and be recovered from the sky to the various vehicles, ships, and the like.

The aircraft 100 to 900 may be coupled to the various vehicles, ships, and the like via, for example, ropes. In that case, the aircraft 100 to 900 can be used to tow various vehicles, ships, and the like with ropes or the like, to watch over the sky, to guide the way, or to prevent the vehicles and ships from falling over. This method for using, for example, when an emergency vehicle or the like is traveling on a bad road during a disaster or the like, helps to support its traveling.

Others

For their stability of the flying posture of the first frame body 10, the aircraft 100 to 900 can be used for carrying a water tank, carrying food (food delivery), delivery of vegetables, delivery of people, delivery of fish, delivery of animals, delivery of meals, and the like. The aircraft 100 to 900 are also suitable for delivery of precision machinery.

The aircraft 100 to 900 may also be used indoors.

The aircraft 100 to 900 may be used for building operations, mounting thereon building equipment, building vehicles, building fixtures, building materials, building workers, and the like.

The aircraft 100 to 900 may also be used for forestry, mounting thereon various devices used for forestry and forestry workers and the like.

The aircraft 100 to 900 may also be used for setting up sports equipment, mounting thereon a variety of sports equipment including a net and a sheet for sports.

In addition, the aircraft 100 to 900 may also be used for work such as maintenance and repair of railway equipment, mounting various railway equipment materials including rails and overhead wires.

In addition, the aircraft 100 to 900 may also be used for operation such as maintenance, inspection, and repair of power transmission equipment, mounting thereon various power transmission equipment materials including electric wires (including high-voltage wires) and steel materials for steel towers.

Examples of Method for Using

Next, some methods for using the load by the aircraft 100 to 900 will now be introduced.

-Example of Sheet Pitching-

Roll Type

Figure 28A:
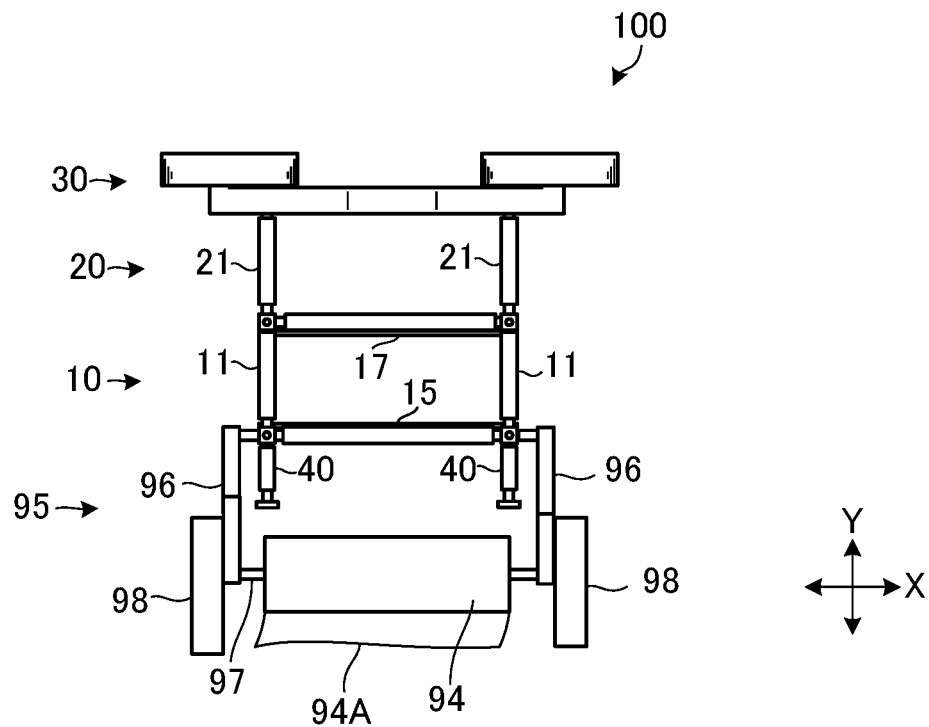
FIG. 28A is a diagram showing an aircraft having a sheet pitching mechanism, as viewed from the front-rear direction.
Figure 28B:
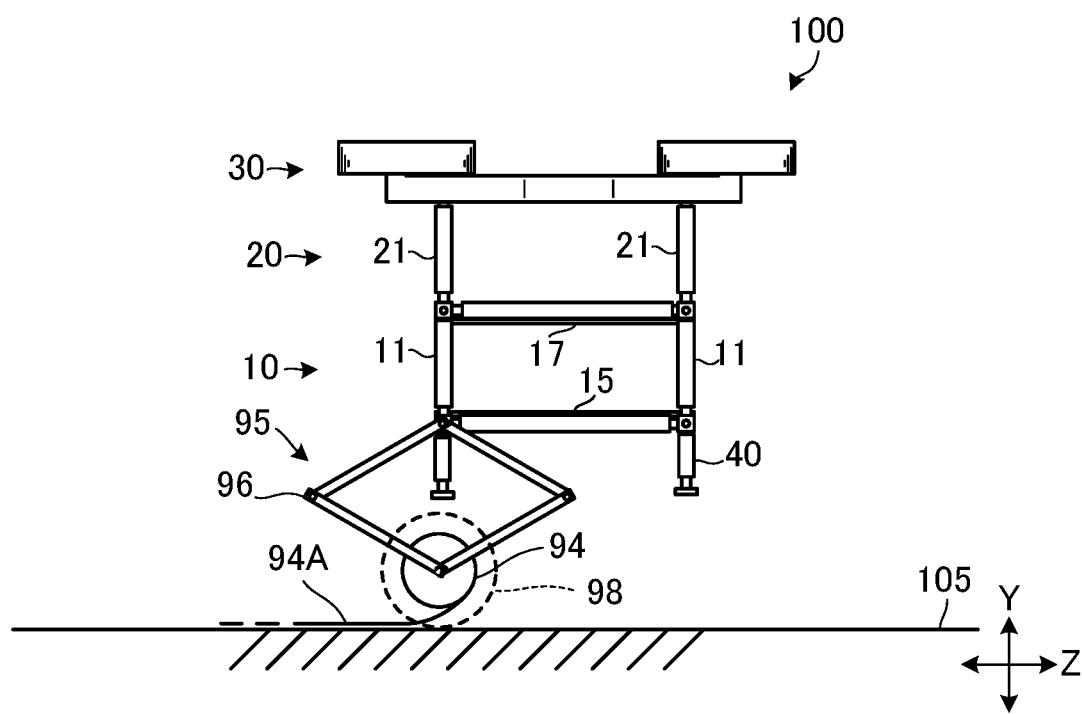
FIG. 28B is a diagram showing the aircraft having the sheet pitching mechanism, as viewed from the left-right direction.

FIGS. 28A and 28B show the aircraft 100 mounted with a sheet pitching device. FIG. 28A is a diagram showing the aircraft 100 viewed from the front-rear direction. FIG. 28B is a diagram showing the aircraft 100 viewed from the left-right direction. As shown in FIGS. 28A and 28B, the aircraft 100, a sheet pitching device 95 is mounted on the lower portion of the first frame body 10. The sheet pitching device 95 is provided with pantograph mechanisms 96 coupled one to each of the left and right sides of the lower portion of the first frame body 10, and also with a supporting rod 97 spanning along the left-right direction of the lower ends of the pantograph mechanisms 96. To the supporting rod 97, a sheet roll 94 formed by winding a sheet into a roll shape is attached. At the lower end of each of the pantograph mechanism 96, the wheels 98 serving as a grounding unit during the sheet pitching operation (shown by a broken line in FIG. 28B) is provided. The aircraft 100 mounted with a sheet pitching device 95 unwinds a sheet 94A from the sheet roll 94, or winds the sheet 94A around the sheet roll 94, or rolls up the sheet 94A pitched on the landing surface 105.

The pantograph mechanisms 96 are an example of a buffer device provided for the sheet pitching device 95, is formed by a rhombic link mechanism when viewed from the left-right direction, and is extendable and retractable in the up-down direction. The aircraft 100 unwinds the sheet 94A from the sheet roll 94 while flying, so that the unwound sheet 94A is laid on the landing surface 105. At this time, since the unevenness of the landing surface 105 is absorbed by the pantograph mechanisms 96, it is possible to pitch the sheet in a stable posture.

The sheet pitching device 95 may be attached with, in addition to the illustrated components, a cutter for sheet cutting, a sheet holder to hold down the sheet (preventing device of the sheet from rolling up), and/or a wind shield. The sheet pitching device 95 is suitable for application of pitching mulching material. In addition to an operation of pitching mulching material, the sheet pitching device 95 may be used for any sheet pitching, such as laying an oil absorbing sheet to encounter an oil spill accident.

The dimension of the supporting rod 97 for holding the sheet roll 94 is not limited to the example shown, and may alternatively be the same as the dimension in the left-right direction of the first frame body 10, larger or smaller than the dimension in the left-right direction of the first frame body 10. The supporting rod 97 may be stretchable and contractible.

A single supporting rod 97 may be held by multiple aircraft 100. In that case, the flight of multiple aircraft 100 may preferably be cooperatively controlled.

The multiple sheet pitching devices 95 may be connected in the left-right direction by multiple aircraft 100. This makes it possible to expand the dimension in the left-right direction of the sheet pitching device 95 (the supporting rod 97, the sheet roll 94).

Each pantograph mechanism 96 (buffer device) may be provided between the supporting rod 97 and the wheel 98.

The sheet pitching device 95 may be provided with a planar frame for supporting the sheet roll 94 in place of the supporting rod 97 that supports the sheet roll 94.

The aircraft 100 may alternatively have a structure in which the first frame body 10 is not provided and the sheet pitching device 95 is directly coupled to the lower portion of the second frame body 20. Further alternatively, the aircraft 100 may couple the sheet pitching device 95 to an additional frame body (a three-dimensional frame or a planar frame extending in the front-rear and left-right directions) provided so as to be coupled to the lower portion of the first frame body 10 and the second frame body 20.

The pantograph mechanism 96 is not limited to a rhombic link mechanism, and may alternatively be an arbitrary buffer mechanism having, for example, a structure (wiper-type structure) in which the supporting rod 97 is spanned at the lower end of an arm member rotatably mounted to lower portion of the first frame body 10.

The pantograph mechanism 96 may be provided on only one side of the left or right side.

-Example of Sheet Hanging-
Catcher Type

As another example of the sheet pitching operation using the aircraft 100, the aircraft 100 may attach a robot arm to the lower portion of the first frame body 10 and perform the operation of hanging a sheet using the robot arm. In such case, the aircraft 100 picks up the sheet placed on ground using the robot arm and covers the target object with the sheet in cooperation with, for example, a worker and/or a working machine on the ground.

Incidentally, the aircraft 100 may have a structure in which the first frame body 10 is not provided and the robot arm is directly coupled to the lower portion of the second frame body 20. Alternatively, the aircraft 100 may couple the robot arm to the additional frame (a three-dimensional frame or a planar frame) provided on the lower portion of the first frame body 10 or the second frame body 20.

Expanding Type

Alternatively, the aircraft 100 may attach a structure for expanding and holding the sheet in a plane shape extending in the front-rear and left-right directions to the lower portion of the first frame body 10, and cover the target object with the sheet that is expanded and held using a winch or a rope from the above.

Alternatively, a single sheet is expanded and held in a plane shape by multiple aircraft 100, and the multiple aircraft 100 cooperatively fly and cover the target object with the sheet from the above, expanding and holding the sheet.

-Example Application of Dome-Shaped Simplified Building Installation-

Figure 29:
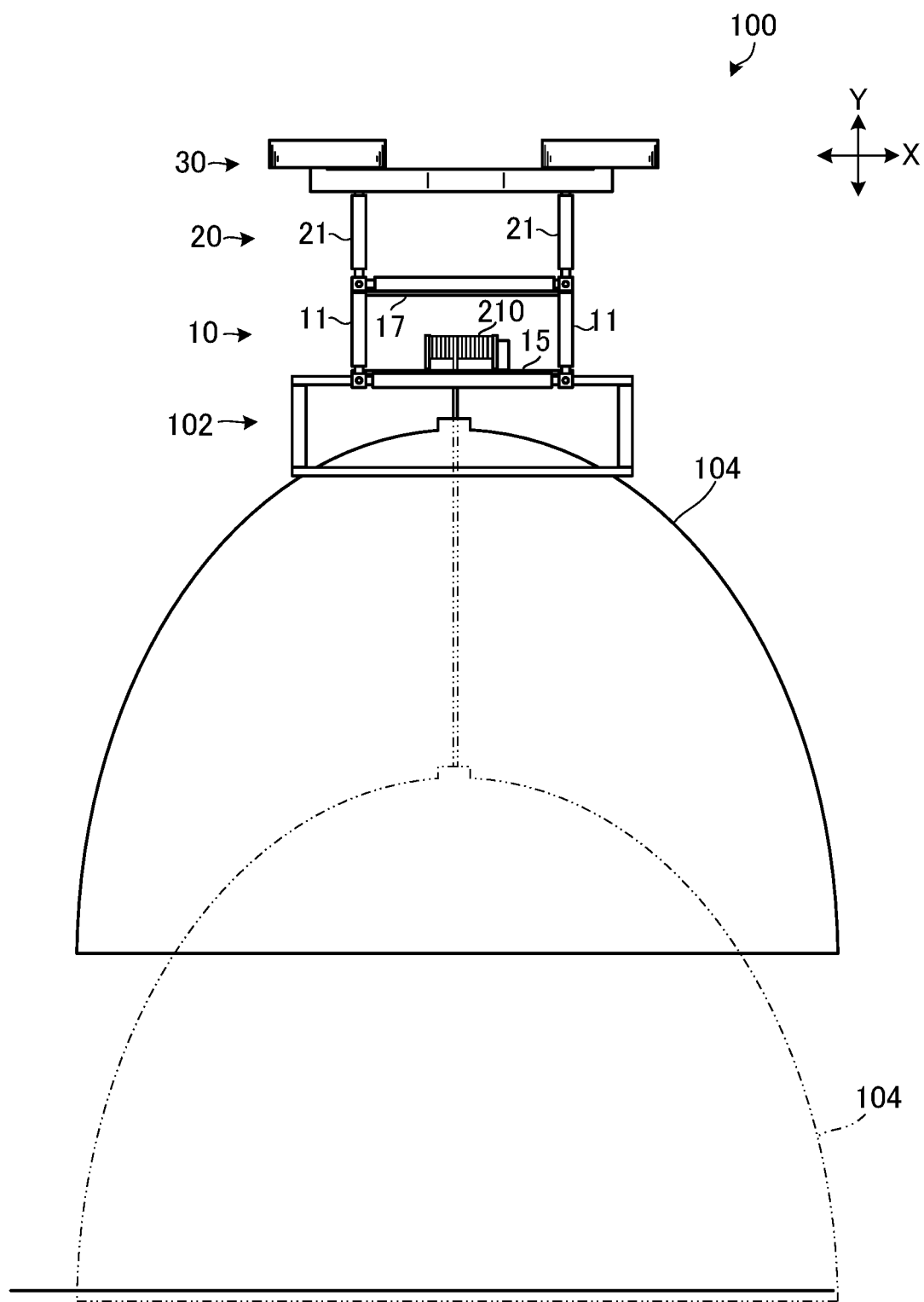
FIG. 29 is a diagram showing an aircraft used for installation of a dome-shaped simple building.

FIG. 29 is a diagram showing an aircraft used for installation of a dome-shaped simple building.

In the aircraft 100, a dome body 104 is mounted on the lower portion of the first frame body 10. To the upper portion of the dome body 104, the cable of the winch 210 installed on the first frame body 10 is coupled.

To the lower portion of the first frame body 10, an auxiliary frame 102 is coupled. The auxiliary frame 102 is a supporting frame that auxiliarily supports the dome body 104 in the state where the dome body 104 is accommodated in the aircraft 100. The dimension of the auxiliary frame 102 is set on the basis of the dimension of the dome body 104. In the example of the illustration, the auxiliary frame 102 has dimensions along the front-rear and the left-right directions larger than those of the first frame body 10.

The dome body 10 is a bell-shaped structure having a downward opening and closed four sides and the top, and covers the object from above to contain the object in its inner space.

The dome body 104 is, in the fire fighting application as described above, used as a dome-shaped simple building that covers the building or the like to be extinguished.

The aircraft 100 lowers the dome body 104 in the sky above a building to be extinguished at a fire site or the like, and covers the building to be extinguished with the dome body 104. The dome body 104 moved downward in FIG. 29 is shown by a broken line.

The dome body 104 can be used as a simple greenhouse in agriculture, as a simple barn in animal husbandry, or as a simple evacuation shelter in the event of a disaster as well as a fire fighting application.

In addition, a tank may be attached to the first frame body 10 or the dome body 104 to supply contents in the tank into the dome body 104.

For example, when the dome body 104 is used for a fire fighting application, the tank may be filled with, for example, carbon dioxide, water, or a fire extinguishing agent.

In addition, when the dome body 104 is used as an agricultural greenhouse, the tank may be filled with, for example, carbon dioxide for promoting cultivation, water, or a disinfectant.

In addition, when the dome body 104 is used as a barn, the tank may be filled with, for example, water or a disinfectant.

Incidentally, the aircraft 100 may couple the auxiliary frame 102 to the lower portion of the second frame body 20 without having the first frame body 10. Further, the aircraft 100 may couple the dome body 104 to the lower portion of the first frame body 10 or the second frame body 20 without having the auxiliary frame 102.

When a simple building using the dome body 104 is used as a greenhouse, the greenhouse can be moved with ease. The easy movability contributes to simplification of a continuous cropping prevention farming method.

In addition to the above applications, a simple building using the dome body 104 can be applied to wind shield, fireproof, rainproof, flood prevention, earthquake resistance, wind resistance, and snow resistance, for example.

Figure 30A:
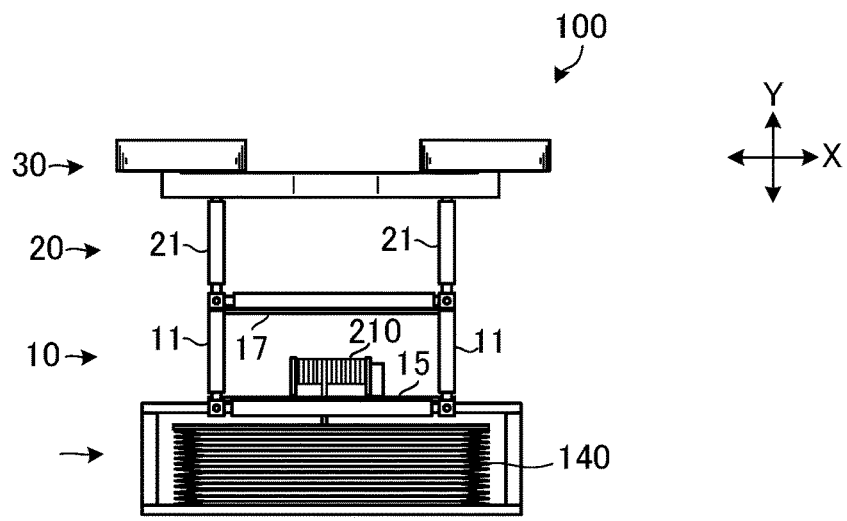
FIG. 30A is a diagram showing an aircraft used for installation of a bellows-type simple covering object, showing the bellows-type simple covering object in a contracting state.
Figure 30B:
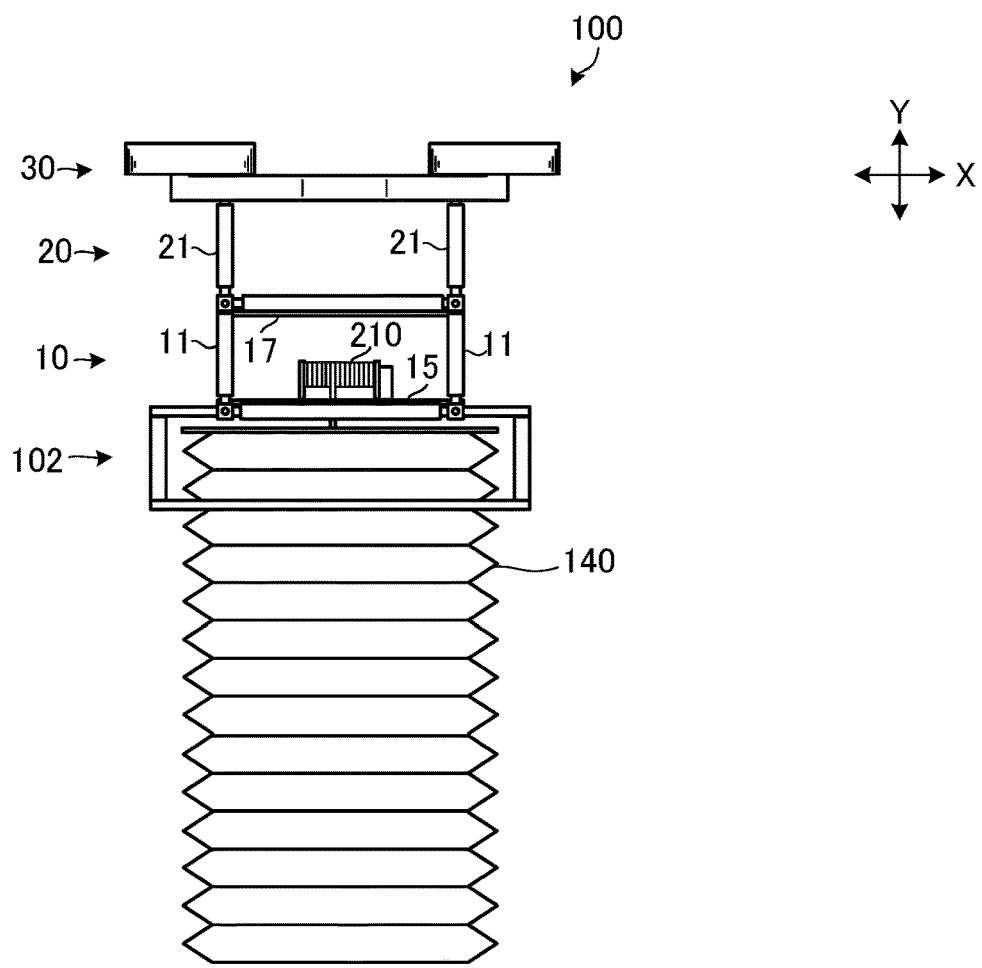
FIG. 30B is a diagram showing an aircraft used for installation of a bellows-type simple covering object, showing the bellows-type simple covering object in a stretched state.

-Example of Application of Simple Bellow-Type (Folding-Type) Covering Object Installation- FIGS. 30A and 30B are diagrams showing an aircraft used for installation of a simple bellow-type covering object.

In the aircraft 100, a sheet 140 folded into the bellow shape (accordion shape) is accommodated in the auxiliary frame 102 coupled to the lower portion of the first frame body 10.

The sheet 140 is a flexible sheet formed in a bag shape (or a tubular shape) having a wall face portion surrounding the four sides and a top surface portion closing the upper portion, and has a foldable or extendable column being incorporated. The column is intended to support the wall face portion, being in a state where the sheet 140 is expanded. The sheet 140 is a bellows-type sheet that is compactly folded and retracted when being stored and extends when being expanded. To the sheet 140, the cable of the winch 210 installed on the first frame body 10 is coupled.

The sheet 140 can be used for a bellows-type simple covering object that covers the building or the like to be extinguished in the fire fighting application as described above. A bellows-type simple covering object using the sheet 140 can be used as a simple greenhouse in agriculture, as a simple barn in animal husbandry, or as a simple evacuation shelter in the event of a disaster as well as fire fighting applications.

The sheet 140 is transported over the target object, being in a folded state, as shown in FIG. 30A. The sheet 140 is locked so as not to be expanded by a non-illustrated locking mechanism or the like, when being in a folded state, for example. Locking by the locking mechanism or the like can be released by automatically control by the control apparatus 60 or by a manual operation. When the locking is released, the sheet 140 is extended vertically and expanded. The sheet 140, being in a state of expanding as shown in FIG. 30B, serves as a bag-shaped (or a tubular-shaped) simple coating object.

When using the simple coating object made of the sheet 140 for a greenhouse, the greenhouse can be moved with ease. The easy movability contributes to simplification of a continuous cropping prevention farming method.

Also in a simple coating object using the sheet 140, a tank may be attached to the first frame body 10 or the sheet 140 to supply various gases and liquids according to various applications, such as carbon dioxide, an extinguishing agent, water, and a disinfectant, into the simple coating object.

Incidentally, the aircraft 100 may couple the auxiliary frame 102 to the lower portion of the second frame body 20 without having the first frame body 10. Further, the aircraft 100 may couple the sheet 140 to the lower portion of the first frame body 10 or the second frame body 20 without having the auxiliary frame 102.

The auxiliary frames 102 may be coupled in multiple stages.

The size and shape of the auxiliary frame 102 can be varied depending on its application.

The auxiliary frame 102 may be held by multiple aircraft 100. In that case, the flight of multiple aircraft 100 may preferably be cooperatively controlled.

-Modification to Simple Coating Object-

Instead of covering the sheet 140 folded in a bellows shape from top to bottom, a tubular sheet folded in a bellows shape may be placed on ground, and the sheet may be picked up from the bottom to the top using one or more aircraft to cover the target object.

The simple coating object using a sheet is not limited to a bag-like shape, and may be a tent type or a parasol type.

-Example of Application of Simple Enclosure-

A simple enclosure may be formed by using a sheet mounted on the aircraft 100. A simple enclosure can be used, for example, to surround fields for agricultural purposes, to surround a barn for animal husbandry purposes, or to serve as simple evacuation shelter in the event of a disaster.

In addition, supplementary items regarding various application of the aircraft 100 to 900 described in each embodiment are listed below.

-Examples of Net Mounting and Application in Fishery-

In the aircraft 100 to 900, a net may be attached to, for example, the lower portion of the first frame body 10 or the auxiliary frame 102. The manner of attaching a net includes hanging the net from, for example, the lower portion of the first frame body 10, or providing a net housing portion to the first frame body 10.

The net can be used to put the parcel 50 in the net, used as a fishing net in a fishery field, and used as a bird and beast shield net in an agricultural field, for example.

When a net is used as a fishing net, a fishing manner in which the fishing net is drawn by flight of the aircraft 100 to 900 after the fishing net is thrown into the water is available. In such cases, the fishing net can be thrown over a wide area by cooperative flight with multiple aircraft 100 to 900. At this time, an underwater propulsion mechanism may be attached to assist the operation of drawing the fishing net with the underwater propulsion mechanism. If a net with a chain is used, a casting net method using the aircraft can be carried out.

Boats and rafts may also be mounted on the aircraft 100 to 900. In this case, for example, the aircraft 100 to 900 can be used to fly to a fishing field or aquaculture area, being mounted with boats or aquaculture rafts, lower the boats or aquaculture rafts to the sea, pick up the boats or aquaculture rafts from the sea, and after completion of fishing or aquaculture operations, move them to other work field or return to the warehouse.

The aircraft 100 to 900 can also be applied to fishing (including fishing from boats and land), for example. In this case, the portion near the weight at the tip of the fishing line is held by the aircraft 100 to 900 and moved to the target point.

It is also possible to mount fishing gear on the aircraft 100 to 900, move the aircraft 100 to 900 to the target point, and cast a trap of the gear at this target point.

-Mounting of Tanks and Spraying Devices-

As described above, the aircraft 100 to 900 may be mounted with a tank and a spraying device. In this case, the aircraft 100 to 900 are used for spraying of liquids or powders such as pesticides, herbicides, disinfectants, fertilizers, and pollen. For example, a tank containing pesticides, herbicides, and the like and a spraying device are mounted on the first frame body 10 to spray pesticides, herbicides and the like while the aircraft 100 to 900 are flown over fields, paddy fields, orchards, and the like.

Here, it is preferable that a (ejection) nozzle for spraying liquid or powder is extended from the first frame body 10 and the ejection port is located apart from the first frame body 10, so that liquid or powder sprayed (ejected) from the ejection port is not affected by wind from the flying mechanism 31.

If a sheet and a robot arm are mounted on the aircraft 100 to 900, a simple enclosure is formed in a spraying work target area using the sheet as described above, and then a spraying operation is performed, scattering of pesticides and the like can be suppressed.

Further, in the animal husbandry field, it is preferable to mount a sheet and a robot arm on the aircraft 100 to 900, form a simple enclosure using the sheet as described above, and sprays a disinfectant solution or the like. As a usage of this simple enclosure, for example, when such as classical swine fever or bird influenza occurs, the workability of the sanitary management work, such as isolation, is improved.

Pollination Work

When aircraft 100 to 900 are used for pollination work, a container (tank) containing pollen and a pollination device are mounted on the first frame body 10. Since the aircraft 100 to 900 are excellent in horizontality maintenance of the flying posture of the first frame body 10, the aircraft 100 to 900 are suitable for pollination work aiming at a particular flower of interest (pollination work at a pinpoint aiming at a narrow range like bees).

-Mounting of Bird-and-Beast Eviction Mechanism-

In addition, the aircraft 100 to 900 may be used for bird and beast eviction by mounting a bird avoidance mechanism on the aircraft 100 to 900 to avoid collision with birds. The bird avoidance mechanism includes a light-emitting device that emits a warning light, an acoustic device that outputs a warning voice, and the like.

Such a bird avoidance mechanism attached to the aircraft 100 to 900 can be used for other applications as well as applications for avoiding collisions with birds. For example, the aircraft 100 to 900 can effectively evict birds (including harmful beasts) by emitting a warning light and a warning voice from the sky above the agricultural land while being flown on an agricultural land.

The bird avoidance mechanism attached to the aircraft 100 to 900 can also be used for the purpose of crime prevention. In this case, for example, while the aircraft 100 to 900 monitors a target area with, for example, a camera or a sensor while flying over the target area, and in the event of detection of a suspect of crime prevention, emits a warning sound for crime prevention from the acoustic device or emit a warning light for threatening from the light emitting device, so that the aircraft 100 to 900 brings the crime prevention effect.

-Mounting of Watching Mechanism-

A watching mechanism may be mounted on the aircraft 100 to 900. The watching mechanism includes, for example, a camera and a sensor. The aircraft 100 to 900 can, for example, fly over the sea to perform lookouts for collision avoidance between ships.

-Mounting of Non-Destructive Inspection Equipment-

A non-destructive inspection device, such as a hammer inspection device, may be mounted on the aircraft 100 to 900. The aircraft 100 to 900 are used for non-destructive inspection for defects and cracks on the surface of an inspected object, for example.

-Mounting of Painting Device-

A painting device may be mounted on the aircraft 100 to 900. The aircraft 100 to 900 are used for a painting operation.

-Mounting of Projector-

A projector (image projector) may be mounted on the aircraft 100 to 900. In this case, the aircraft 100 to 900 may be used as a projector for a project mapping, for example.

-Mounting of Camera-

A camera (photographic machine) may be mounted on the aircraft 100 to 900. In this case, the aircraft 100 to 900 may be used for aerial photography. The aircraft 100 to 900 can maintain the flying posture of the first frame body 10 horizontally and is therefore suitable for aerial photography application. The data of a photographed image (moving image or still image) may be transmitted to an image processing device such as computer on the ground by radio communication, for example.

Since the flying posture of the camera is stable in the aircraft 100 to 900, a stable image can be captured even in a camera work that moves the camera in a complicated manner, for example. Further, since the flying posture of the camera is stable, the aircraft 100 to 900 are suitable for photographing a pinpoint aiming at a narrow range.

A camera may be mounted on the aircraft 100 to 900 and images captured by the camera may be used in various operations. In that case, operation can be performed with high accuracy, for example, by a known automatic recognition technique using an image.

Further, if the aircraft 100-900 mounted with a non-destructive inspection device or a painting device is further mounted with a camera, images captured by the camera can be used for inspection, a painting operation, a repair operation of a found defect, and the like.

In addition, the aircraft 100 to 900 mounted with a camera can be used for, for example, maintenance and inspection work of railway facilities and power transmission facilities.

-Mounting of Mower-

A mower may be mounted on the aircraft 100 to 900. In this case, the aircraft 100 to 900 are utilized as a mower with a flying mechanism. For example, multiple rotor-type mowers may be attached to the lower surface of the first frame body 10. The mower is not limited to a rotor-type and may be of any type of mower. Use of the aircraft 100 to 900 as mowers contributes to improvement in workability under poor scaffolding conditions, such as mowing in forestry and mowing on inclined field.

-Mounting of Work Machine-

An agricultural work machine, such as a seedling transplanter, a farm tractor, and the like, may be mounted on the aircraft 100 to 900. In this case, the aircraft 100 to 900 are used as an agricultural work machine with a flying mechanism.

Since the aircraft 100 to 900 are excellent in horizontality maintenance of the flying posture of the first frame body 10, agricultural work can be made in a stable posture.

Various construction or industrial machine may also be mounted on the aircraft 100 to 900.

-Robot Arm-

A robot arm may be mounted on the aircraft 100 to 900. The robot arm can be used for the following applications in addition to the aforementioned sheet hanging operation. The aircraft 100 to 900 mounted with a robot arm is suitable for, for example, house repair work. The aircraft 100 to 900 are also suitable for repair work, protective work, and reinforcement work of any structure such as various building repairs, bridge pier repairs, levee repairs, revetment works, and slope repairs, in addition to house repairs.

Having horizontal flight performance, hovering flight performance, and horizontal maintenance performance of the flying posture of the first frame body 10, the aircraft 100-900 can efficiently implement pinpoint operation in a narrow range using a robot arm.

Also, if the aircraft 100 to 900 are mounted with a robot arm, the aircraft 100 to 900 may be used for forestry. Forestry working include pruning, logging, and thinning.

Also, if the aircraft 100 to 900 are mounted with a robot arm, the aircraft 100 to 900 may be used for an agricultural work. An example of an agricultural work is a harvesting work of fruits and vegetables such as strawberries, apples, and tomatoes.

Alternatively, by boarding a worker on the first frame body 10 or the main body 30, various works may be performed manually. Having good horizontal stability, the aircraft 100 to 900 are easy to work for workers.

-Fire Prevention and Disaster Prevention-

In addition to the various applications described above, the aircraft 100 to 900 can be used for fire fighting and aiding operations at fire sites, crime prevention activities, and disaster prevention activities. The aircraft 100 to 900 can also be used for aiding activities, restoration and restoration support activities in the event of disasters such as earthquakes, tsunamis, storm surges, and floods. The aircraft 100 to 900 can also be used for fire fighting and aiding operations at high-rise buildings, and can be used for work at nuclear power plants (work in areas where people do not enter).

The loads to be mounted on the aircraft 100 to 900 are not limited to those listed in the examples, and may be anything. Having an assembled frame-like structure assembled by the first struts 11 and the upper-end coupling rods 12, the lower-end coupling rods 13, and the joint blocks 14, the first frame body 10 can freely change and expand its size and shape. Because of this degree of freedom, the aircraft 100 to 900 can be mounted with various loads, such as parcels, vehicles, and various working machines.

Other Usage

-Utilization of Wind Power-

Further, when the aircraft 100 to 900 are not flying, the wind force generated by the flying mechanism 31 (310) may be utilized for an application of air circulation, which means that the flying mechanism 31 may be used as a circulator. Further, when the aircraft 100 to 900 are not flying, the wind force generated by the flying mechanism 31 (310) may be utilized for an application of blower, which means that the flying mechanism 31 may be used as a blower. Such flexible usage is convenient, for example, in the event of a disaster.

In addition, the wind power generated by the flying mechanism 31 (310) while the aircraft 100 to 900 are not flying or are flying may be used for wind power generation. For this purpose, the aircraft 100 to 900 may be mounted with a wind power generators.

Any of the aircraft 100 to 900 may be mounted with a wireless communication relay device (including a base station) and used as a wireless relay station. In this case, it is preferable that the aircraft 100 to 900 are connected via a wire to a power supply device installed on the ground or on the sea, and that is supplied with electric power via the wire from the above-described power supply device while flying in a hovering flight at a predetermined position in the sky. As the power supply device described above, a mobile power supply device mounted on a vehicle or a ship can be used. As another example, the aircraft 100 to 900 mounted with a wireless communication relay device (including a base station) may use a power supply device mounted thereon.

In addition, the aircraft 100 to 900 may be used as a satellite launch base, carrying an artificial satellite. In this case, after the aircraft 100 to 900, being mounted with an artificial satellite, climbs to a certain altitude, the satellite is launched from the aircraft 100 to 900.

Examples of Other Modification

The flying mechanism provided on the aircraft 100 to 900 is not limited to the flying mechanism 31, 310, 710, 810 described in each of the above embodiments, and may be constituted by any flying mechanism. Examples of the flying mechanism are a paraglider, a balloon, a blimp, an airplane, a helicopter, and a gyrocopter.

The aircraft 100 to 900 are not limited to an unmanned aerial vehicle, but may be a manned aerial vehicle in which occupants, such as crew members and passengers, board.

The sizes of the aircraft 100 to 900 are not particularly limited. The aircraft 100 to 900 may be small aircraft suitable for carrying relatively small parcels, or may be large aircraft capable of transporting large objects, such as large containers or large trucks, as the parcels 50.

The aircraft 100 to 900 may also be configured as child toys.

Further, the control of the control target by the control apparatus 60, in addition to the control via the radio shown in FIG. 27, may be controlled via a wire. Incidentally, the control apparatus 60 and the controller for the control apparatus 60 have control functions suitable for the various applications described above.

In addition, the various driving apparatuses described above, such as the actuator 113, the driving apparatus 213, the driving apparatus of the rotary wing 32, and the driving apparatus of the rotary wing 320, are not limited to those listed above, and any type of apparatus can alternatively be used.

Alternatively, in place of an electric motor driven by the battery described above, a hydraulic motor or an engine (internal combustion engine) can be used as a driving apparatus. Example of the engine to be used are a gasoline engine, a hydrogen engine, a hybrid engine, an air engine of a compressed air type, and a jet engine.

Needless to say, when an electric motor is used, a power supply system is provided. A hydraulic supply system when a hydraulic motor is used and a fuel supply system (fuel tank, gas cylinder, etc.) when an engine is used are installed in the aircraft 100 to 900.

Examples of a power supply system are a battery, a generators using an engine as a power source, a photovoltaic generator, a wind power generator, a fuel cell, and combinations thereof.

In addition, although having been assumed to be an unmanned aerial vehicle as an example, the aircraft 100 to 900 may be a manned aerial vehicle that is operated by a person on board. In cases where the aircraft 100 to 900 are configured as a manned aerial vehicle, the aircraft 100 to 900 may be removably mounted with a container-type cabin for passengers to board.

Figure 31:
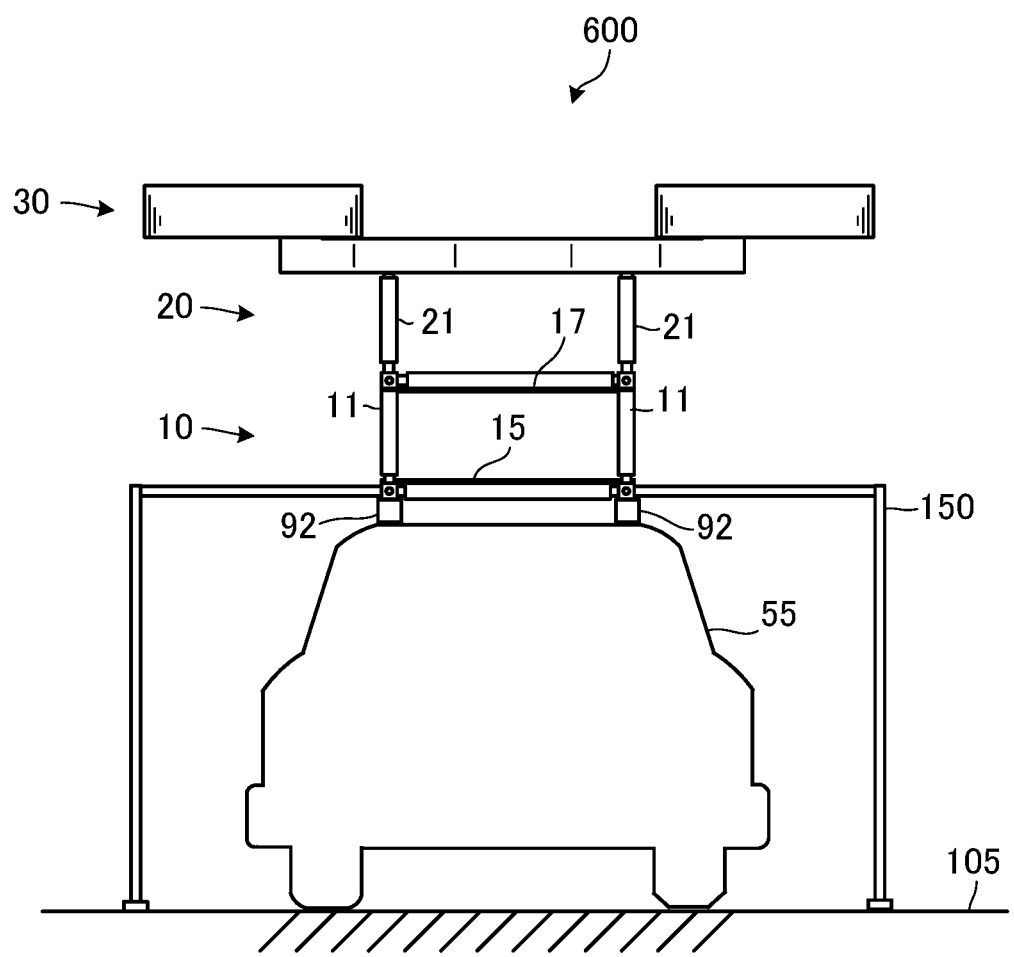
FIG. 31 is a diagram showing an aircraft according to a modification to the aircraft of FIG. 21.

Further, in cases where the vehicle 55 is directly coupled to the lower portion of the second frame body 20 or the first frame body 10 as illustrated in FIGS. 20 and 21 described above, outriggers 150 extending in the left-right direction from the second frame body 20 or the first frame body 10 may be attached. FIG. 31 shows an example in which the outriggers 150 are attached to the lower portion of the first frame body 10 as a modification of FIG. 21. As shown in FIG. 31, each outrigger 150 is composed of an arm portion extending and protruding in the left-right direction further than the vehicle width of the vehicle 55, and a leg portion.

Under a state where the aircraft 600 is landing, the wheels of the vehicle 55 and the outriggers 150 are grounded on the landing surface 105. After the vehicle 55 is disconnected from the aircraft 600, the aircraft 600 is supported by an outriggers 150.

The present disclosure includes all of the appropriate combinations of each of the structures disclosed in the foregoing embodiments and modifications.

IV. Appendix

In relation to embodiments including modifications, the following appendices are disclosed.

(Appendix 1)

An aircraft comprising:

a frame body that comprises an attaching unit on an upper portion thereof, that is formed into a frame-shape structure, and that couples an object to a lower portion thereof, the attaching unit being configured to be capable of adjusting a position in an up-down direction of the attaching unit;

a main body that is positioned on an upper portion of the frame body and that comprises a flying mechanism; and a control unit that controls a position in the up-down direction of the attaching unit such that a flying posture of the object is controlled in accordance with a posture of the flying mechanism.

(Appendix 2)

The aircraft according to appendix 1, wherein the control unit controls the position in the up-down direction of the attaching unit such that the flying posture of the object is horizontally maintained.

(Appendix 3)

The aircraft according to appendix 1 or 2, wherein the object is another frame body comprising a mounting surface that mounts a load thereon.

(Appendix 4)

The aircraft according to appendix 3, wherein:

the other frame body further comprises a pressing surface that faces the mounting surface and that is attached to be movable in the up-down direction; and the control unit controls an amount of movement in the up-down direction of the pressing surface such that the load is sandwiched between the pressing surface and the mounting surface.

(Appendix 5)

The aircraft according to appendix 3, wherein:

the other frame body further comprises a pressing surface facing the mounting surface and is attached to be movable in the up-down direction;

the aircraft further comprises a vehicle that is coupled to a lower portion of the other frame body, a first coupler that is provided to a lower portion of the frame body and that couples the other frame body thereto, a first coupled unit that is provided to the other frame body and that is coupled to the first coupler, a second coupler that is provided to a lower portion of the other frame body and that couples the vehicle thereto, and a second coupled unit that is provided to the vehicle and that is coupled to the second coupler; and the control unit further controls an amount of movement in the up-down direction of the pressing surface such that the load is sandwiched between the pressing surface and the mounting surface.

(Appendix 6)

The aircraft according to any one of appendices 3-5, wherein:

the other frame body comprises a plurality of strut members that rise from the mounting surface and that each comprises an outer pipe and an inner pipe contained in the outer pipe, and that are telescopically movable in respective axis directions;

the pressing surface is installed so as to be movable in the axis direction in conjunction with telescopic motion of the plurality of the strut members; and the control unit further controls the telescopic motion of the plurality of strut members such that the load is sandwiched between the pressing surface and the mounting surface.

(Appendix 7)

The aircraft according to any one of appendices 1-6, wherein:

the frame body comprises a plurality of struts each comprising an outer pipe and an inner pipe contained in the outer pipe and each being telescopically movable in the axis direction;

a plurality of the attaching units are provided one to an upper end of each of the plurality of struts; and the control unit controls the positions in the up-down direction of the plurality of attaching units by controlling telescopic motion of the plurality of struts.

(Appendix 8)

The aircraft according to appendix 7 according to appendix 6, wherein:

the other frame body is configured by coupling upper ends of the plurality of strut members to one another by a plurality of upper coupling rods via a plurality of joint blocks attached to upper ends of the plurality of strut members and coupling lower ends of the plurality of strut members to one another by a plurality of lower coupling rods via a plurality of joint blocks attached to lower ends of the plurality of strut members; and the frame body is configured by coupling the plurality of struts to the respective joint blocks attached to the upper ends of the plurality of strut members of the other frame body.

(Appendix 9)

The aircraft according to any one of appendices 3-8, further comprising a leg that protrudes from a lower surface of the other frame body, that includes a grounding unit at a lower portion thereof, the grounding unit being configured so as to be capable of adjusting a position in the up-down direction of the grounding unit, wherein the controller controls the position in the up-down direction of the grounding unit in accordance with landform of a landing site.

(Appendix 10)

The aircraft according to appendix 9, wherein a plurality of the legs each comprises an outer pipe and an inner pipe contained in the outer pipe and is being telescopically movable in the axis direction.

(Appendix 11)

The aircraft according to any one of appendices 3, 4, and 6-10, wherein the other frame body further comprises an opening and closing mechanism that opens and closes a bottom face of the other frame body by moving the mounting surface.

(Appendix 12)

The aircraft according to any one of appendices 3-11, further comprising a supporting member that is installed to the other frame body so as to be movable in a left-right direction and that depresses the load mounted on the mounting surface from the left and the right sides.

(Appendix 13)

The aircraft according to any one of appendices 3, 4, 6-12, wherein;

the load is a vehicle;

each wheel of the vehicle is positioned below the lower surface of the other frame body; and the wheel is configured to as a grounding unit to a land site.

(Appendix 14)

The aircraft according to appendix 1 or 2, wherein:

the load is a vehicle; and the aircraft further comprises:

a coupler that is provided to a lower portion of the frame body and that couples the vehicle; and a coupled portion that is provided to the vehicle and that is coupled to the coupler.

(Appendix 15)

The aircraft according to any one of appendices 3-14, wherein:

the main body further comprises a rotatable drum, a cable wound around the drum, and a winch having a driving apparatus that rotates the drum;

either one of the frame body and the other frame body is liftably installed to the main body via the winch; and the control unit controls operation of the driving apparatus such that the cable is unwound from the drum and wound by the drum.

(Appendix 16)

The aircraft according to any one of appendices 3-14, wherein:

the frame body further comprises a rotatable drum, a cable wound around the drum, and a winch having a driving apparatus that rotates the drum;

the load mounted on the mounting surface of the other frame body is mounted so as to be liftable with respect to the other frame body by the winch;

the other frame body further comprises an opening and closing mechanism that opens and closes a bottom face of the other frame body by moving the mounting surface;

the control unit further controls operation of the driving apparatus such that the cable is unwound from the drum and wound around the drum and controls movement of the mounting surface such that the bottom face is opened and closed.

(Appendix 17)

The aircraft according to any one of appendices 1-16, wherein the attaching unit comprises a detachable latch mechanism that detachably latches the upper portion of the frame body on the main body.

(Appendix 18)

The aircraft according to any one of appendices 1-17, wherein the flying mechanism is of a multicopter type.

(Appendix 19)

The aircraft according to any one of appendices 1-17, wherein the flying mechanism is of a tilt-rotor type.

(Appendix 20)

The aircraft according to any one of appendices 1-19, wherein:

the flying mechanism of the main body is configured to be a vertically-flying mechanism for vertically flying; and the aircraft further comprises a horizontally-flying mechanism for horizontally flying separately from the vertically-flying mechanism.

(Appendix 21)

The aircraft according to any one of appendices 1-20, wherein:

the frame body further comprises an auxiliary coupling mechanism that is interposed between the frame body and the main body and that couples the frame body to the main body; and the auxiliary coupling mechanism is a one-point supporting mechanism that supports at least one of the frame body and the main body at one point.

(Appendix 22)

An aircraft comprising:

a frame body that comprises an attaching unit on an upper portion thereof, that is formed into a frame-shape structure, and that couples an object to a lower portion thereof, the attaching unit being configured to be capable of adjusting a position in an up-down direction of the attaching unit;

a main body that is positioned on an upper portion of the frame body and that comprises a flying mechanism; and a control unit that controls a position in the up-down direction of the attaching unit such that a flying posture of the object is controlled horizontally.

(Appendix 23)

An aircraft comprising;

a frame body that comprises an outer pipe, an inner pipe contained in the outer pipe, and a plurality of struts being telescopically movable in the axis direction;

a main body that is positioned on an upper portion of the frame body and that comprises a flying mechanism;

a control unit that controls the telescopic motion of the plurality of struts such that a flying posture of the object is controlled; and the object is another frame body comprising a mounting surface that mounts a load thereon.

(Appendix 24)

A system for controlling an aircraft, the system comprising:

the aircraft defined in any one of appendices 1-23; and a controller that controls the aircraft, wherein the control unit of the aircraft carries out flight control that controls working of the flying mechanism, the aircraft further comprises a first communication unit that wirelessly communicates with the controller, and the controller comprises a second communication unit that wirelessly communicates with the aircraft.

(Appendix 25)

The system according to appendix 24, wherein:

the controller comprises an operation control unit having a route setting function that sets a route from the start point to the destination point and a monitoring function that monitors an operation status of the aircraft, and is configured to transmit route setting information containing information of the set route to the aircraft through the second communication unit; and the aircraft is configured to generate flight control information based on the route setting information that the control unit receives through the first communication unit and control, based on the generated flight control information, working of the flying mechanism (Appendix 26)

The system according to appendix 24 or 25, wherein:

the frame body of the aircraft couples the object loaded with a parcel at the lower portion thereof;

the aircraft comprises a first transfer acknowledgement mechanism that transmits, through the first communication unit, a transfer acknowledgement signal to confirm whether the parcel is received to the controller; and the controller comprises a second through the first communication unit mechanism that acknowledge, based on the transfer acknowledgement signal received from the aircraft through the second communication unit, whether the parcel is received.

DESCRIPTION OF REFERENCE SIGN 1 distribution system
3 start point
5 destination point
60A control apparatus
60B first communication unit
60C detection mechanism
60D transfer acknowledgement mechanism
62 indicator lamp
64 manual operation mechanism
160 controller
160A second communication unit
160B operation controlling unit
160C transfer acknowledgement mechanism
162 monitoring device
100-800 aircraft
10 first frame body (another frame body)
11 first strut (strut member)
12 upper-end coupling rod
13 lower-end coupling rod 13
14 joint block
15 mounting surface 14
17 pressing surface 17
19 opening and closing mechanism 19
20 second frame body (frame body)
21 second strut (strut)
22 attaching rod
25 attaching unit
30 main body
31, 310, 710, 810 flight mechanism 32 rotary wing
33 base portion 33
34 arm
35 rotary shaft
36 blade
37 protective ring
40 leg
41 grounding unit
42 wheel
50 parcel
55 automobile (vehicle)
60 control apparatus (control unit)
70 supporting member
71 support plate
72 third strut
73 upper supporting rod
74 lower supporting rod
75 upper end portion
76 lower end portion
77, 78 hole
80 electric motor
91 coupling protrusion (coupler)
92 coupling members (coupled unit)
93 fitting hole
95 sheet pitching device
104 dome body
140 sheet for simply covering object
105 landing surface
106 tilt surface
110 outer pipe
112 inner pipe
113 actuator
114 male screw
141 female screw
210 winch
211 drum
211a supporting frame
212 cable
213 driving apparatus
311 base portion 311
312 arm
320 rotary wing
321 rotary shaft
322 blade
F forward direction
D axial direction

What is claimed is:

1. An aircraft comprising:
a first frame body that comprises a mounting surface that mounts a load;
a second frame body that comprises an upper portion with an attaching unit and a lower portion coupled to the first frame body, and that is formed into a frame-shape structure, the attaching unit configured to adjust a position in an up-down direction of the attaching unit in relation to the first frame body;
a main body that is positioned on an upper portion of the second frame body and that comprises a flying mechanism; and
a control unit that controls a position in the up-down direction of the attaching unit such that a flying posture of the first frame body is controlled in accordance with a posture of the flying mechanism.

2. The aircraft according to claim 1, wherein the control unit controls the position in the up-down direction of the attaching unit such that the flying posture of the first frame body is horizontally maintained.

3. The aircraft according to claim 1, wherein:
the first frame body further comprises a pressing surface that faces the mounting surface and that is attached movably in the up-down direction; and
the control unit controls an amount of movement in the up-down direction of the pressing surface such that the load is sandwiched between the pressing surface and the mounting surface.

4. The aircraft according to claim 1, wherein:
the first other frame body further comprises a pressing surface facing the mounting surface and is attached to be movable in the up-down direction;
the aircraft further comprises
a vehicle that is coupled to a lower portion of the first frame body,
a first coupler that is provided to a lower portion of the second frame body and that couples the first frame body to the second frame body,
a first coupled unit that is provided to the first frame body and that is coupled to the first coupler,
a second coupler that is provided to a lower portion of the first frame body and that couples the vehicle to the first frame body, and
a second coupled unit that is provided to the vehicle and that is coupled to the second coupler; and
the control unit further controls an amount of movement in the up-down direction of the pressing surface such that the load is sandwiched between the pressing surface and the mounting surface.

5. The aircraft according to claim 3, wherein:
the first frame body comprises a plurality of strut members that rise from the mounting surface and that each comprises an outer pipe and an inner pipe contained in the outer pipe, and that are telescopically movable in respective axis directions;
the pressing surface is installed movably in the axis direction in conjunction with telescopic motion of the plurality of the strut members; and
the control unit further controls the telescopic motion of the plurality of strut members such that the load is sandwiched between the pressing surface and the mounting surface.

6. The aircraft according to claims 5, wherein:
the second frame body comprises a plurality of struts each comprising an outer pipe and an inner pipe contained in the outer pipe, and each of the plurality of struts is telescopically movable in the axis direction;
a plurality of the attaching units is provided to respective upper ends of the plurality of struts; and
the control unit controls the positions in the up-down direction of the plurality of attaching units by controlling telescopic motion of the plurality of struts.

7. The aircraft according to claim 6, wherein:
the first frame body is configured by coupling upper ends of the plurality of strut members to one another by a plurality of upper coupling rods via a plurality of joint blocks attached to upper ends of the plurality of strut members and coupling lower ends of the plurality of strut members to one another by a plurality of lower coupling rods via a plurality of joint blocks attached to lower ends of the plurality of strut members; and
the second frame body is configured by coupling the plurality of struts to the respective joint blocks attached to the upper ends of the plurality of strut members of the first frame body.

8. The aircraft according to claim 1, further comprising a leg that protrudes from a lower surface of the first frame body, that includes a grounding unit at a lower portion of the leg, the grounding unit configured so as to be capable of adjusting a position in the up-down direction of the grounding unit, wherein the controller controls the position in the up-down direction of the grounding unit in accordance with landform of a landing site.

9. The aircraft according to claim 8, wherein a plurality of the legs each comprises an outer pipe and an inner pipe contained in the outer pipe and is being telescopically movable in the axis direction.

10. The aircraft according to claim 3, wherein the first frame body further comprises an opening and closing mechanism that opens and closes a bottom face of the first frame body by moving the mounting surface.

11. The aircraft according to claim 1, further comprising a supporting member that is installed to the first frame body movably in a left-right direction and that depresses the load mounted on the mounting surface from the left and the right sides.

12. The aircraft according to claim 1, wherein;
the load is a vehicle;
each wheel of the vehicle is positioned below the lower surface of the first frame body; and
the wheel is configured to as a grounding unit to a land site.

13. The aircraft according to claim 1, wherein:
the load is a vehicle; and
the aircraft further comprises:
  a coupler that is provided to a lower portion of the second frame body and that couples the vehicle; and
  a coupled portion that is provided to the vehicle and that is coupled to the coupler.

14. The aircraft according to claim 1, wherein:
the main body further comprises a rotatable drum, a cable wound around the drum, and a winch having a driving apparatus that rotates the drum;
either one of the second frame body and the first frame body is liftably installed to the main body via the winch; and
the control unit controls operation of the driving apparatus such that the cable is unwound from the drum and wound by the drum.

15. The aircraft according to claim 1, wherein:
the second frame body further comprises a rotatable drum, a cable wound around the drum, and a winch having a driving apparatus that rotates the drum;
the load mounted on the mounting surface of the first frame body is mounted so as to be liftable with respect to the first frame body by the winch;
the first frame body further comprises an opening and closing mechanism that opens and closes a bottom face of the first frame body by moving the mounting surface;
the control unit further controls operation of the driving apparatus such that the cable is unwound from the drum and wound around the drum and controls movement of the mounting surface such that the bottom face is opened and closed.

16. The aircraft according to claim 1, wherein the attaching unit is configured to detachably latch the upper portion of the second frame body on the main body.

17. The aircraft according to claim 1, wherein the flying mechanism is of a multicopter type.

18. The aircraft according to claim 1, wherein the flying mechanism is of a tilt-rotor type.

19. The aircraft according to claim 1, wherein:
the flying mechanism of the main body is configured to be a vertically-flying mechanism for vertically flying; and
the aircraft further comprises a horizontally-flying mechanism for horizontally flying separately from the vertically-flying mechanism.

20. The aircraft according to claim 1, wherein:
the second frame body further comprises an auxiliary coupling mechanism that is interposed between the second frame body and the main body and that couples the second frame body to the main body; and
the auxiliary coupling mechanism is a one-point supporting mechanism that supports at least one of the second frame body and the main body at one point.

21. A system for controlling an aircraft, the system comprising:
the aircraft defined in claim 1; and
a controller that controls the aircraft, wherein
the control unit of the aircraft carries out flight control that controls working of the flying mechanism,
the aircraft further comprises a first communication unit that wirelessly communicates with the controller, and
the controller comprises a second communication unit that wirelessly communicates with the aircraft.

22. The system according to claim 21, wherein:
the controller comprises an operation control unit having a route setting function that sets a route from the start point to the destination point and a monitoring function that monitors an operation status of the aircraft, and is configured to transmit route setting information containing information of the set route to the aircraft through the second communication unit; and
the aircraft is configured to generate flight control information based on the route setting information that the control unit receives through the first communication unit and control, based on the generated flight control information, working of the flying mechanism.

23. The system according to claim 21, wherein:
the second frame body of the aircraft couples the object loaded with a parcel at the lower portion of the parcel;
the aircraft comprises a first transfer acknowledgement mechanism that transmits, through the first communication unit, a transfer acknowledgement signal to confirm whether the parcel is received to the controller; and
the controller comprises a second through the first communication unit mechanism that acknowledge, based on the transfer acknowledgement signal received from the aircraft through the second communication unit, whether the parcel is received.

* * * * *